(12) United States Patent
Cameron et al.

(10) Patent No.: US 12,533,267 B2
(45) Date of Patent: Jan. 27, 2026

(54) PRESSURE SENSING DEVICE FOR USE WITH A COMPRESSION BANDAGE

(71) Applicant: University of Galway, Galway (IE)

(72) Inventors: Andrew Cameron, Moycullen (IE); Garry Duffy, Kilcolgan (IE); Scott Robinson, Barcelona (IE); Jaime Punter-Villagrasa, Barcelona (ES); Myles McGarrigle, Galway (IE); Georgina Gethin, Knocknarea (IE); Mary-Paula Colgan, Dublin (IE); Faisal Sharif, Galway (IE); Muhammad Adnan Elahi, Galway (IE)

(73) Assignee: University of Galway, Galway (IE)

( * ) Notice: Subject to any disclaimer, the term of this patent is extended or adjusted under 35 U.S.C. 154(b) by 1256 days.

(21) Appl. No.: 17/415,534

(22) PCT Filed: Dec. 18, 2019

(86) PCT No.: PCT/EP2019/086131
§ 371 (c)(1),
(2) Date: Jun. 17, 2021

(87) PCT Pub. No.: WO2020/127610
PCT Pub. Date: Jun. 25, 2020

(65) Prior Publication Data
US 2022/0054323 A1 Feb. 24, 2022

(30) Foreign Application Priority Data

Dec. 20, 2018 (EP) .................................... 18214871

(51) Int. Cl.
*A61F 13/84* (2006.01)
*A61F 13/01* (2024.01)
(Continued)

(52) U.S. Cl.
CPC .............. *A61F 13/085* (2013.01); *G01L 1/16* (2013.01); *G01L 1/2206* (2013.01);
(Continued)

(58) Field of Classification Search
CPC .... A61B 17/132; A61F 5/0109; A61F 5/0106; A61F 13/00; A61F 13/08; A61F 13/06;
(Continued)

(56) References Cited

U.S. PATENT DOCUMENTS 6,152,893 A * 11/2000 Pigg ...................... A61F 13/069
602/62
6,338,723 B1 * 1/2002 Carpenter ............. A61F 13/085
602/62
(Continued)

FOREIGN PATENT DOCUMENTS

| GB | 2439750 A | 1/2008 |
|---|---|---|
| WO | 2018155341 A1 | 8/2018 |
| WO | 2018209100 A1 | 11/2018 |

*Primary Examiner* — Camtu T Nguyen
(74) *Attorney, Agent, or Firm* — Bookoff McAndrews, PLLC

(57) ABSTRACT

A pressure sensing clip (1) and a system including a bandage (19) for detecting and displaying the pressure applied by a (compression) bandage (19) to a human or animal body in which the pressure sensing clip (1) has an inner bandage penetrating arm (2) and an outer arm (3) hingedly attached to the inner arm (2) at a hinge (4) so that the outer arm (3) is movable between a hingedly closed position with respect to the inner arm (2) and a hingedly open position. The device can be operatively attached to an applied compression bandage, or it can be placed beneath or between the bandage during bandage application so that the bandage covers the sensing part of the device. In the latter application, the ability of the arms of the device to adapt an open configuration allows the bandage to be applied over the inner arm leaving the outer arm to close once the bandage has been (Continued)

applied. The device can receive, store and transmit data to a user.

18 Claims, 64 Drawing Sheets

(51) Int. Cl.
*A61F 13/08* (2006.01)
*G01L 1/16* (2006.01)
*G01L 1/22* (2006.01)
*G01L 5/00* (2006.01)

(52) U.S. Cl.
CPC .... *G01L 5/0028* (2013.01); *A61F 2013/8482* (2013.01); *A61F 2013/8491* (2013.01)

(58) Field of Classification Search
CPC ............ A61F 2013/8482; A61F 13/082; A61F 2013/8491; A61F 13/085; A61F 13/00051; A61F 2013/0028; A61F 2013/00463; A61F 2013/00468
See application file for complete search history.

(56) References Cited

U.S. PATENT DOCUMENTS

| | | | |
|---|---|---|---|
| 12,390,372 B2 * | 8/2025 | Staab | A61F 13/00059 |
| 2014/0180019 A1 | 6/2014 | Martinez et al. | |
| 2016/0242964 A1 * | 8/2016 | Rapp | A61F 13/00063 |
| 2017/0299448 A1 * | 10/2017 | Campbell | G06F 3/041 |

* cited by examiner

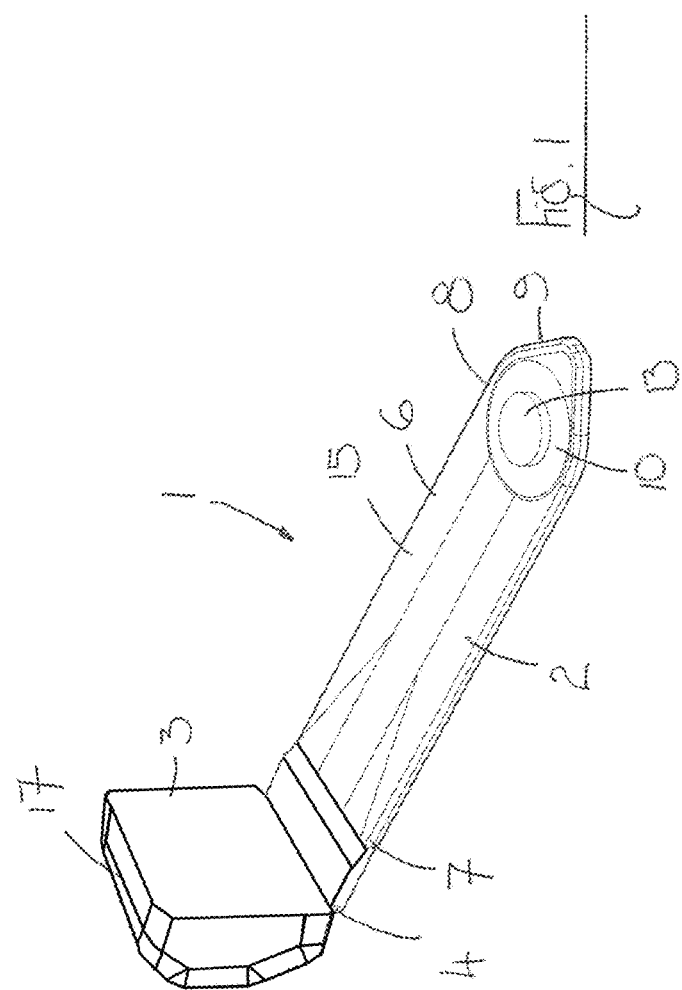

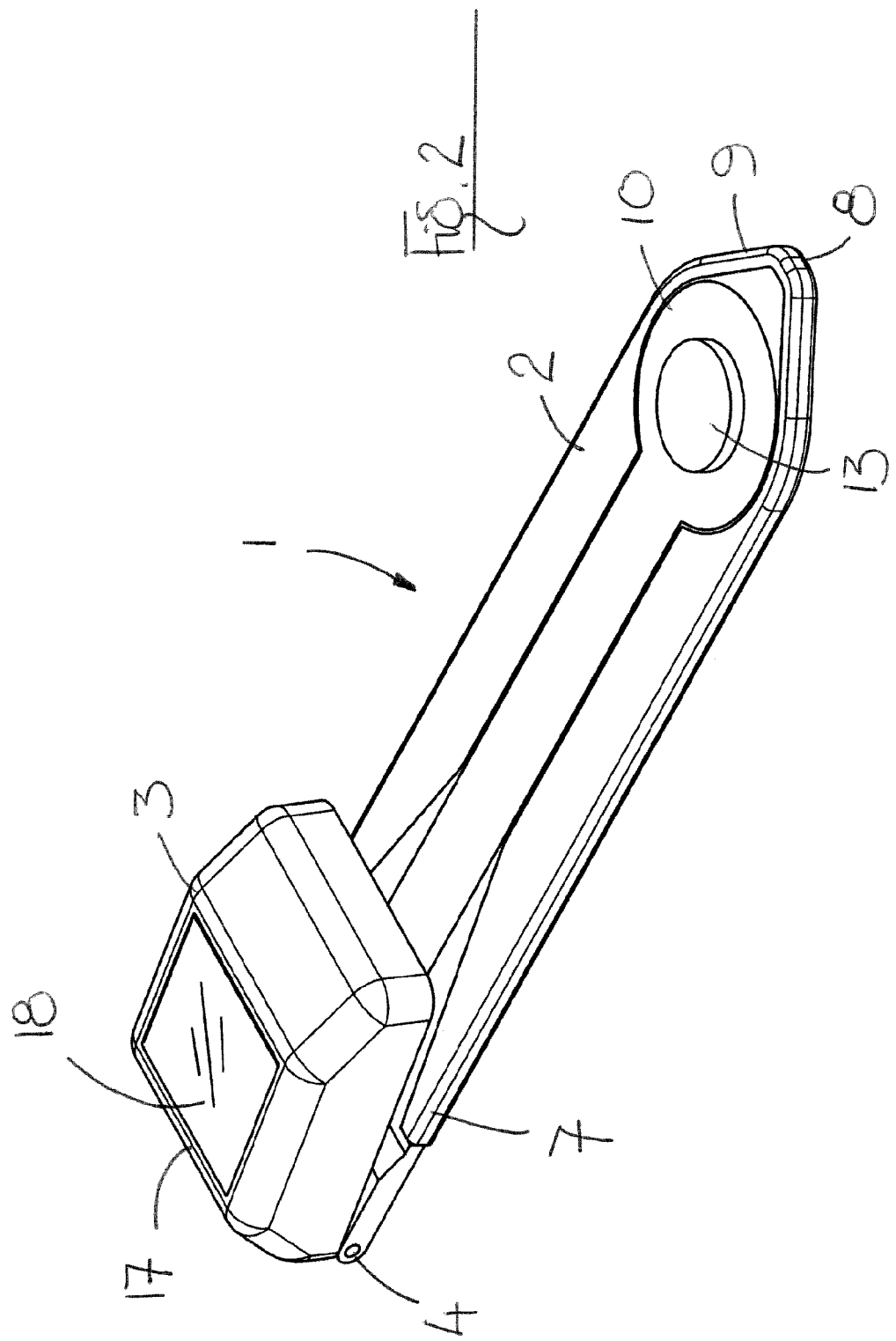

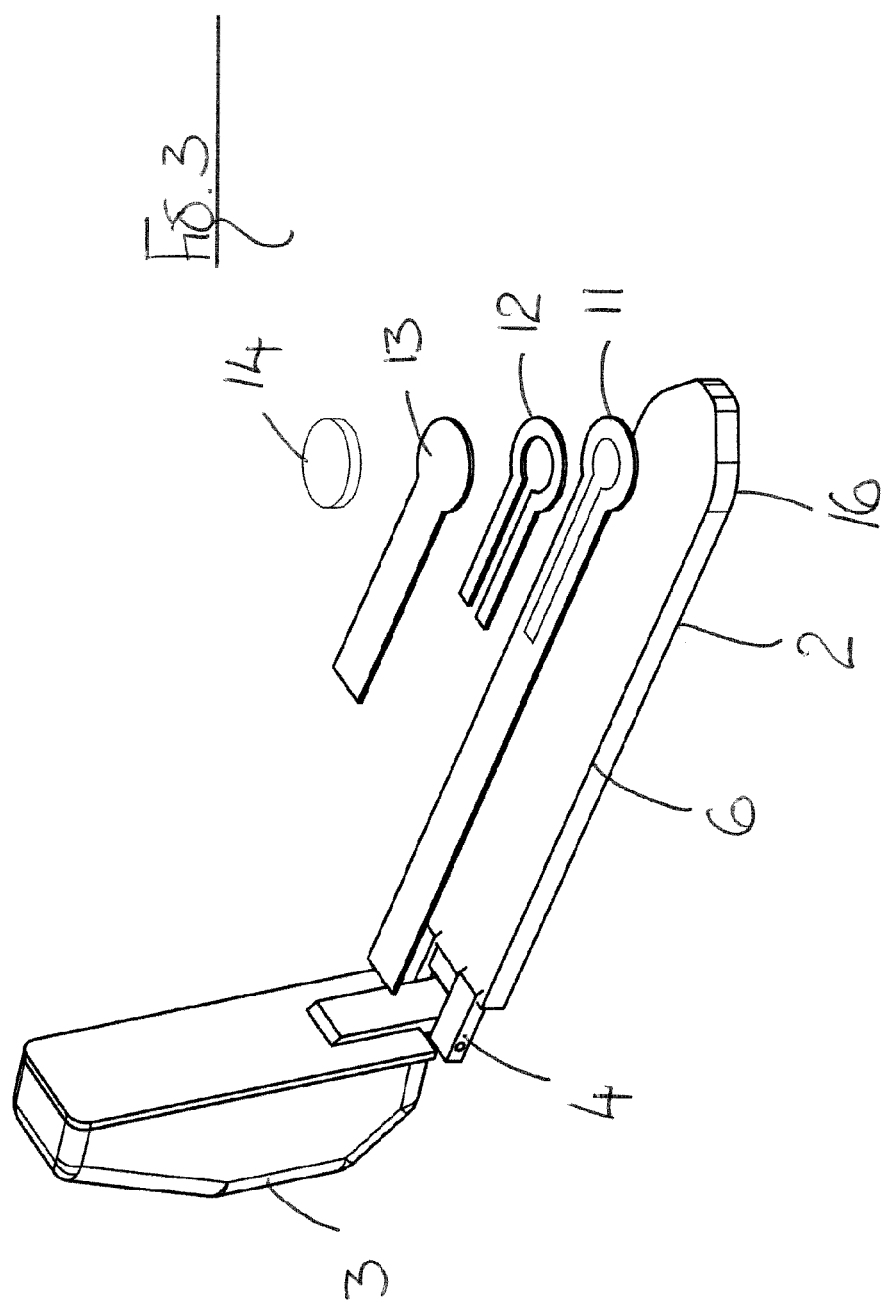

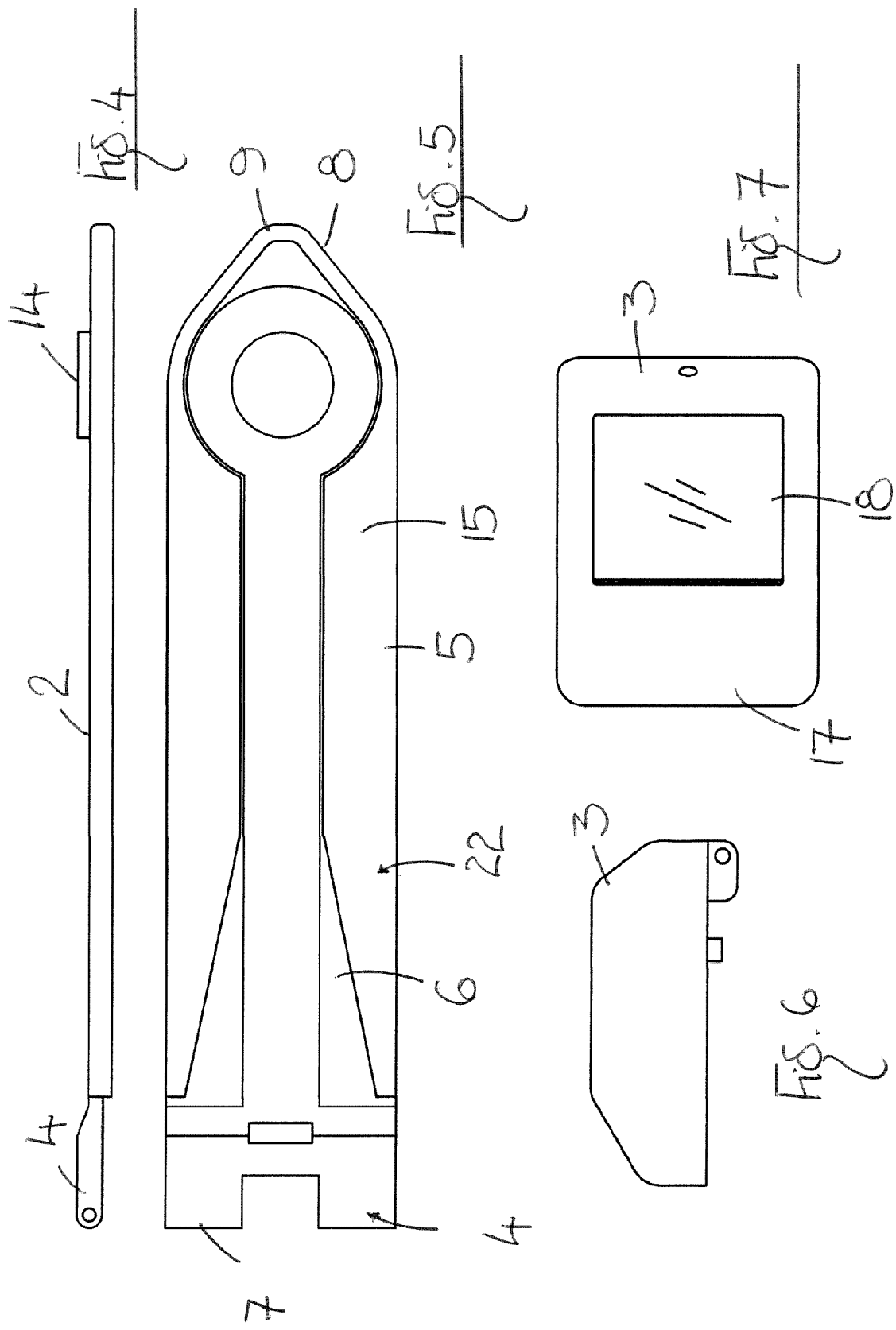

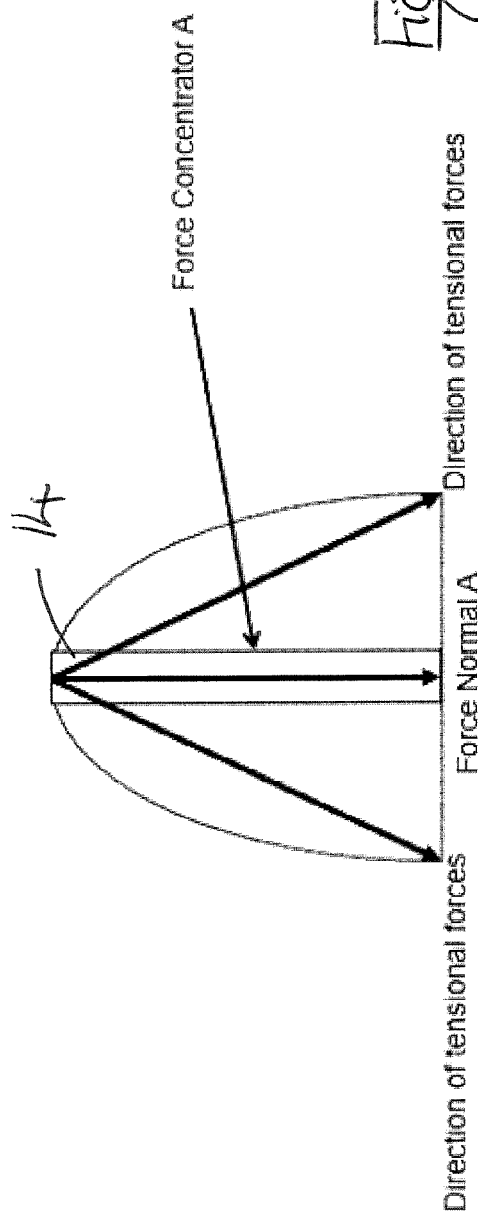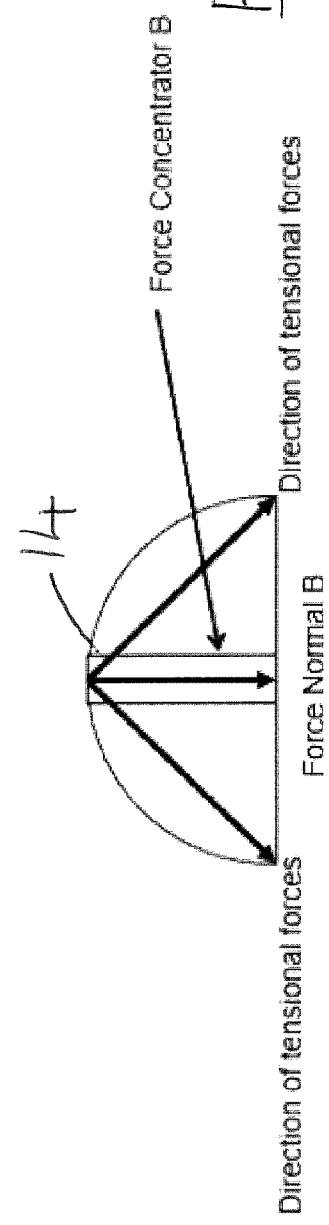

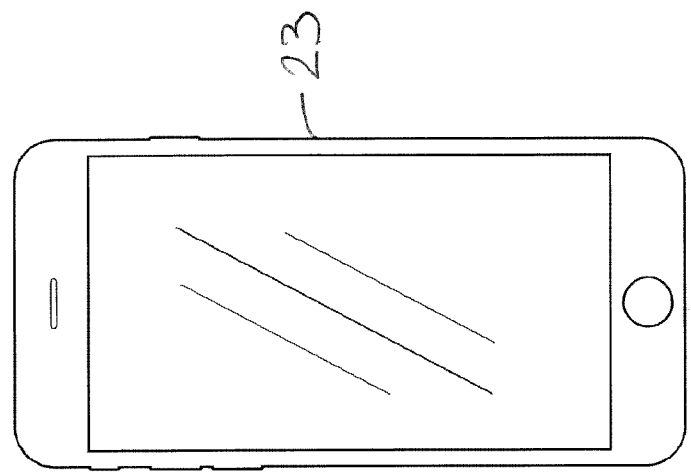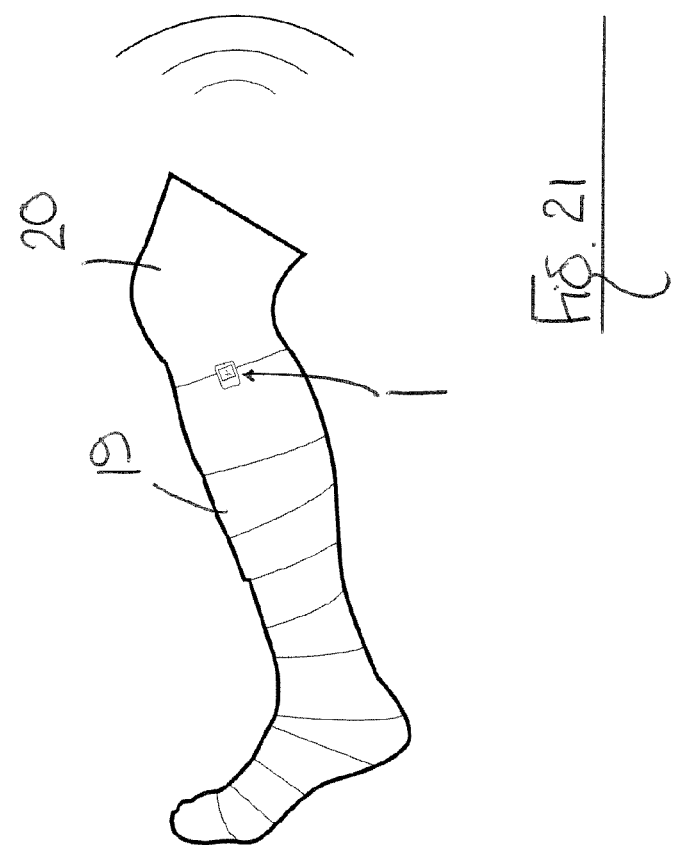
Fig. 21

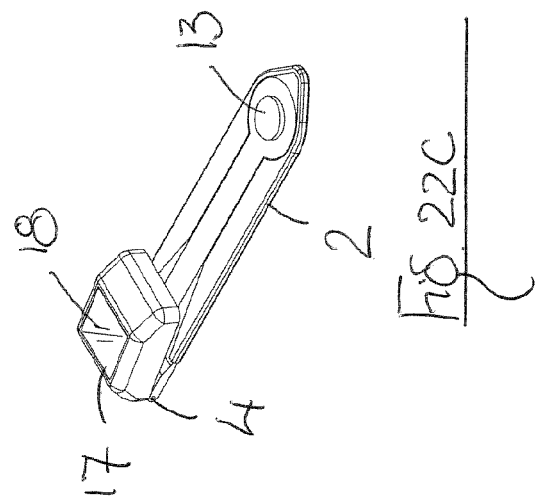
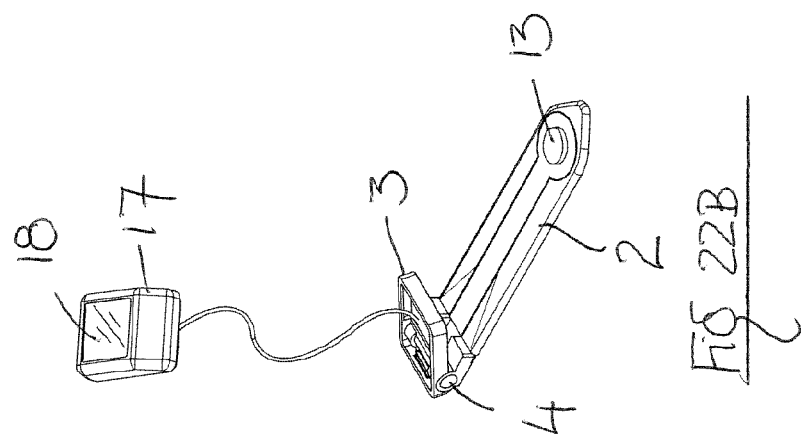
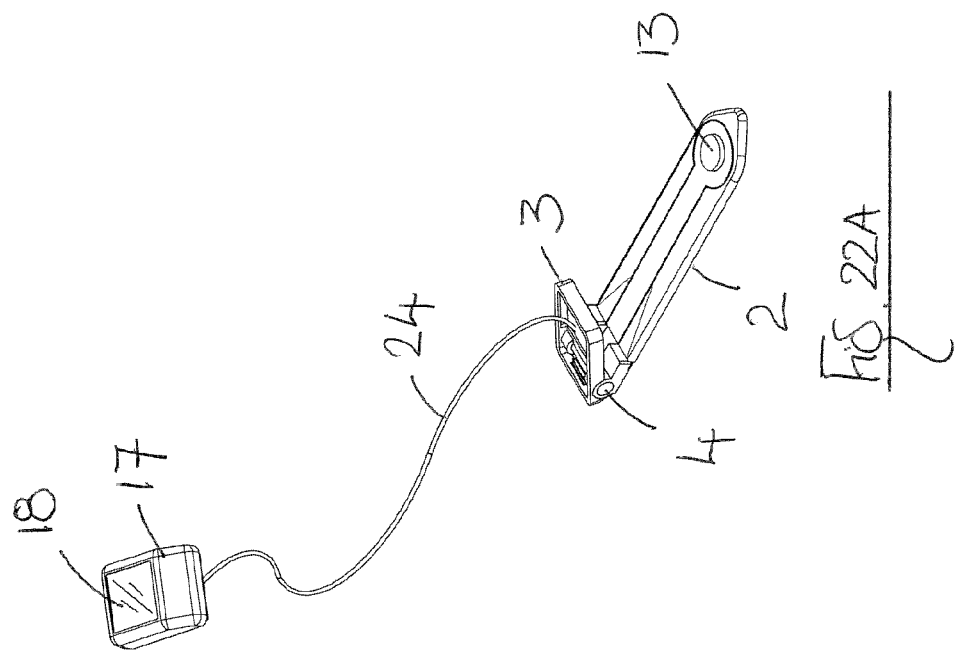

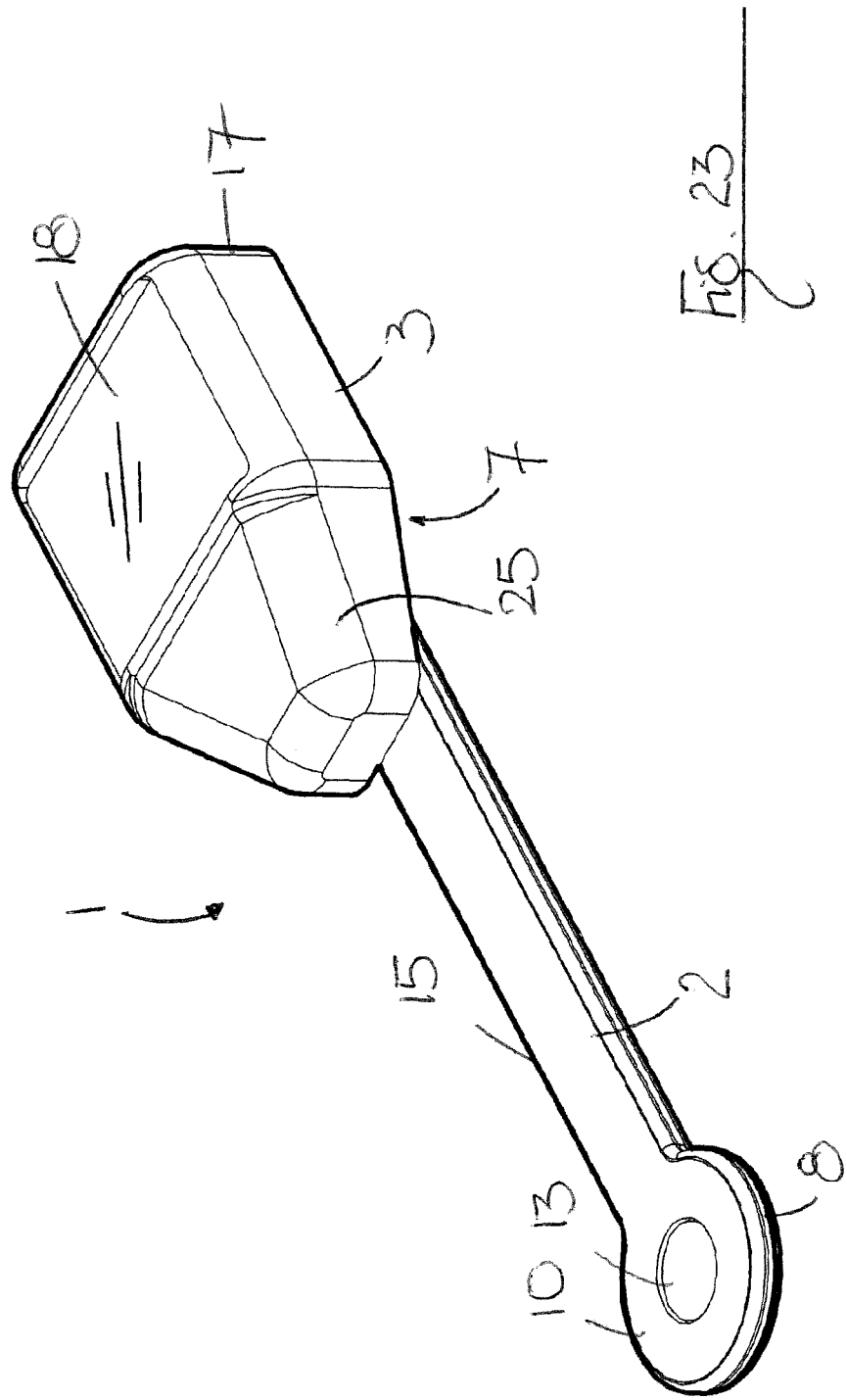

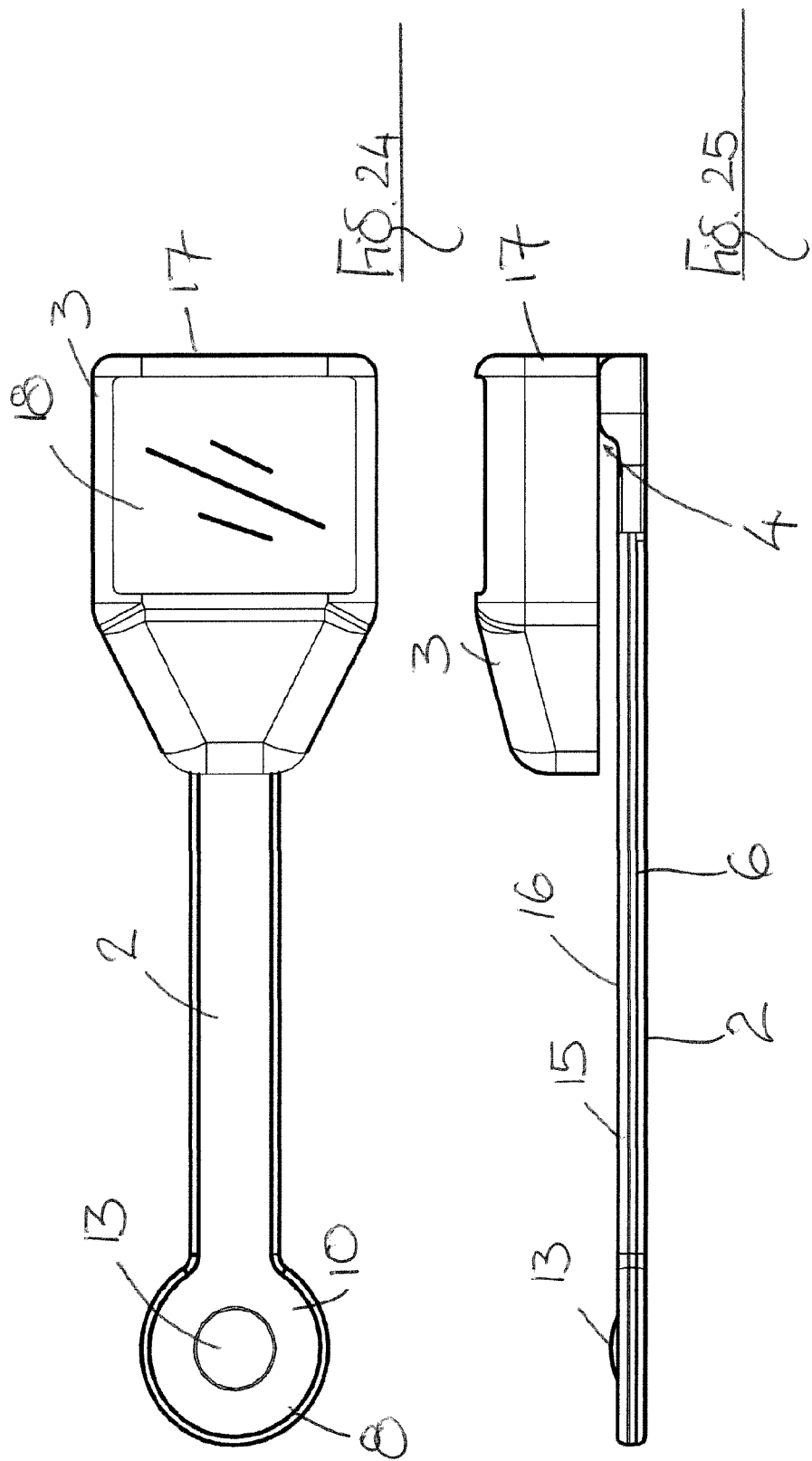

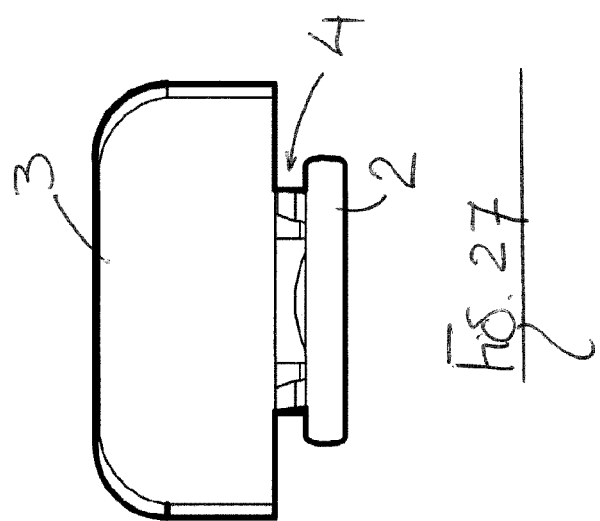
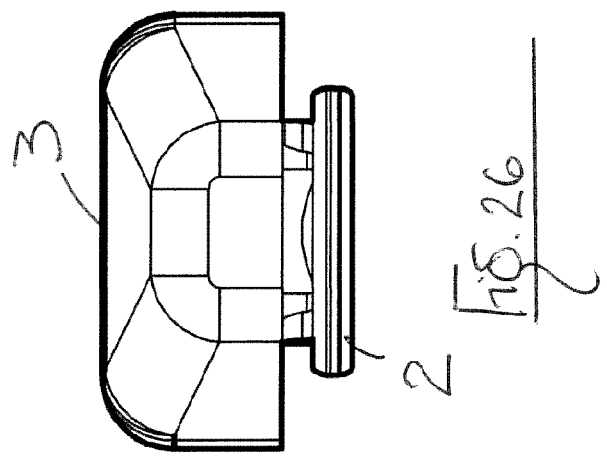

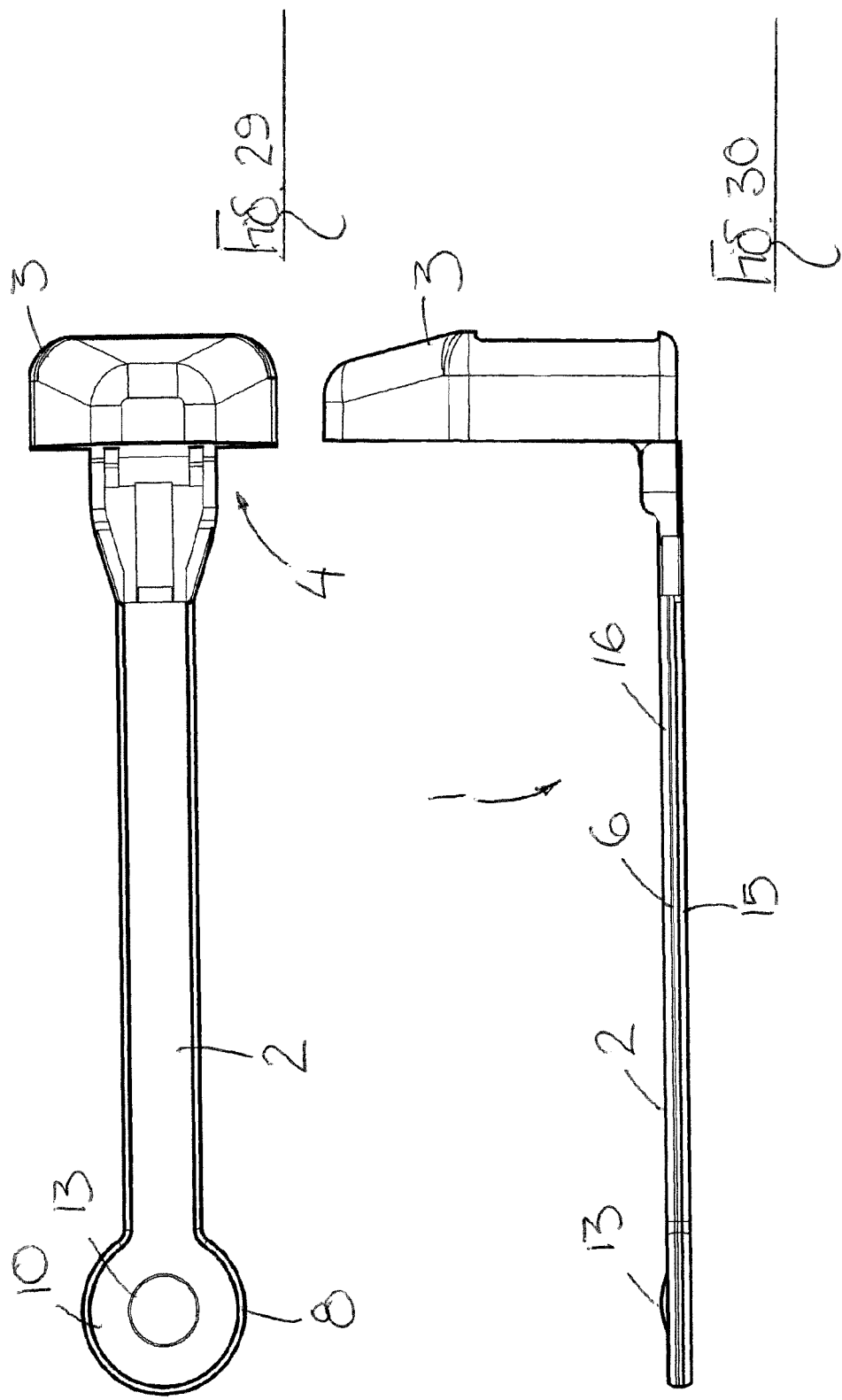

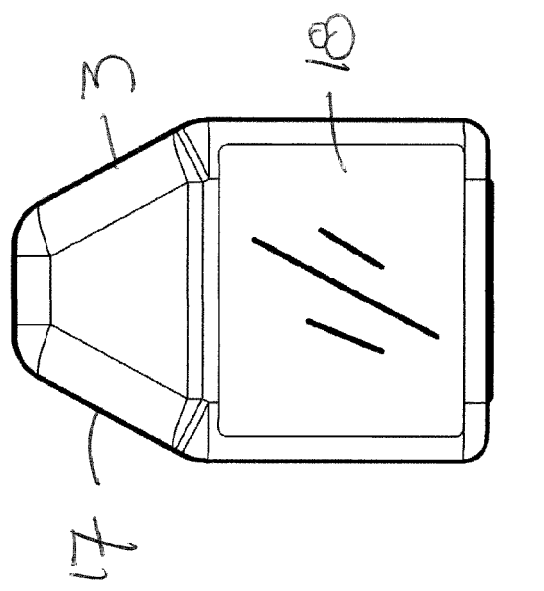
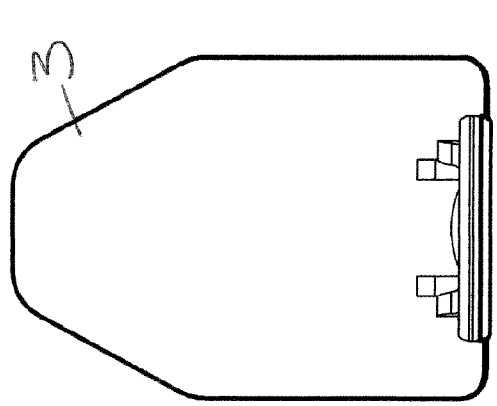

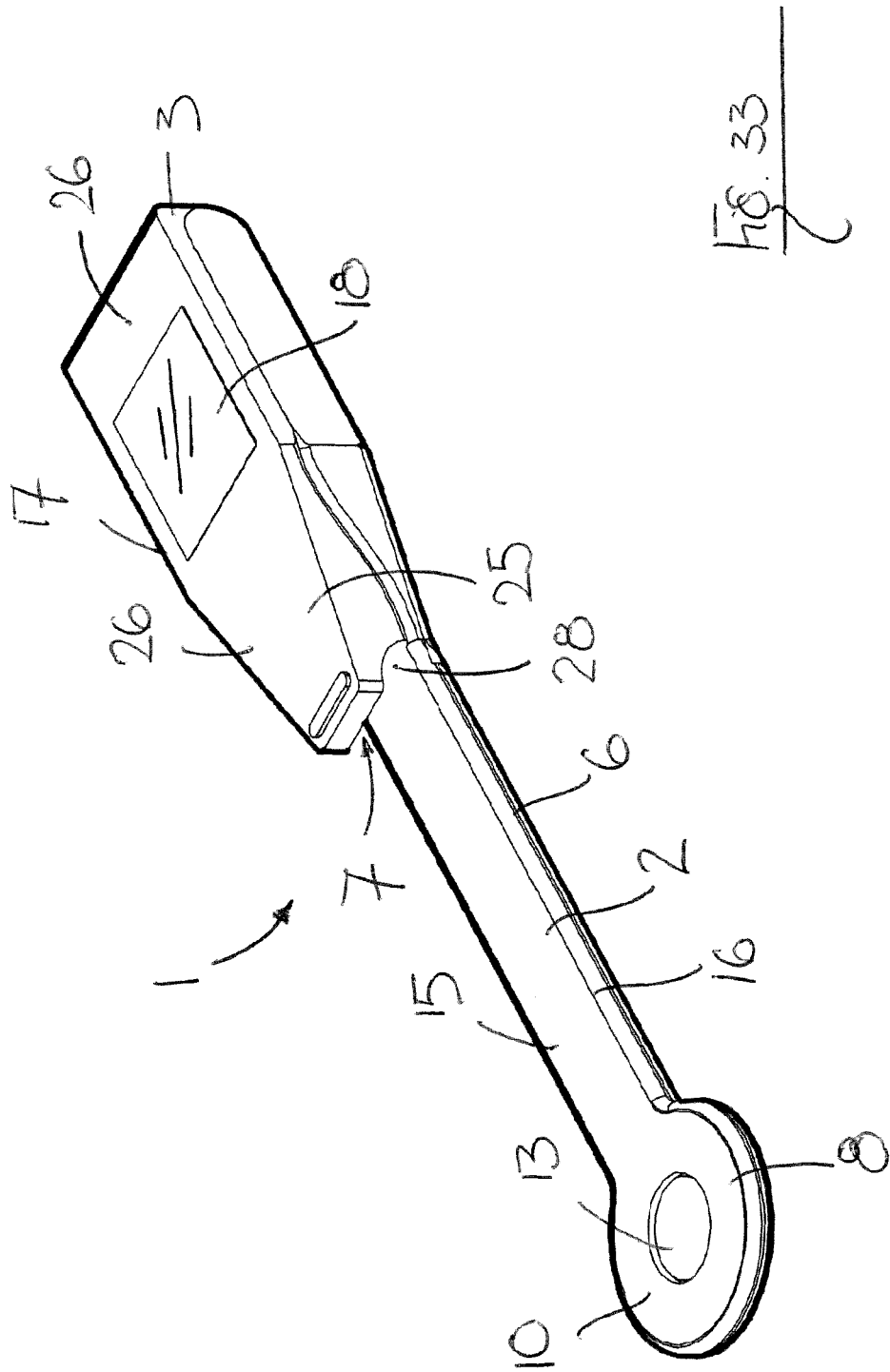

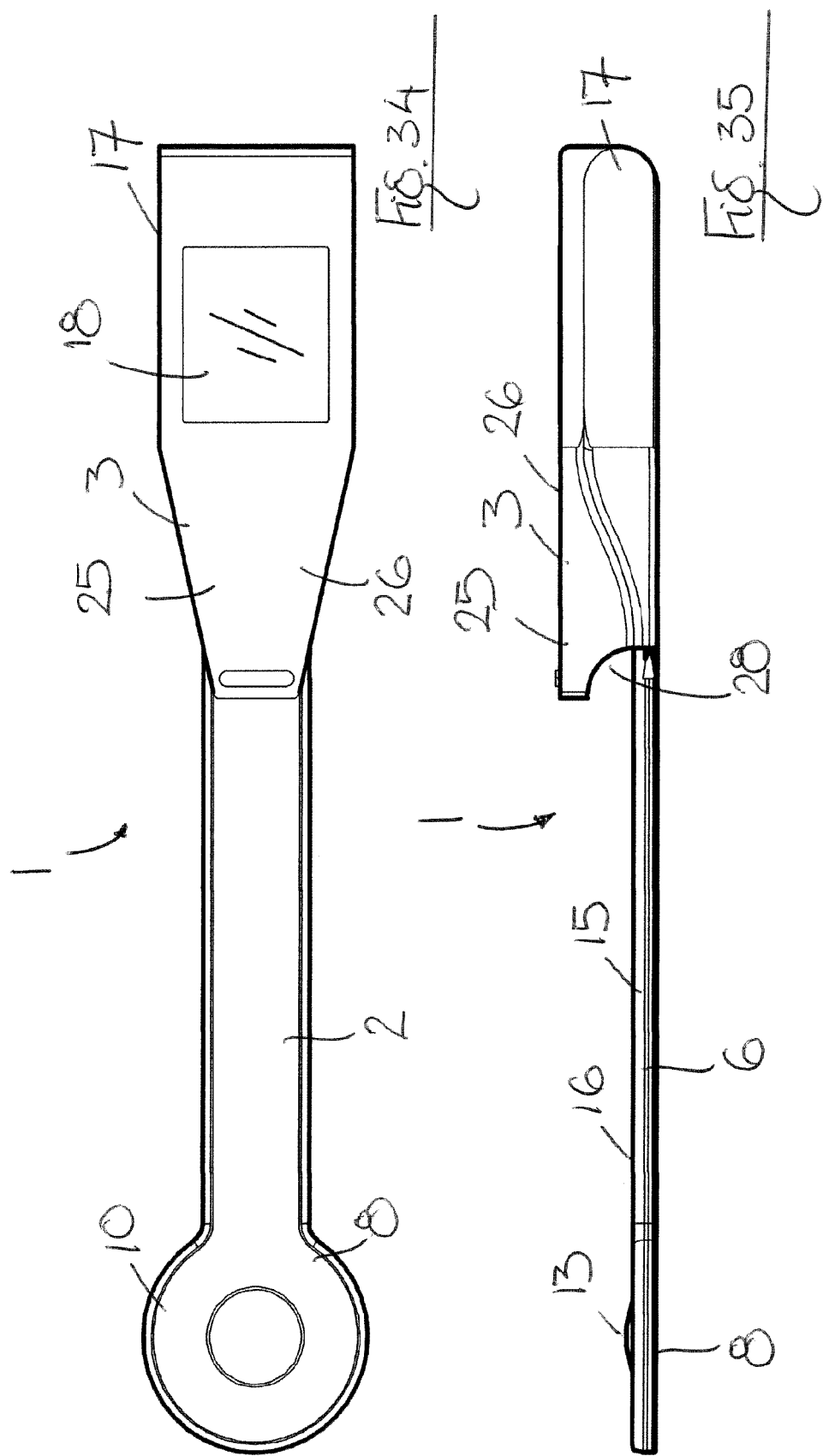

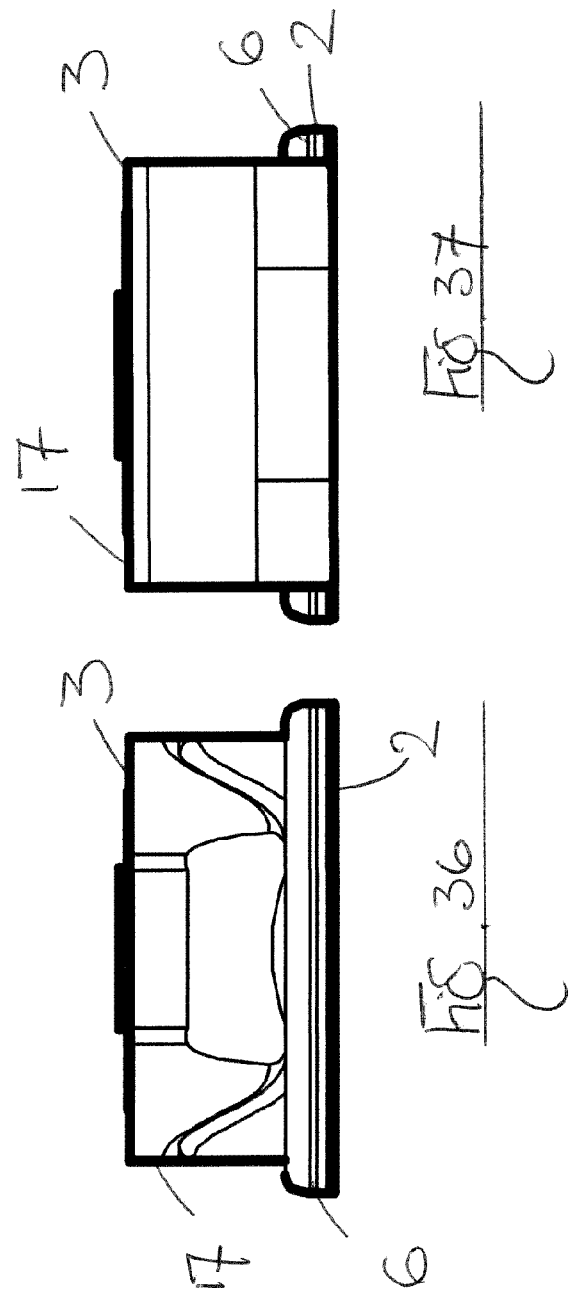

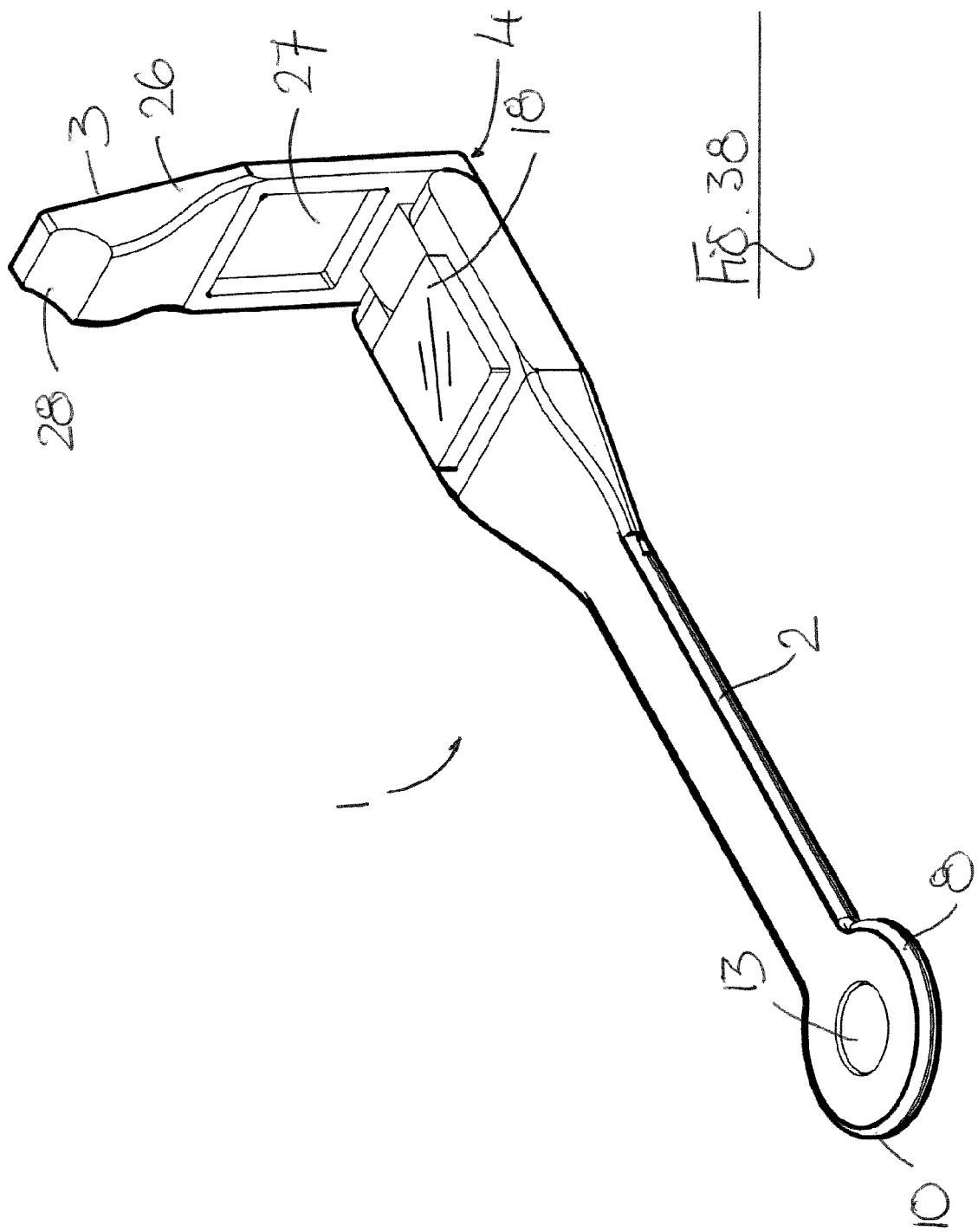

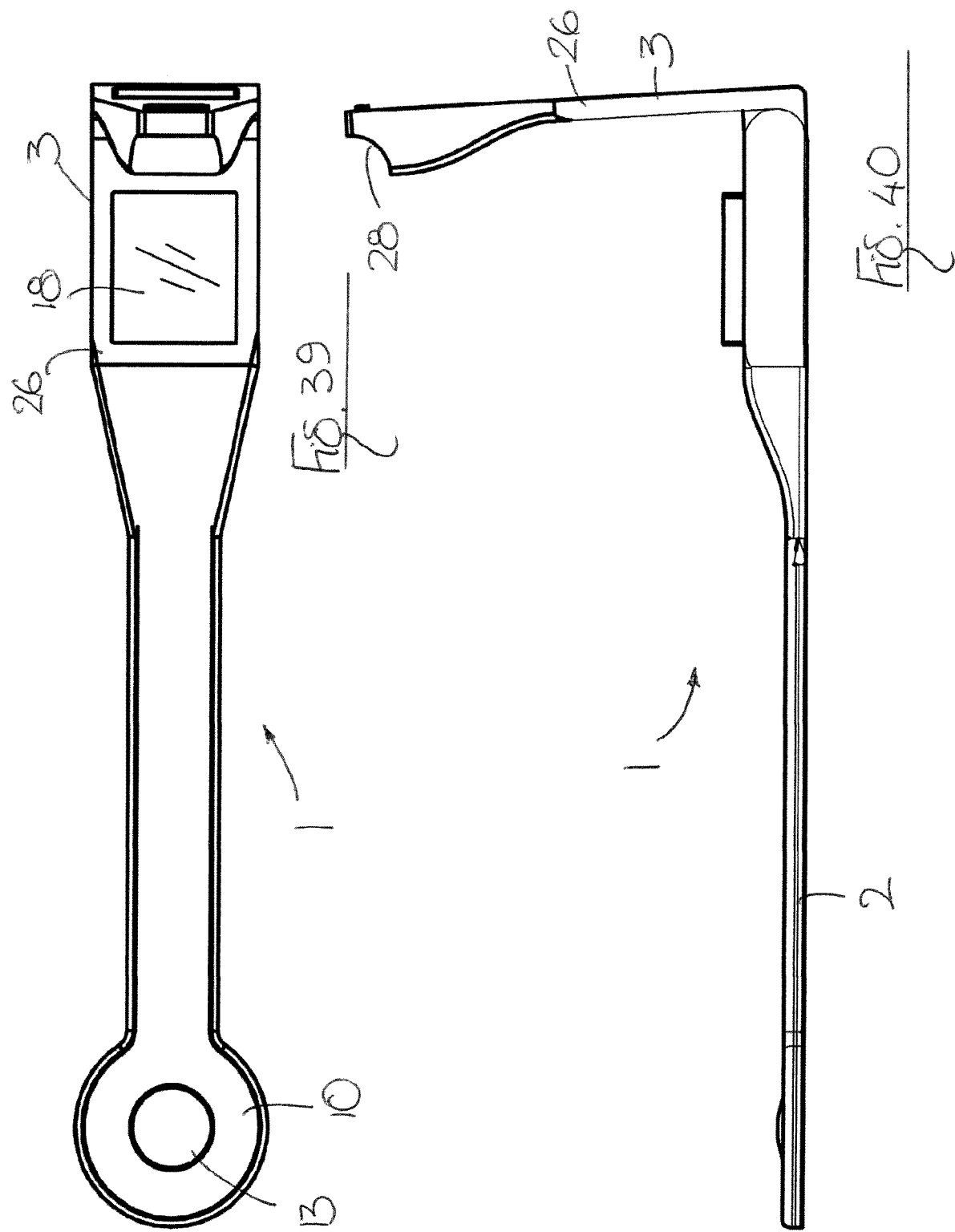

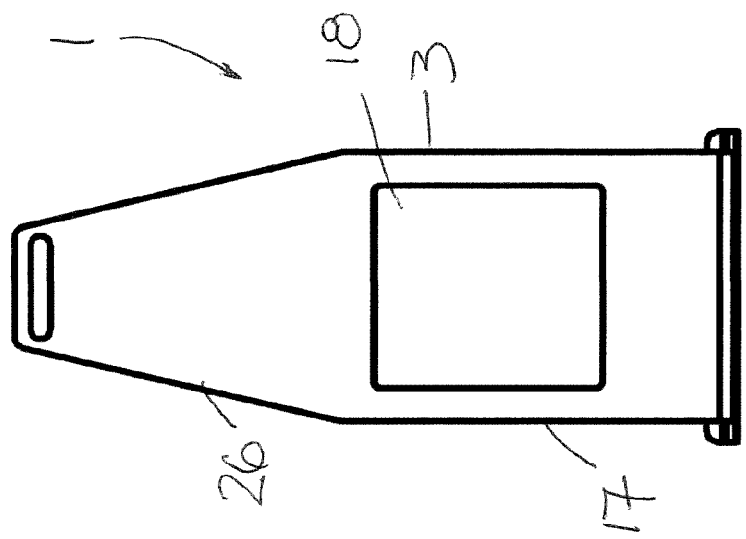
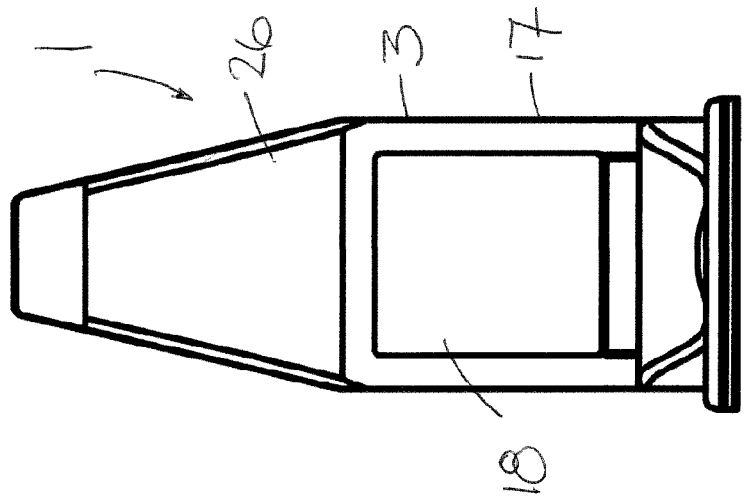

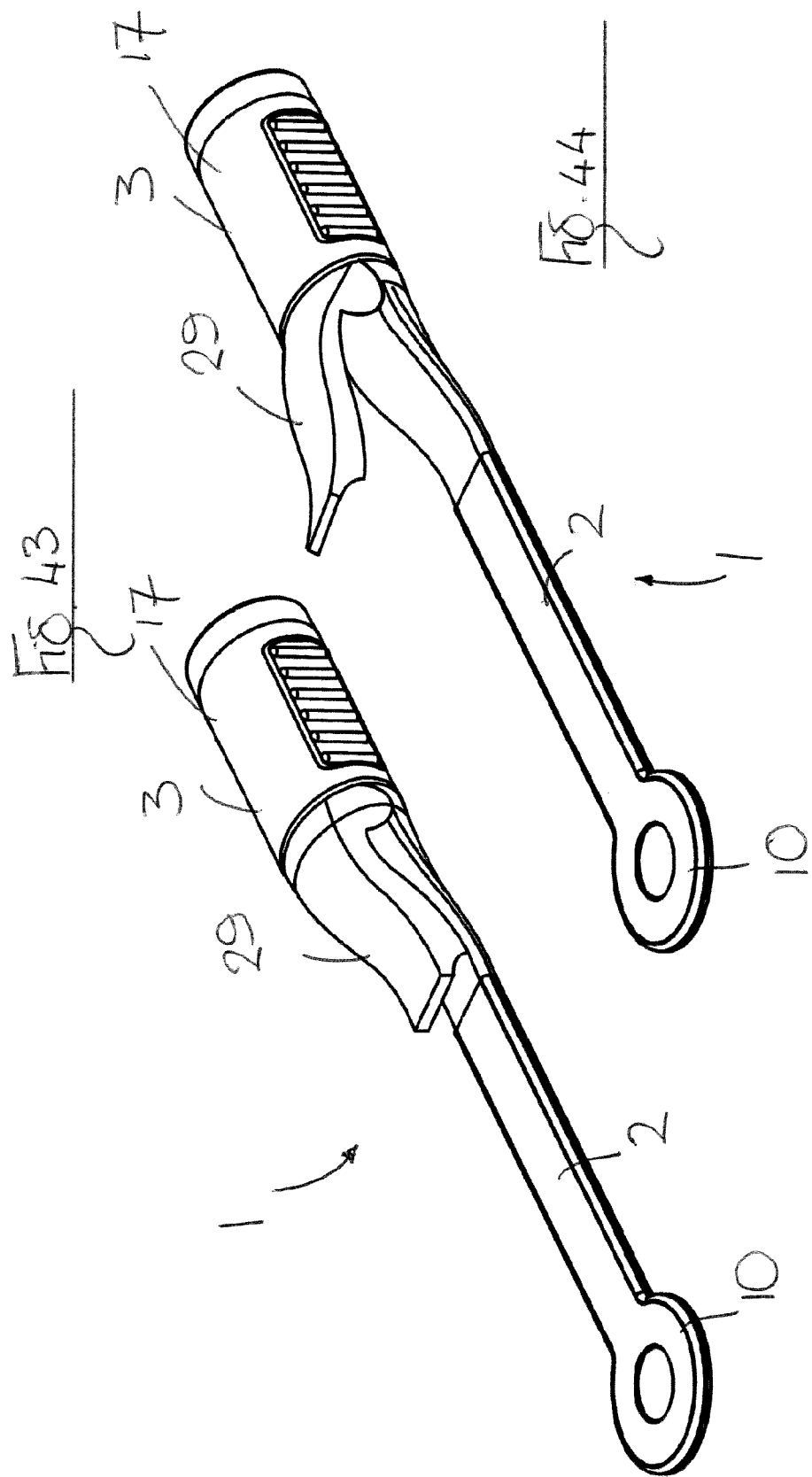

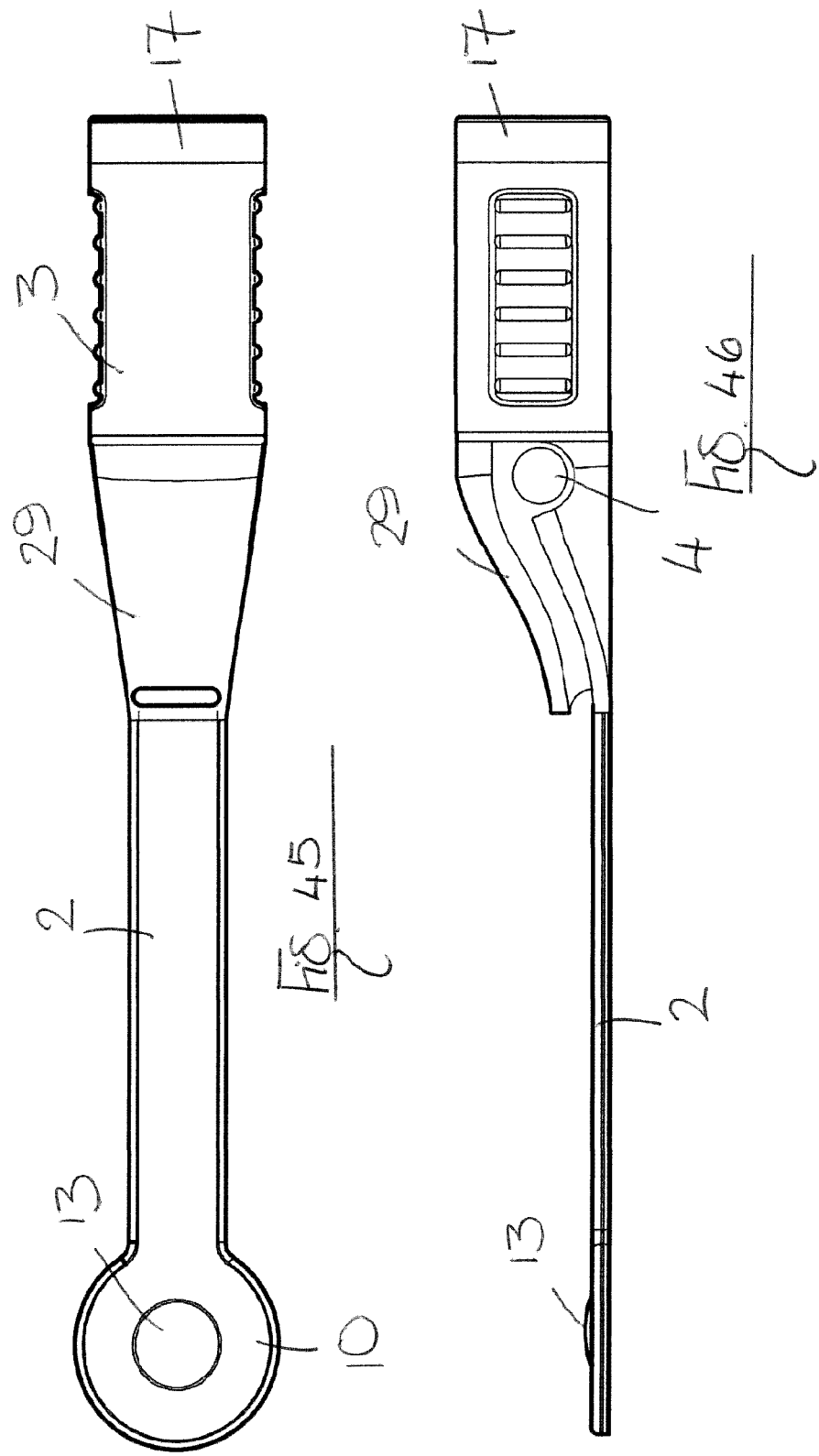

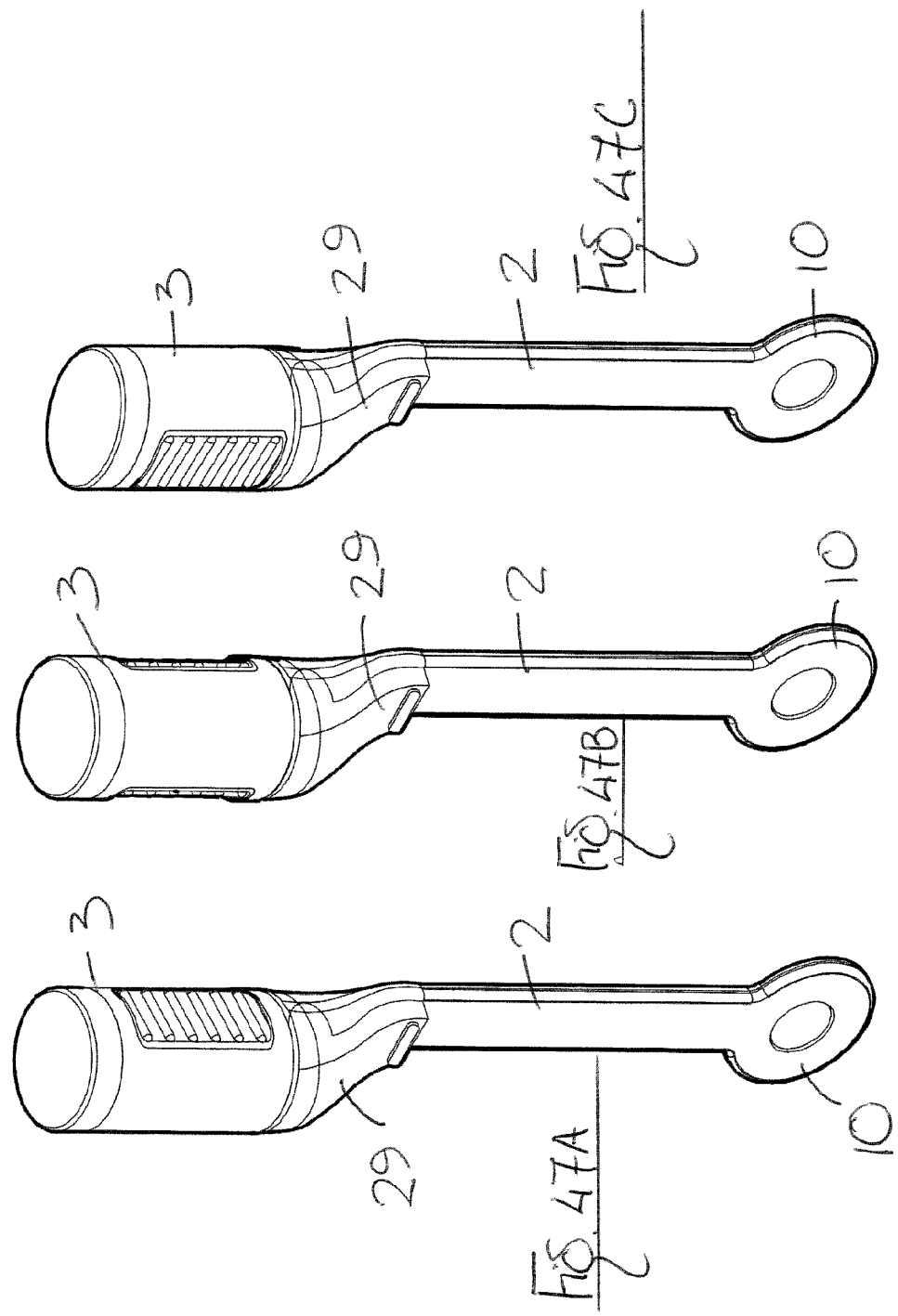

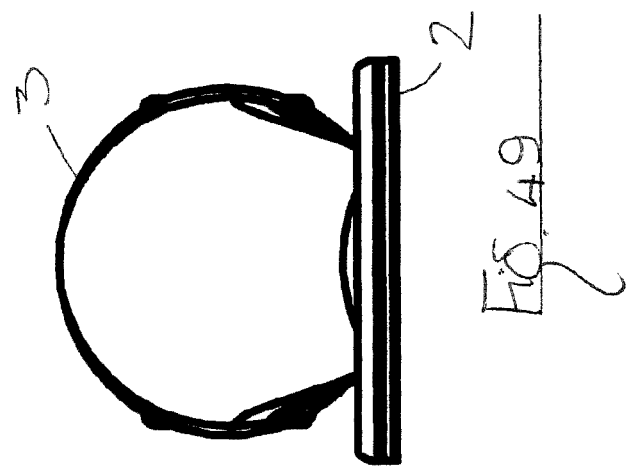
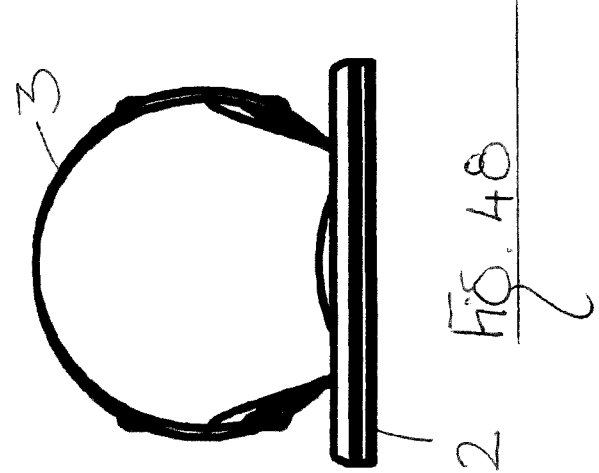

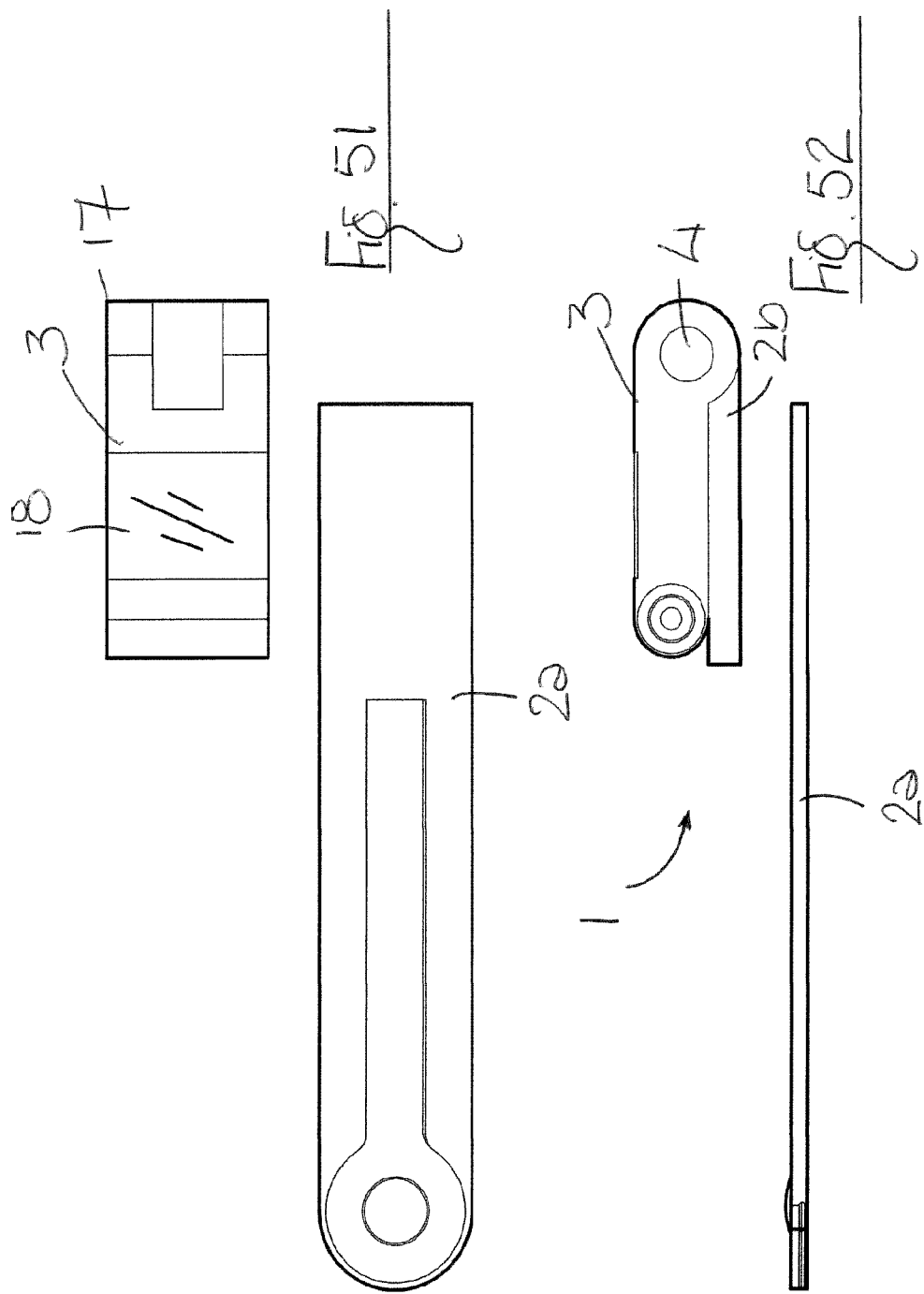

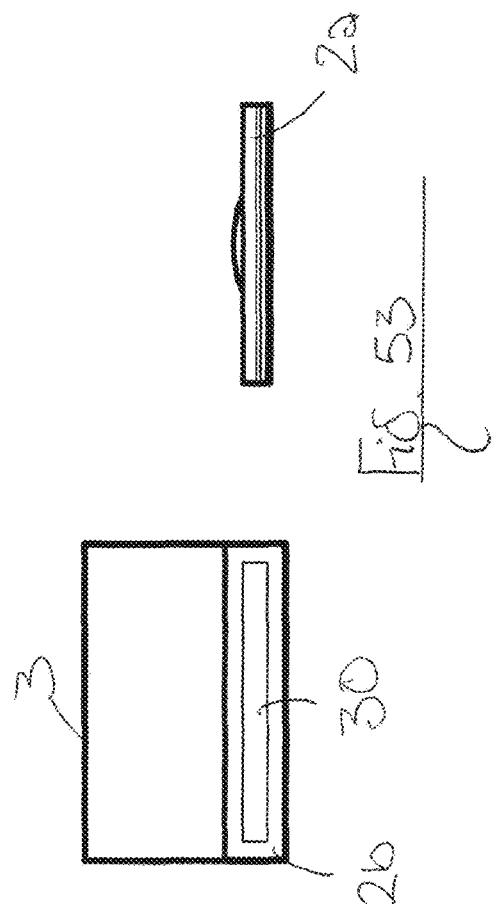

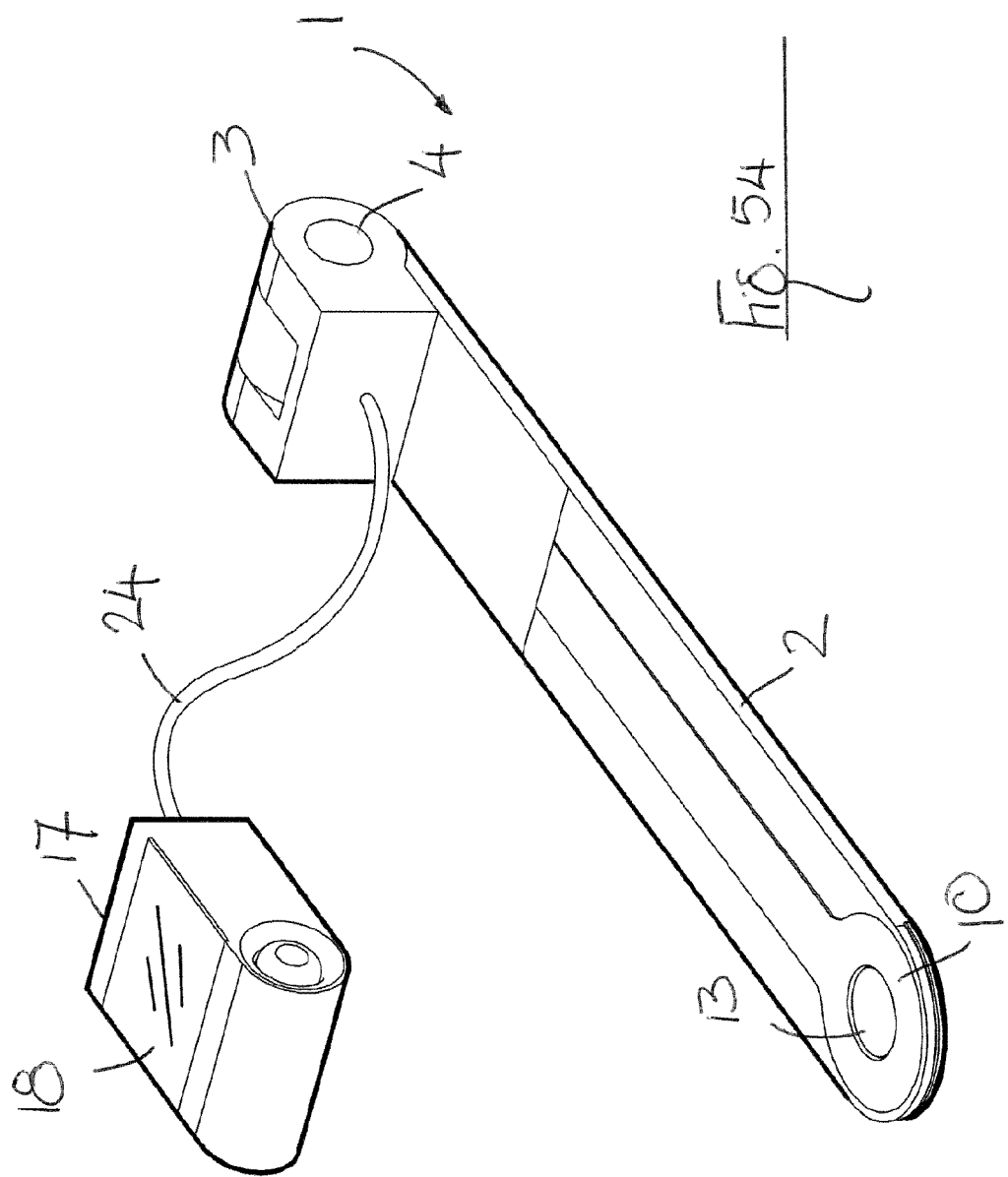

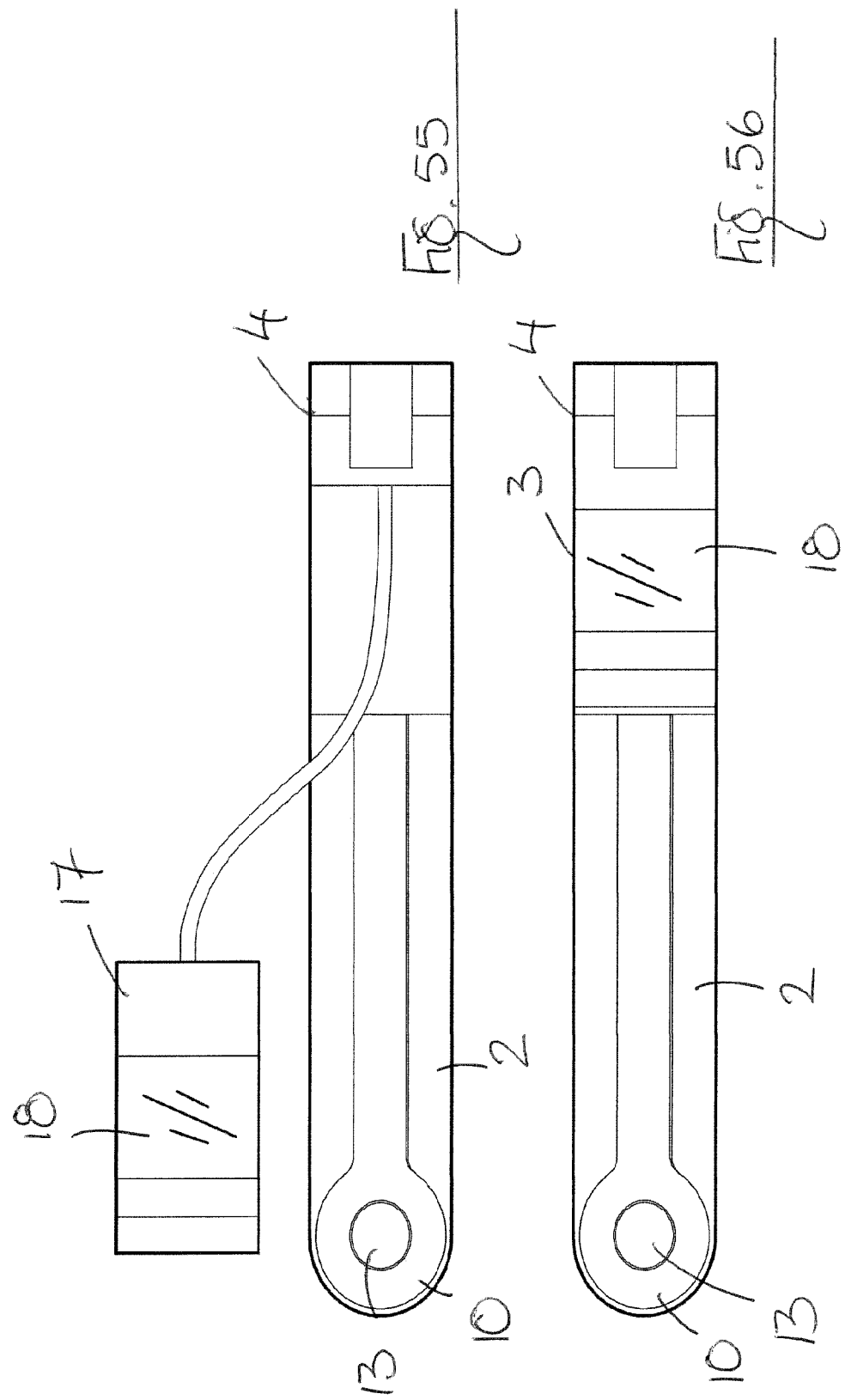

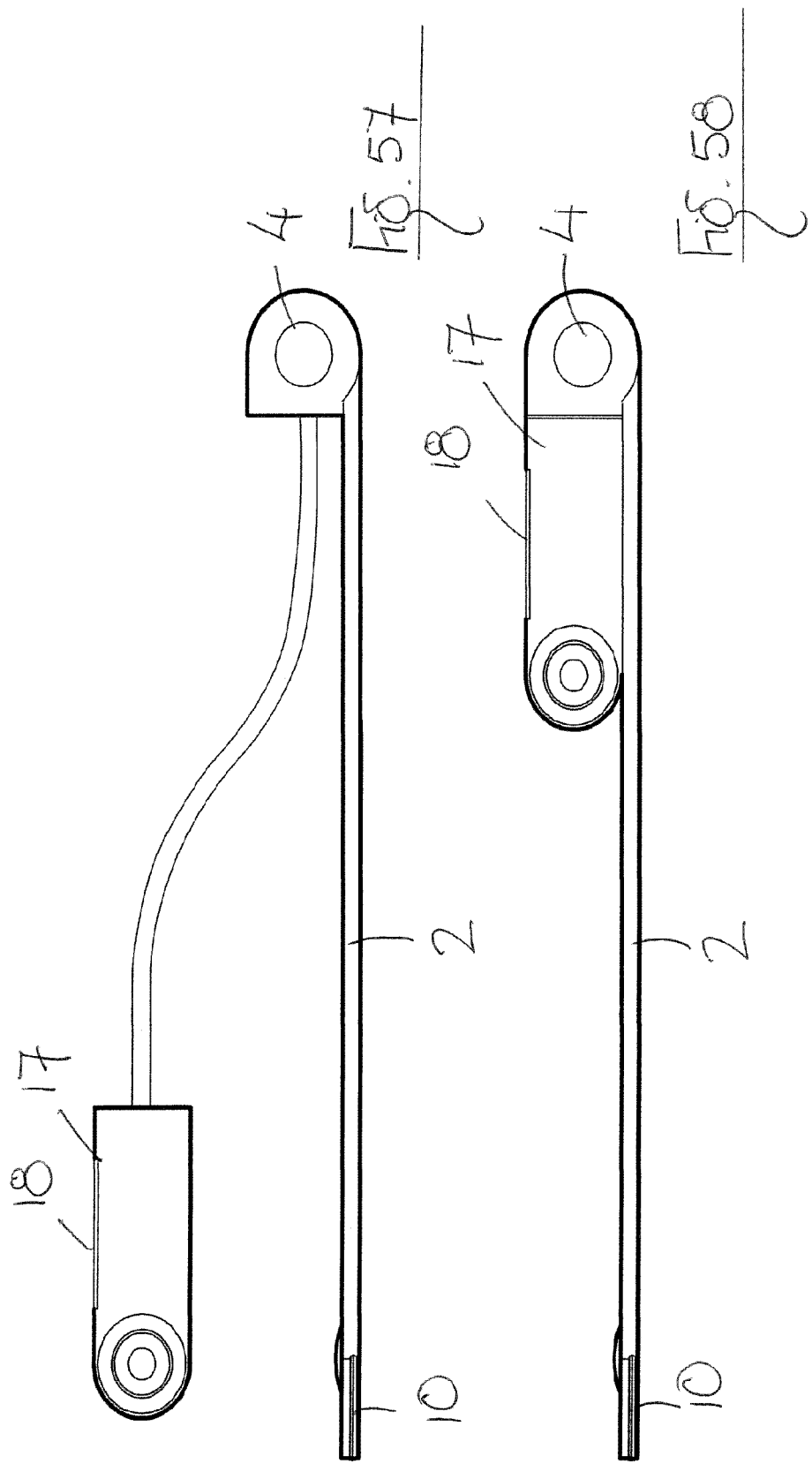

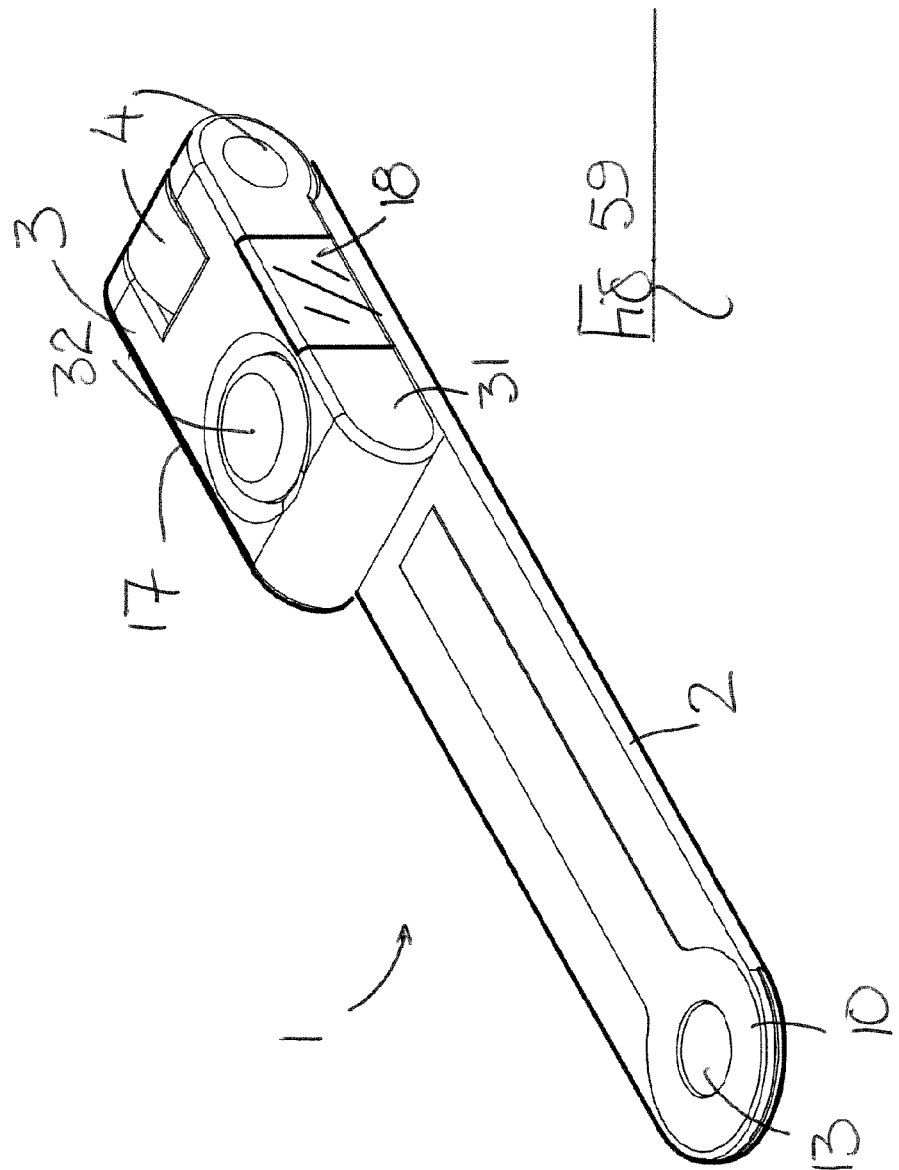

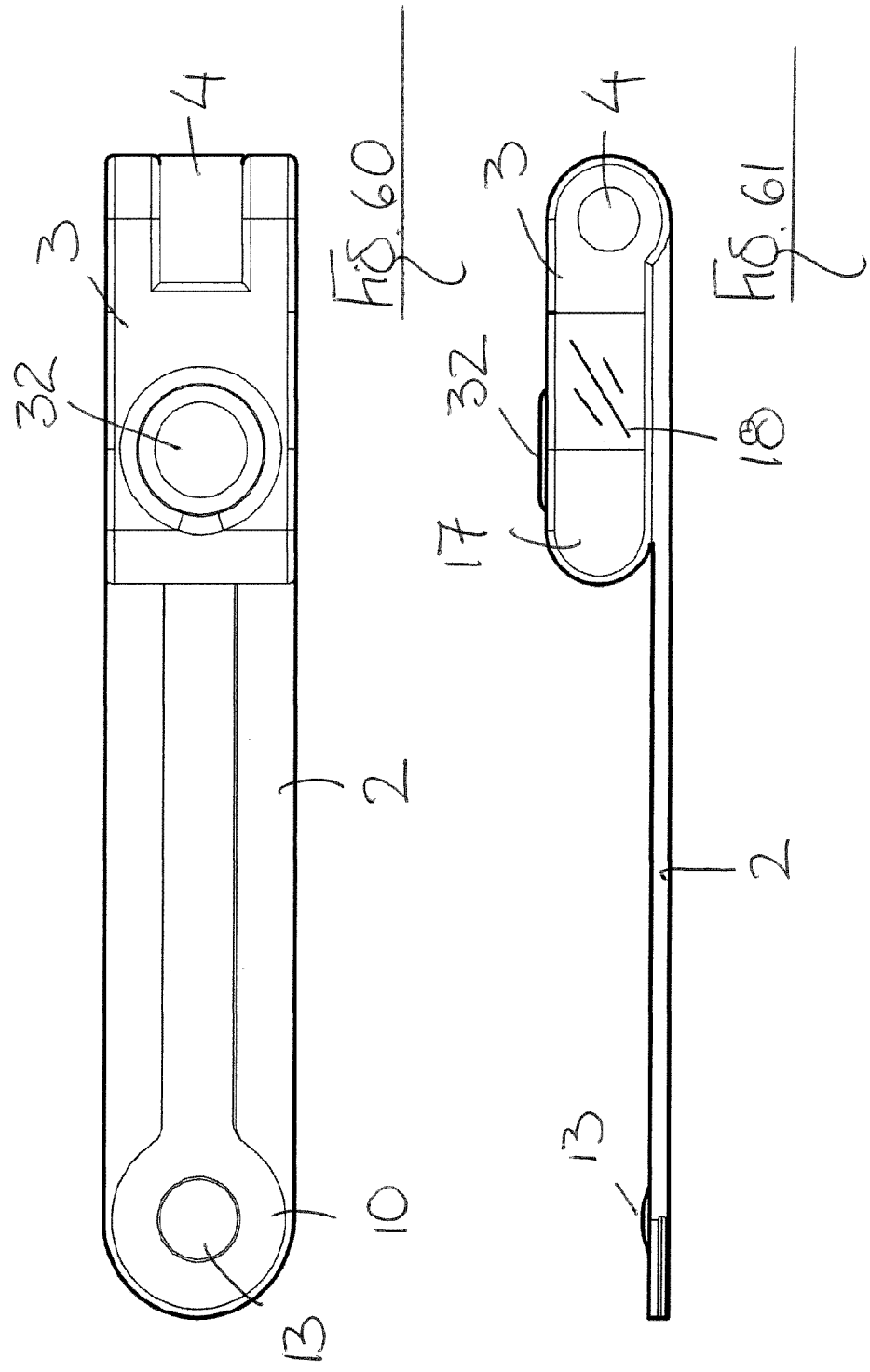

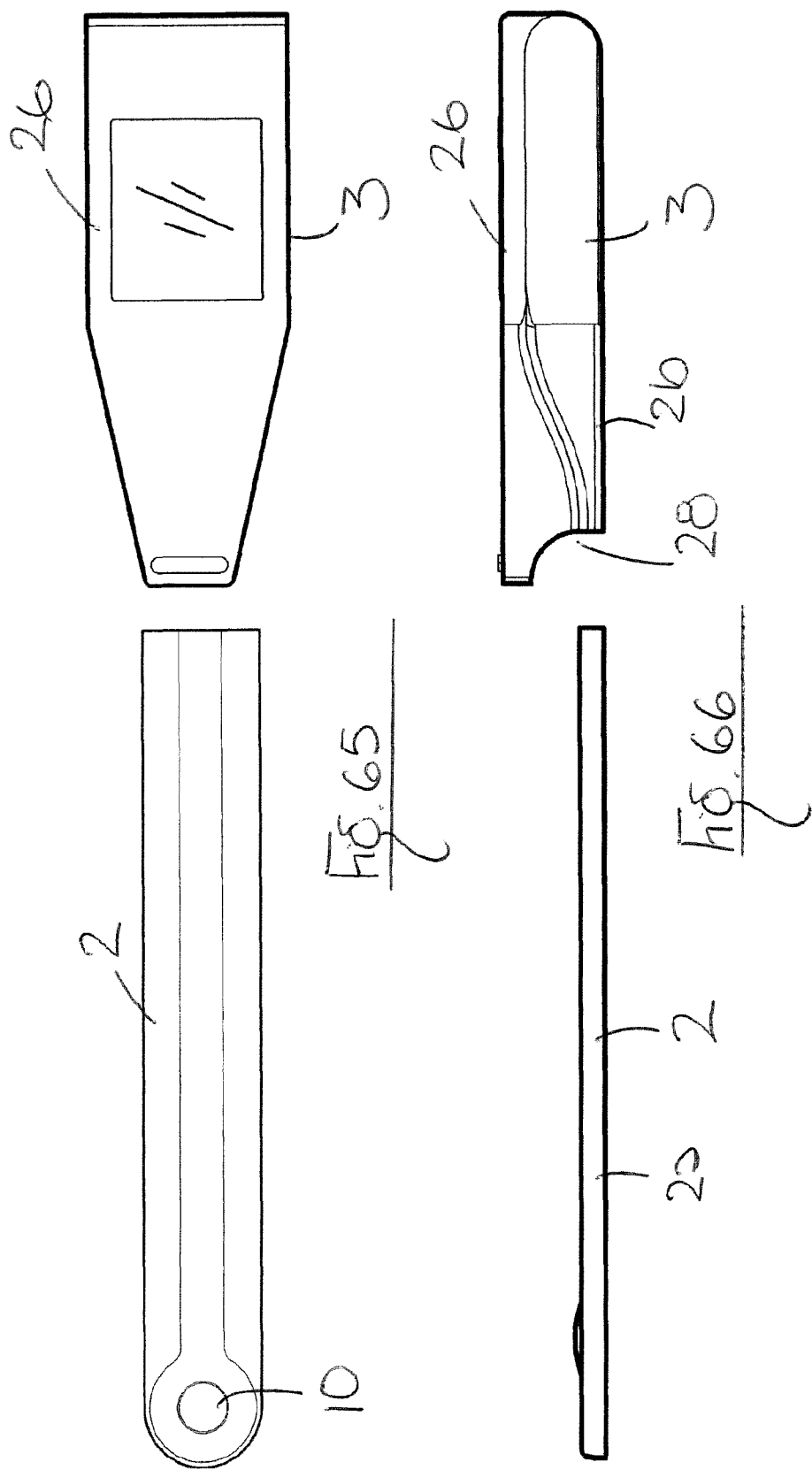

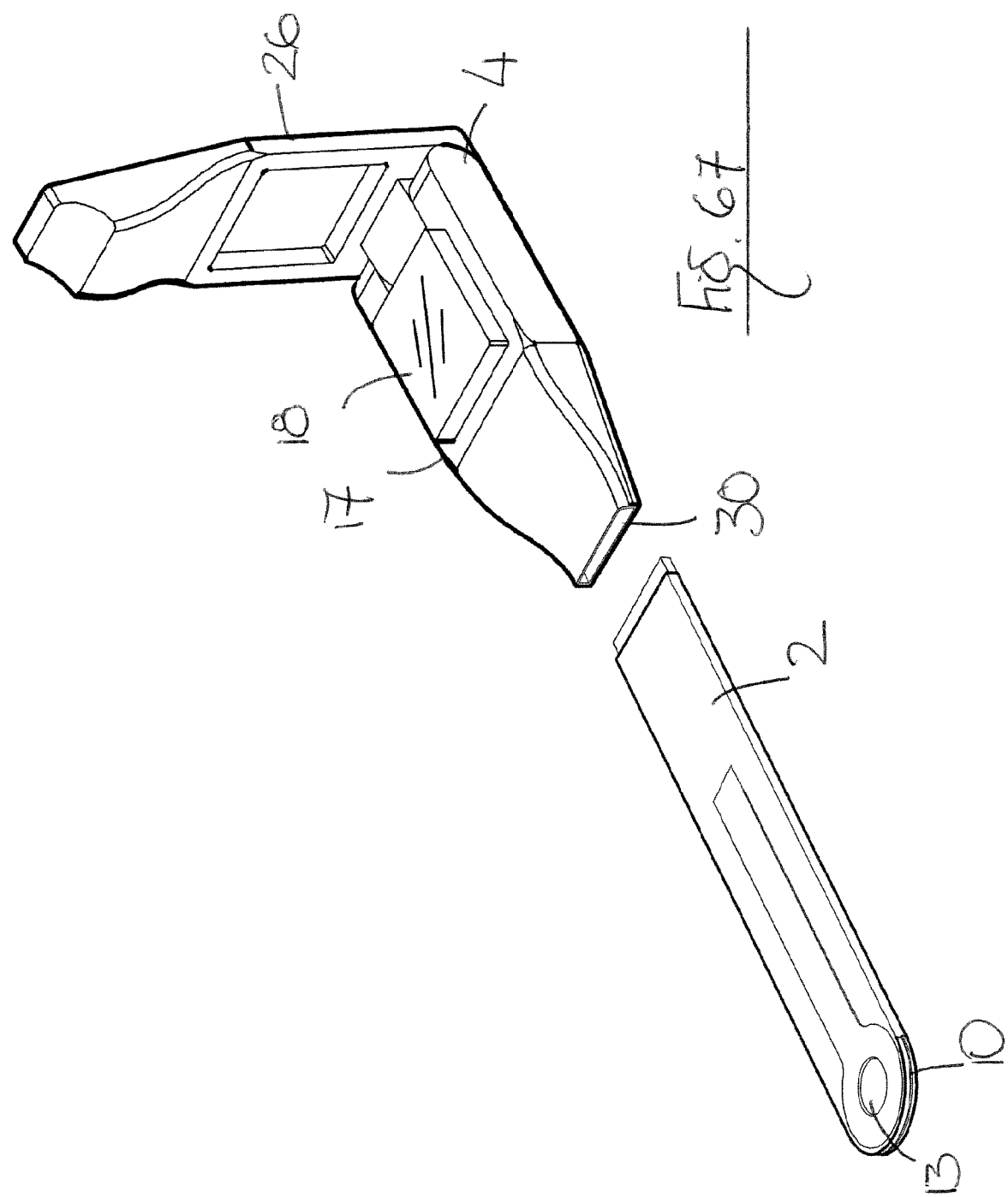

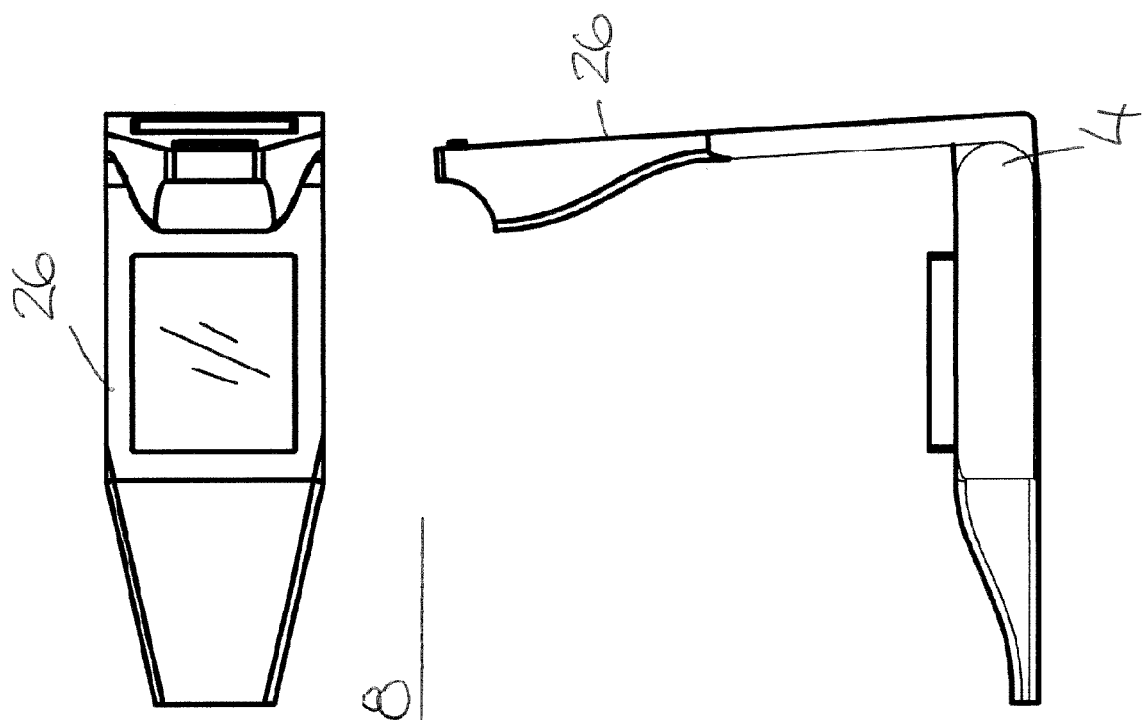
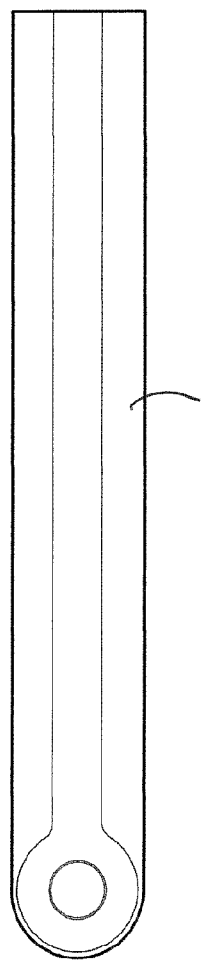
Fig. 68
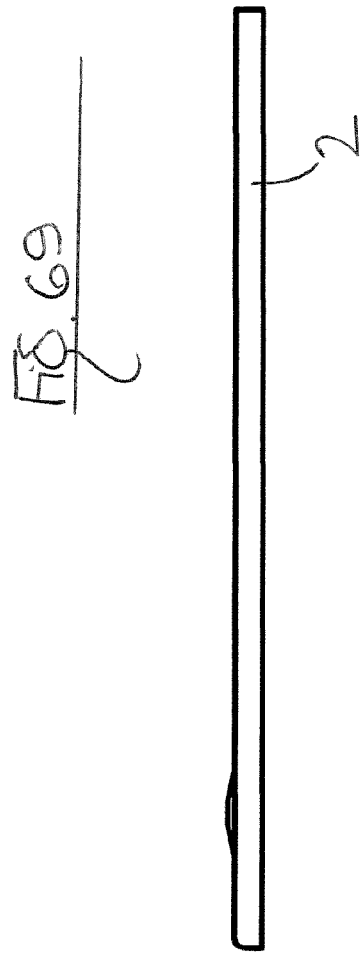
Fig. 69

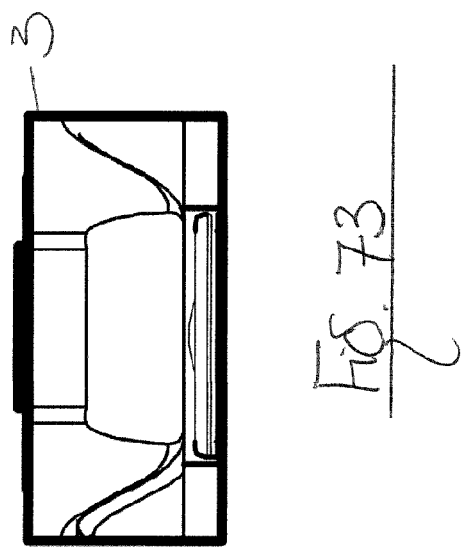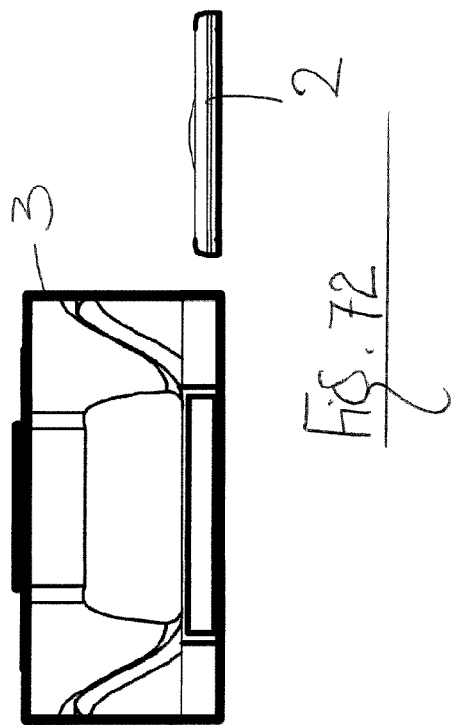

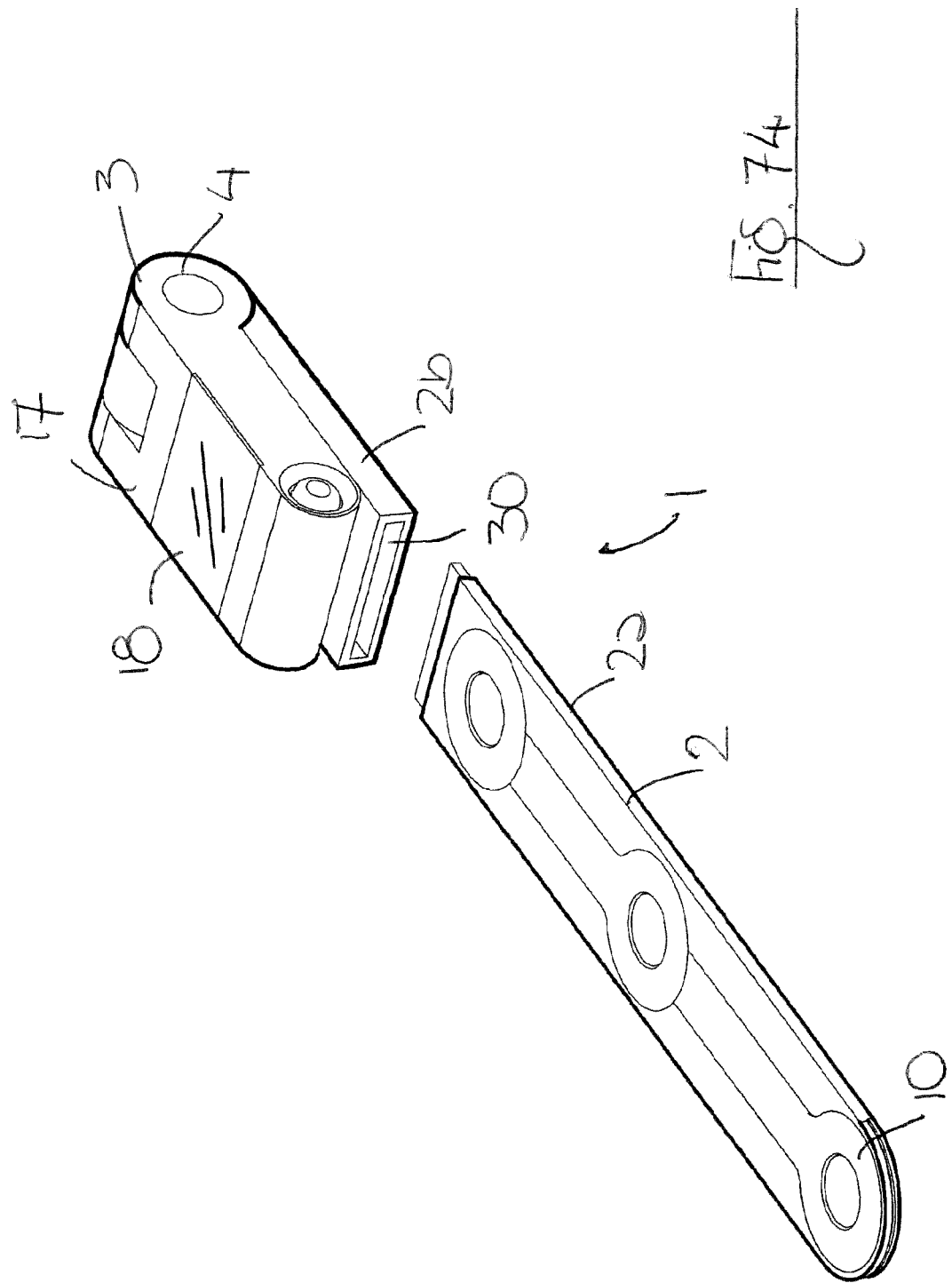

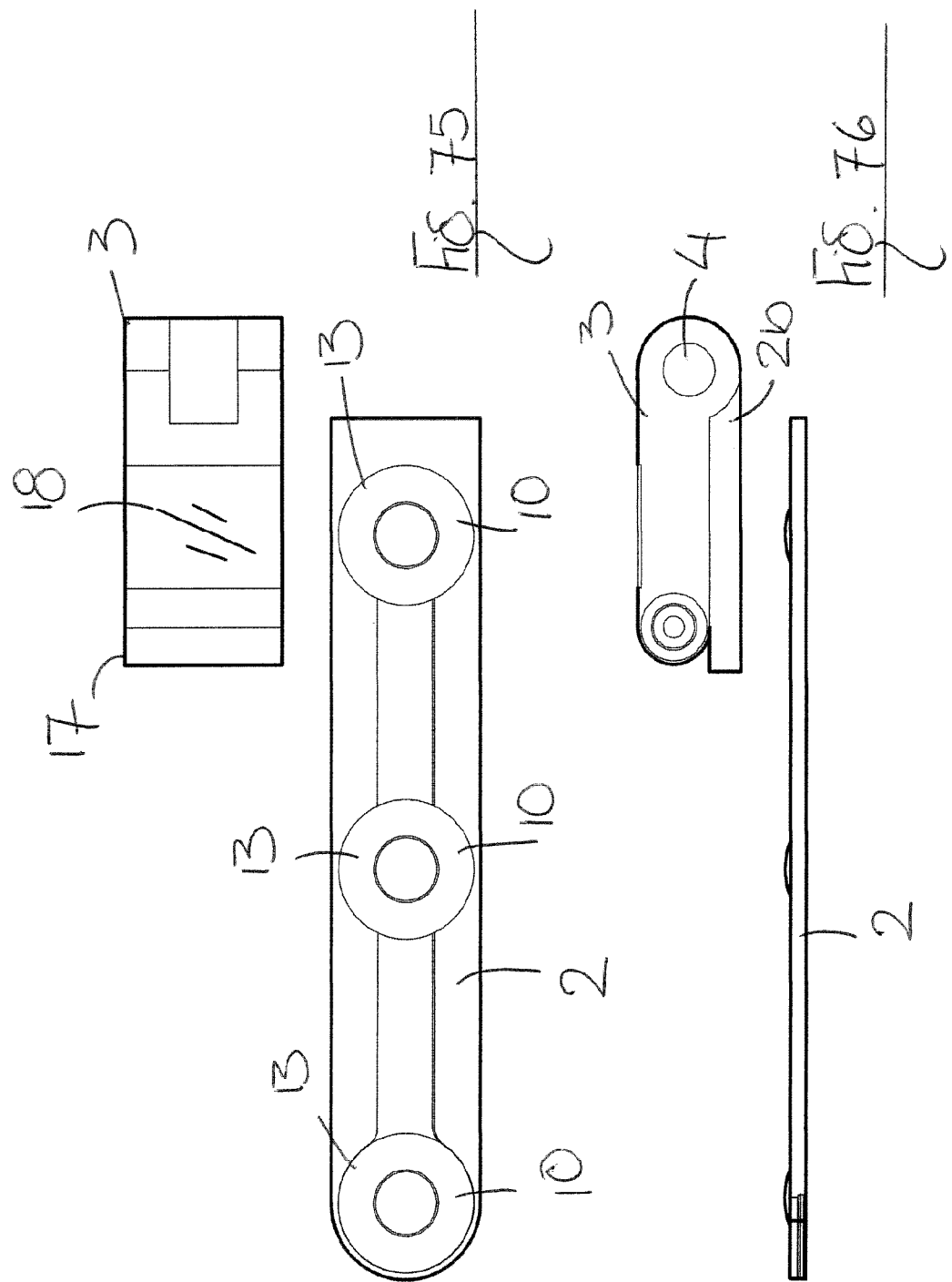

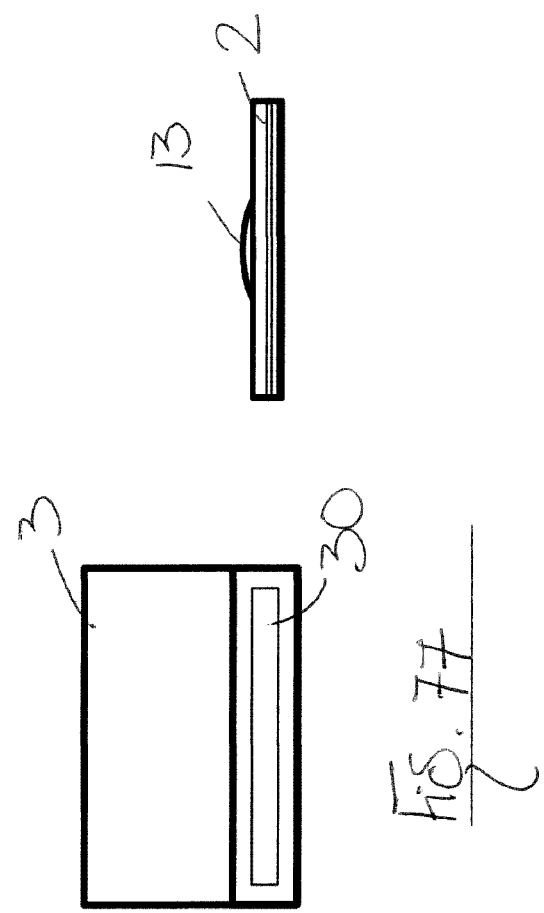

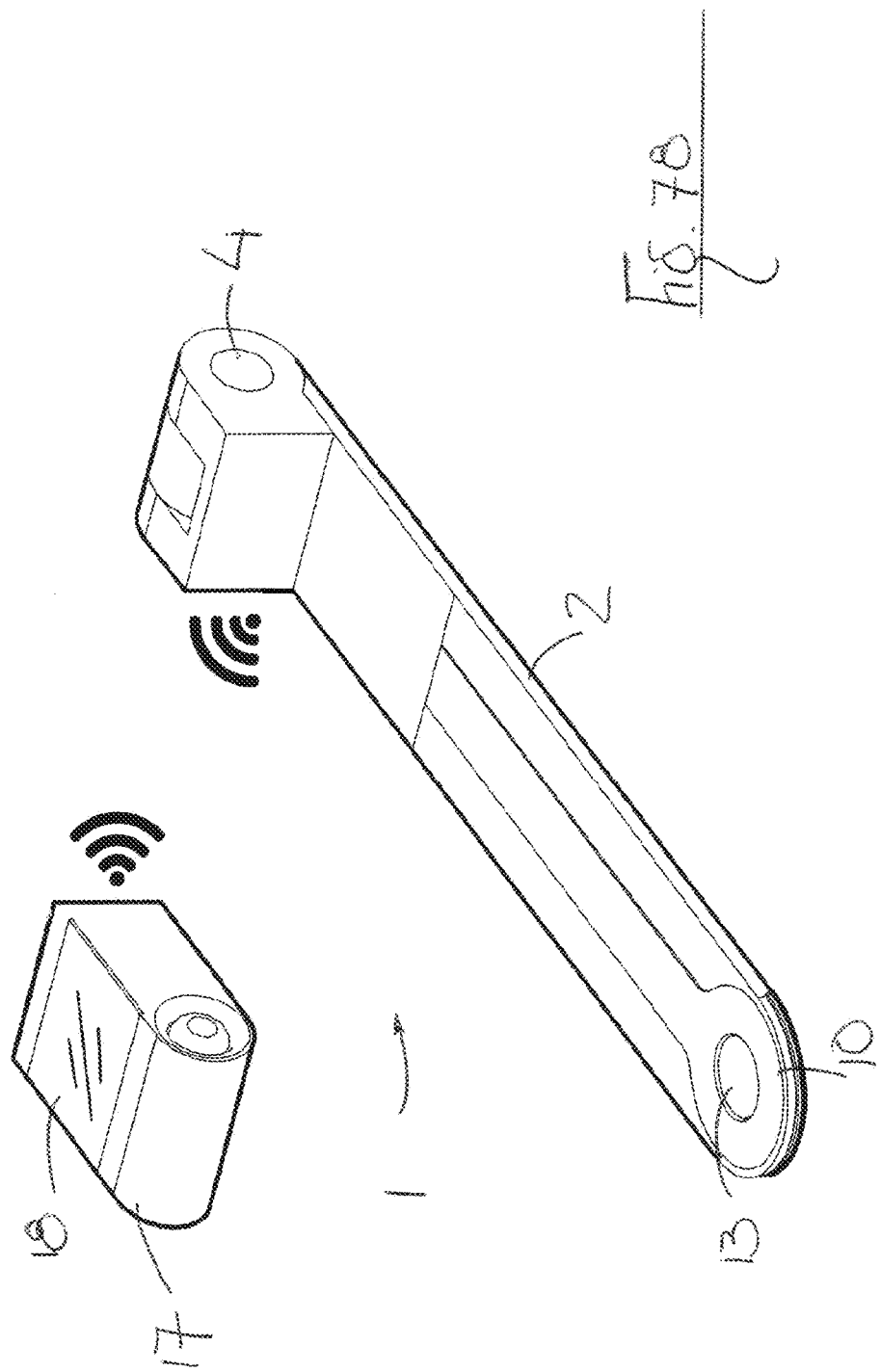

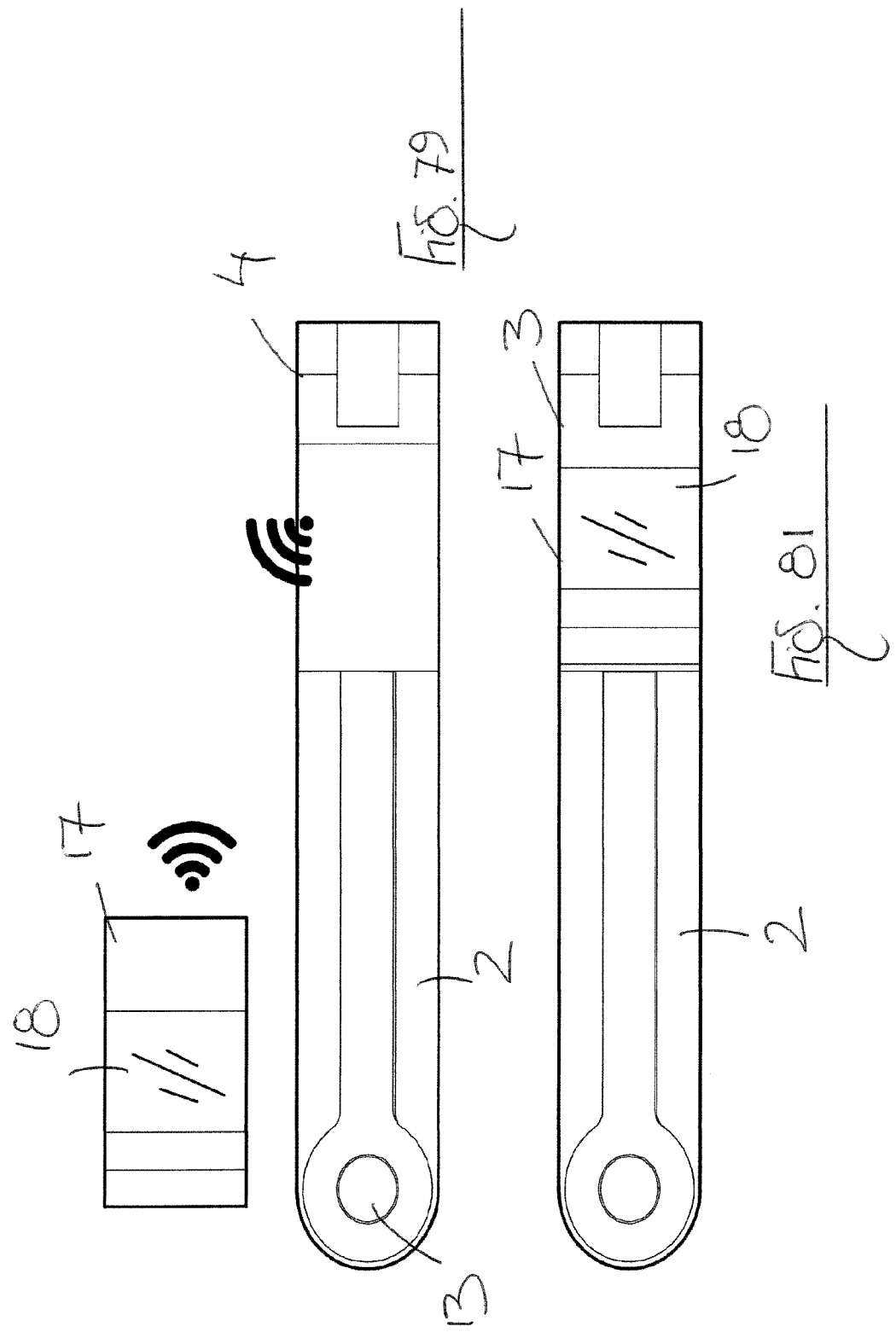

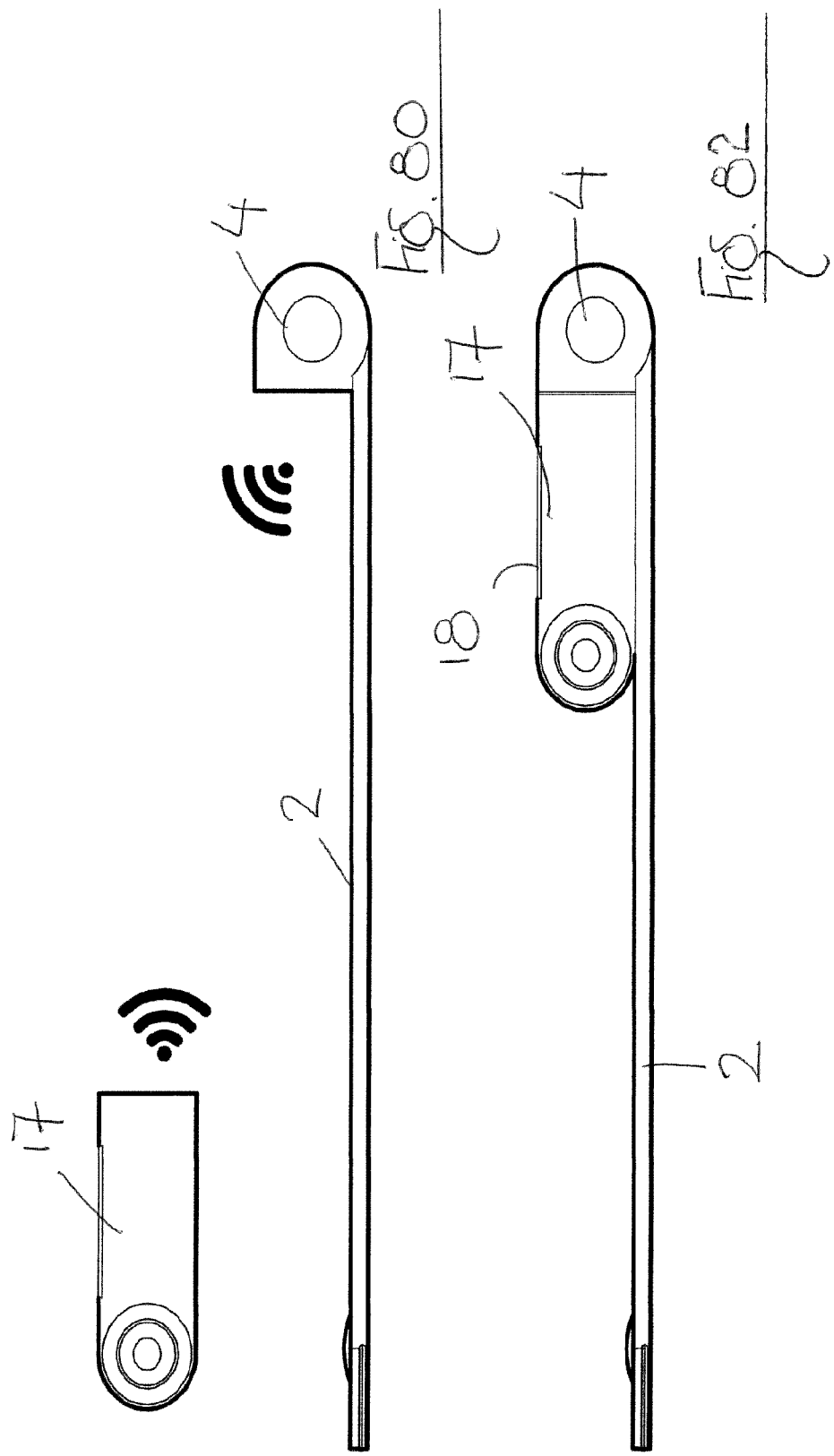

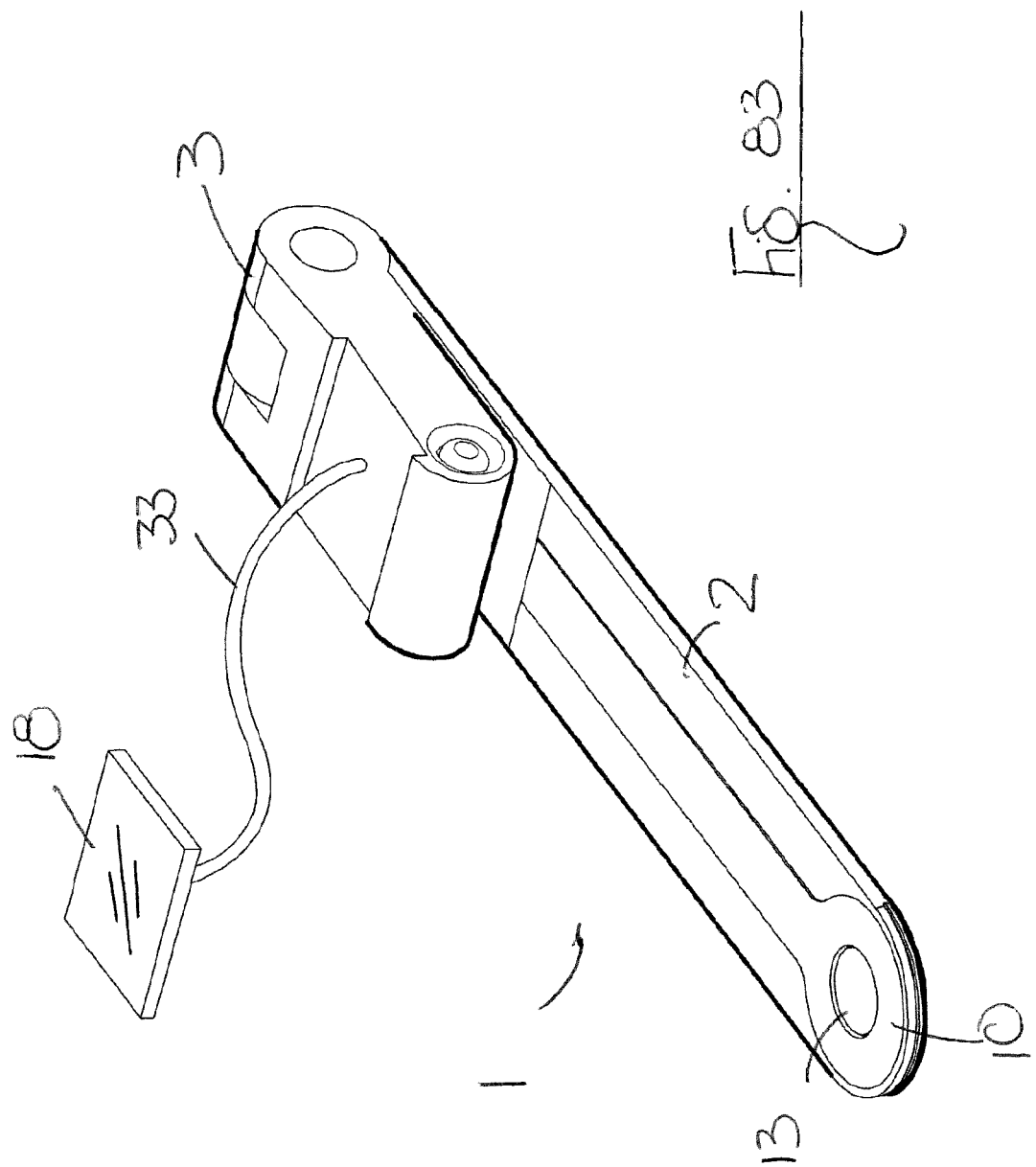

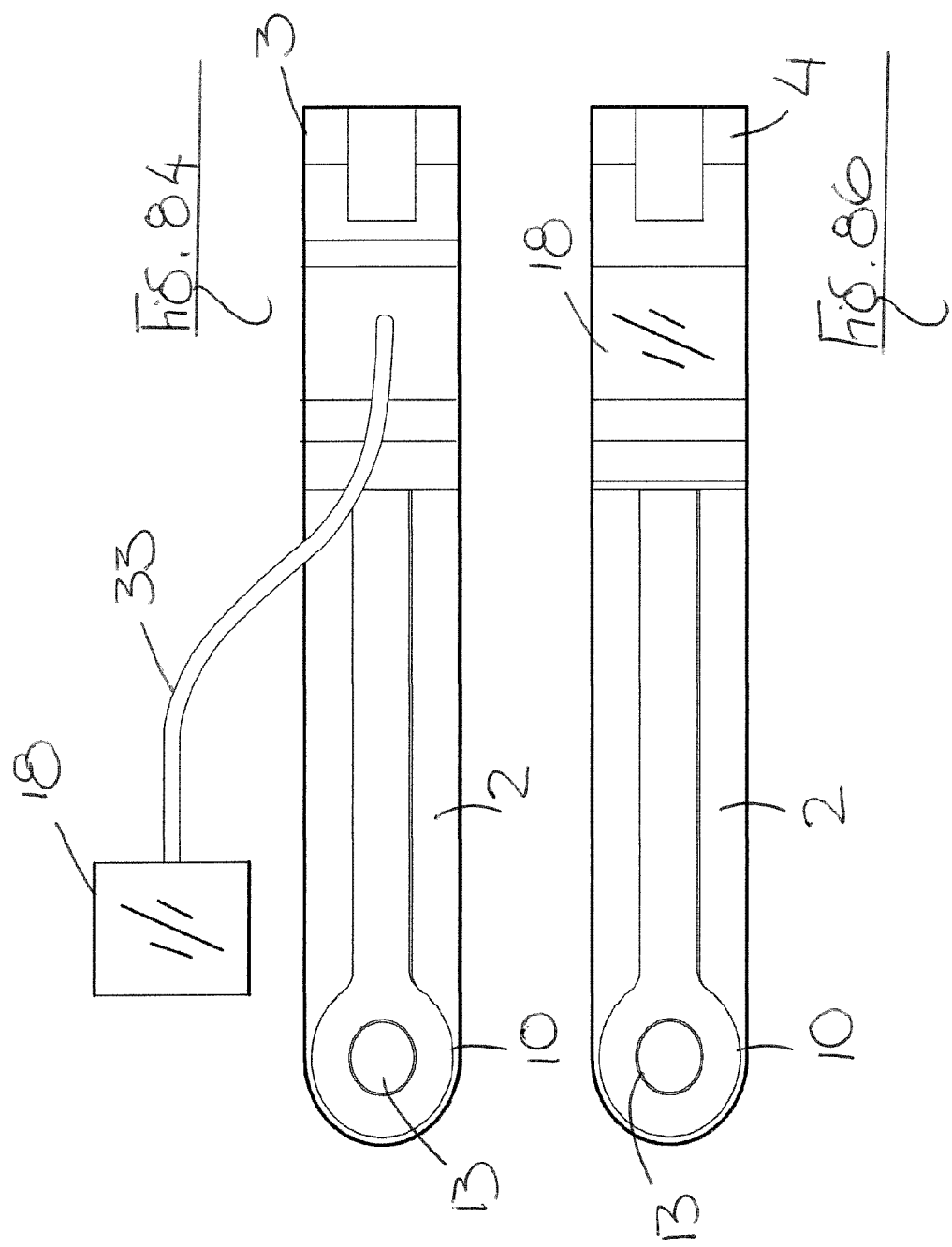

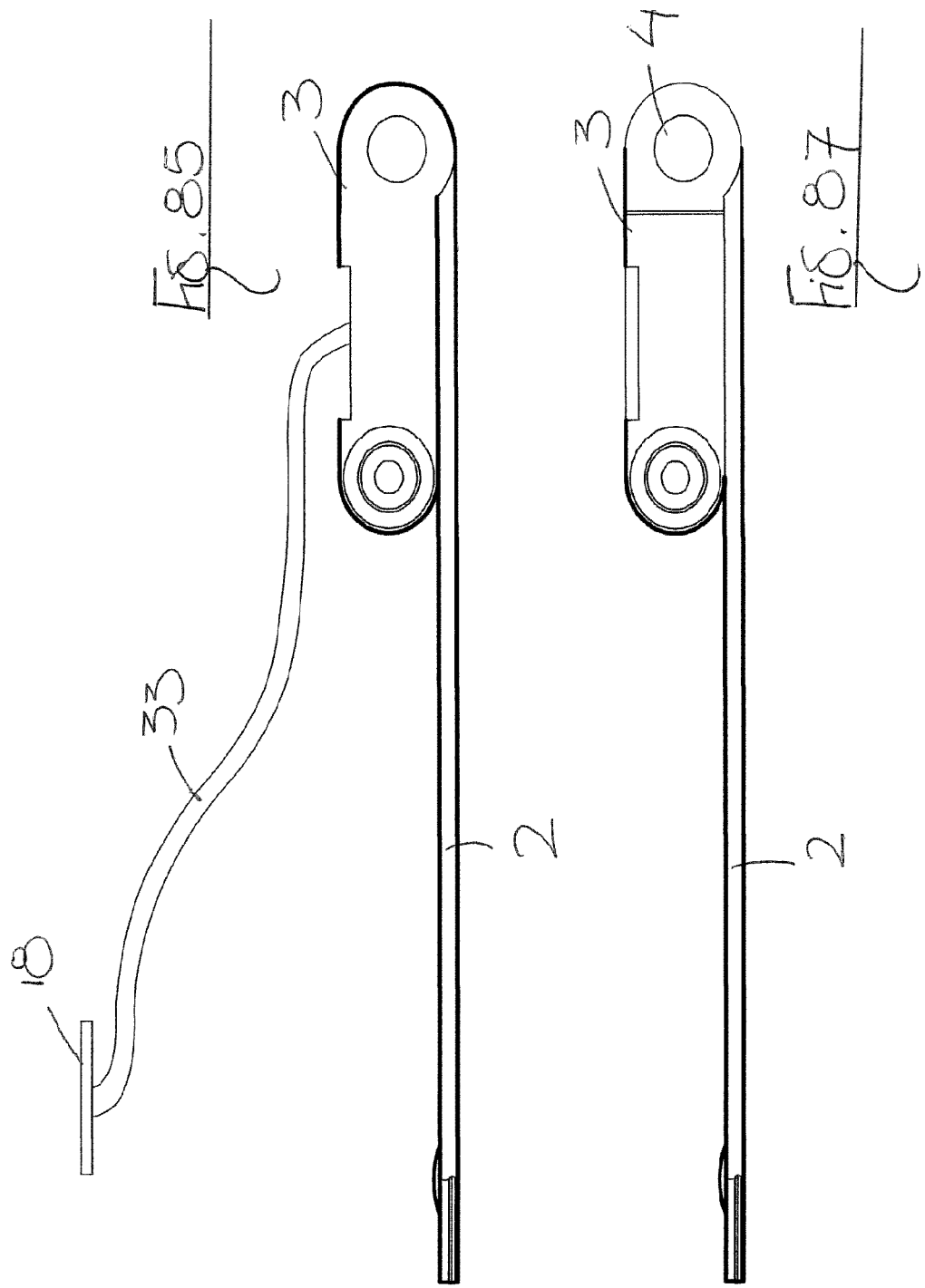

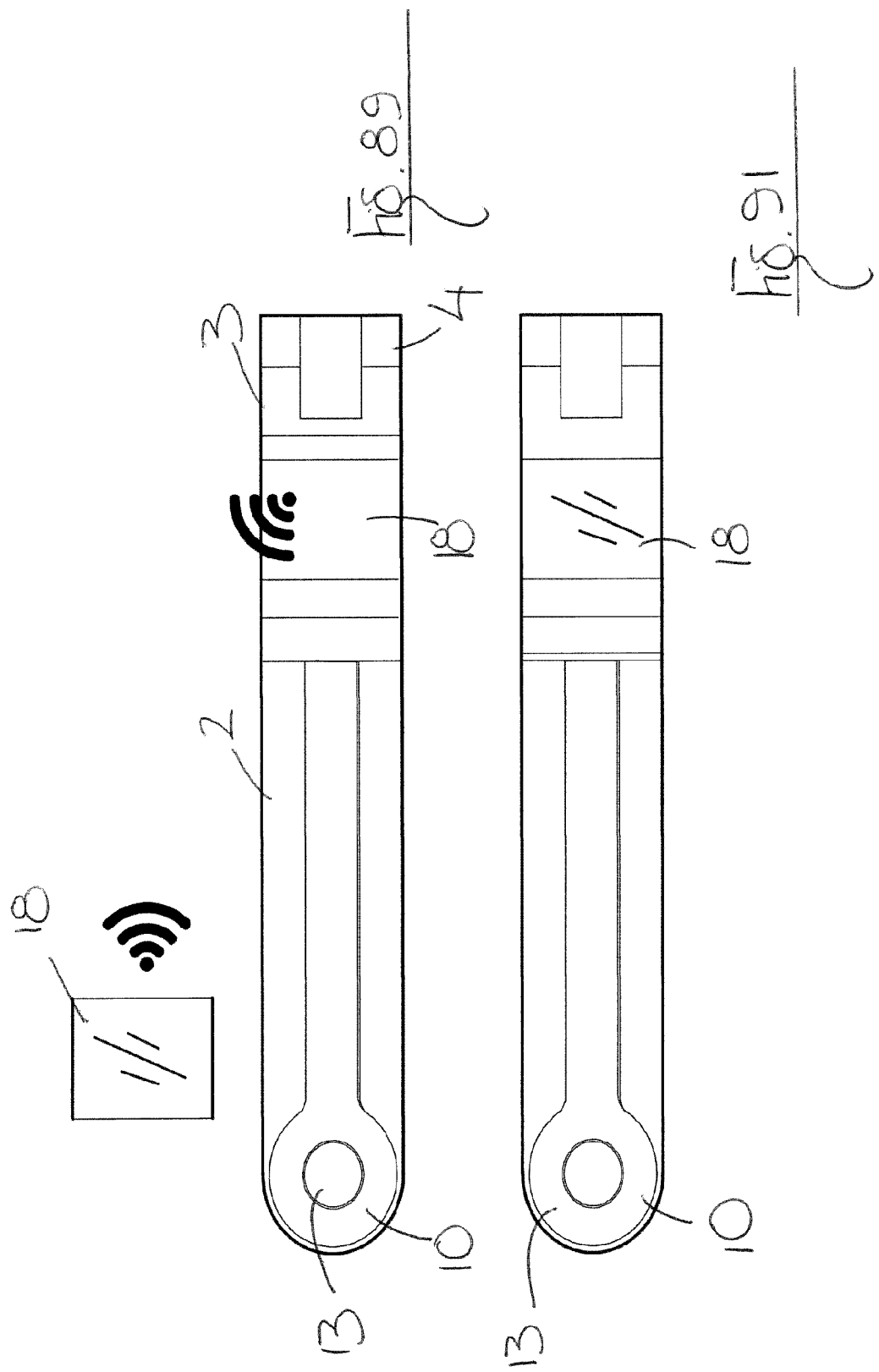

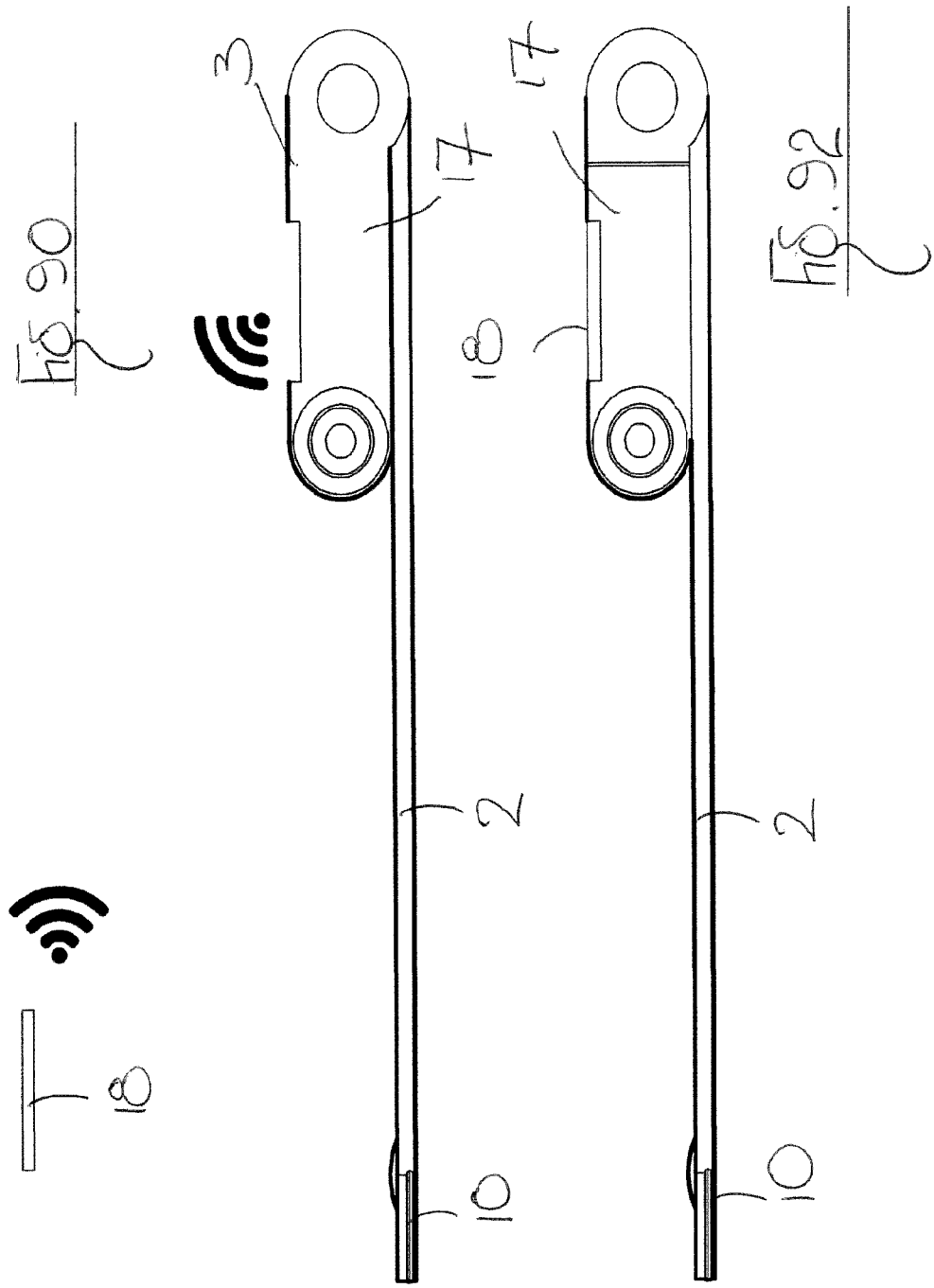

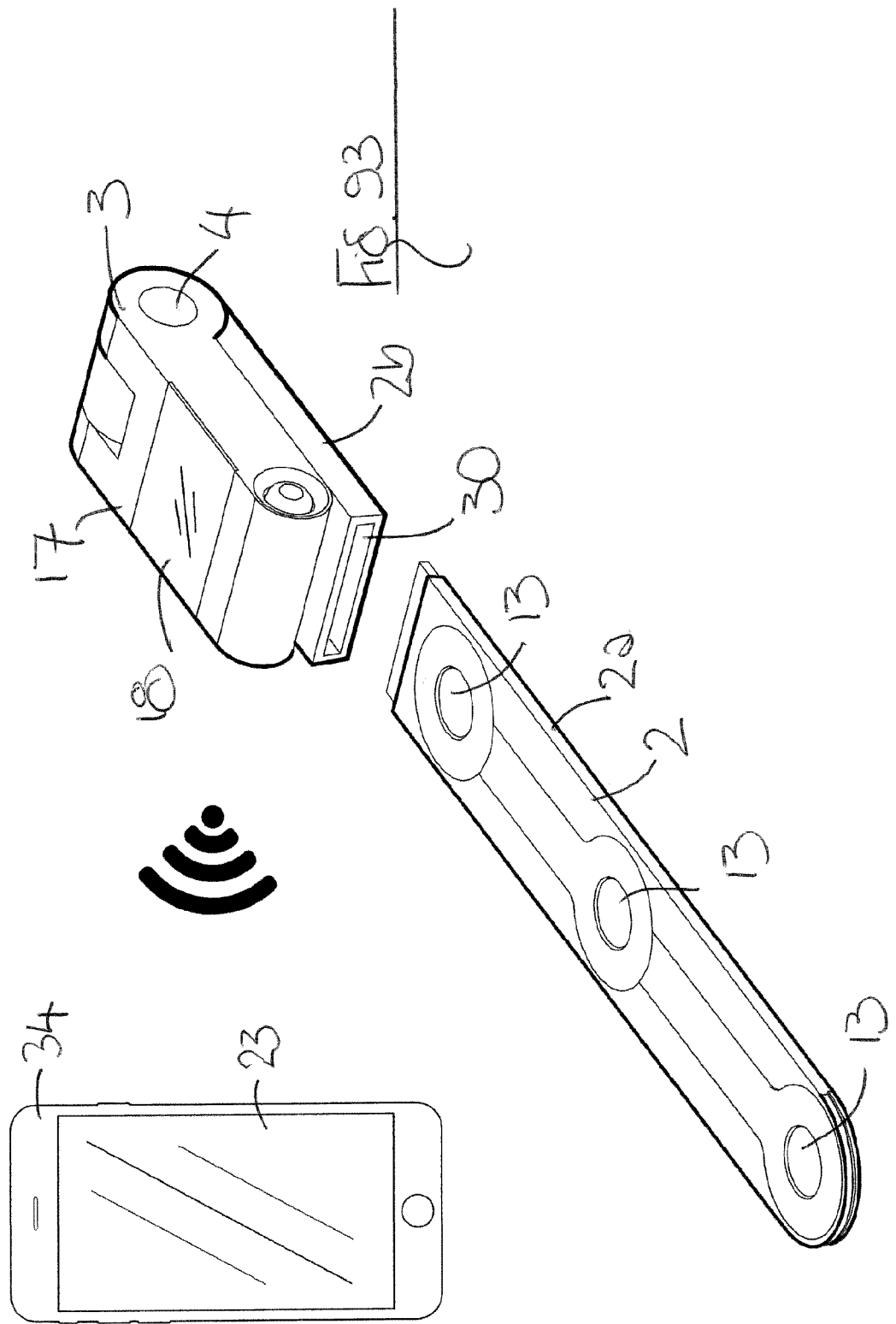

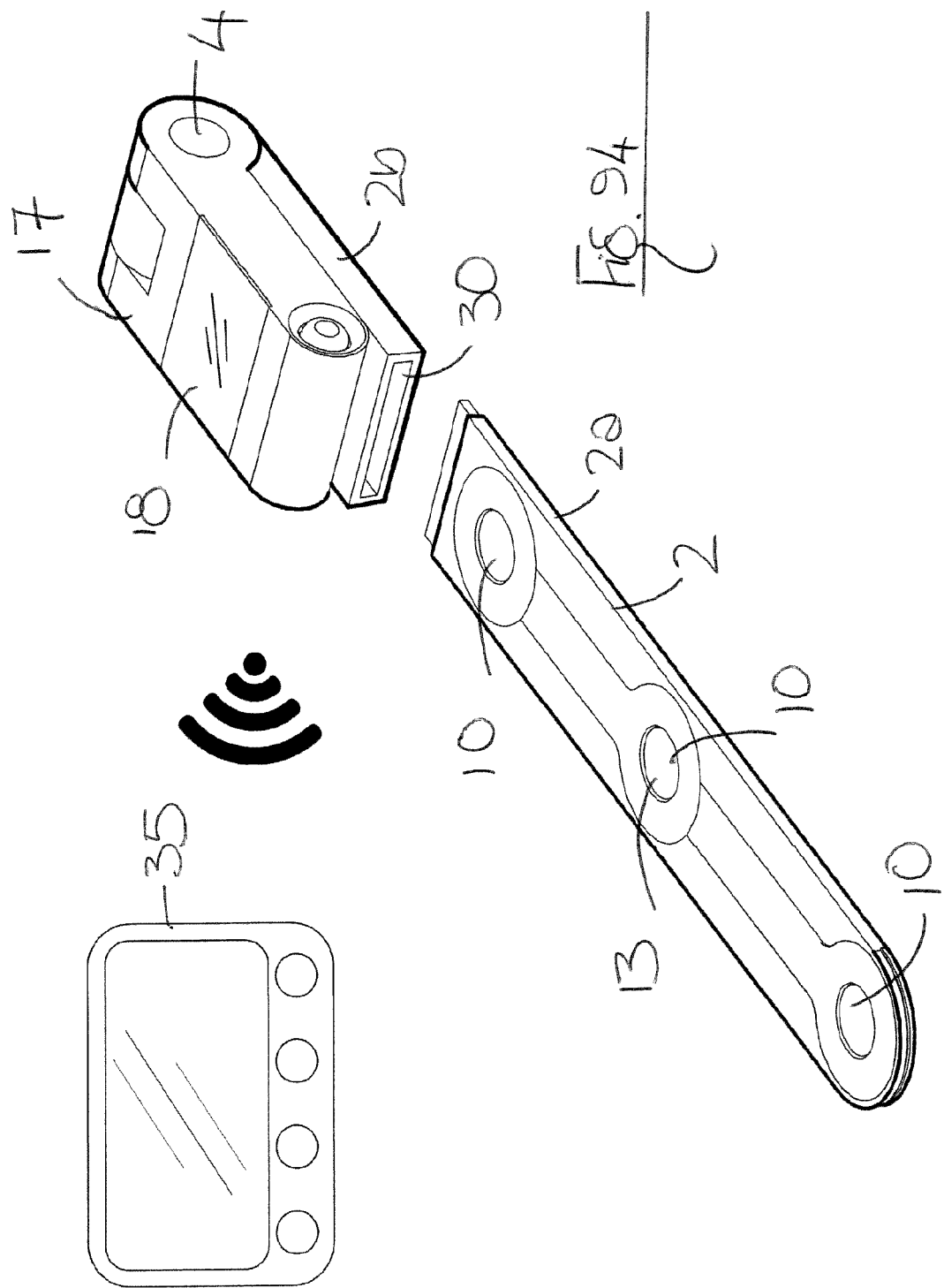

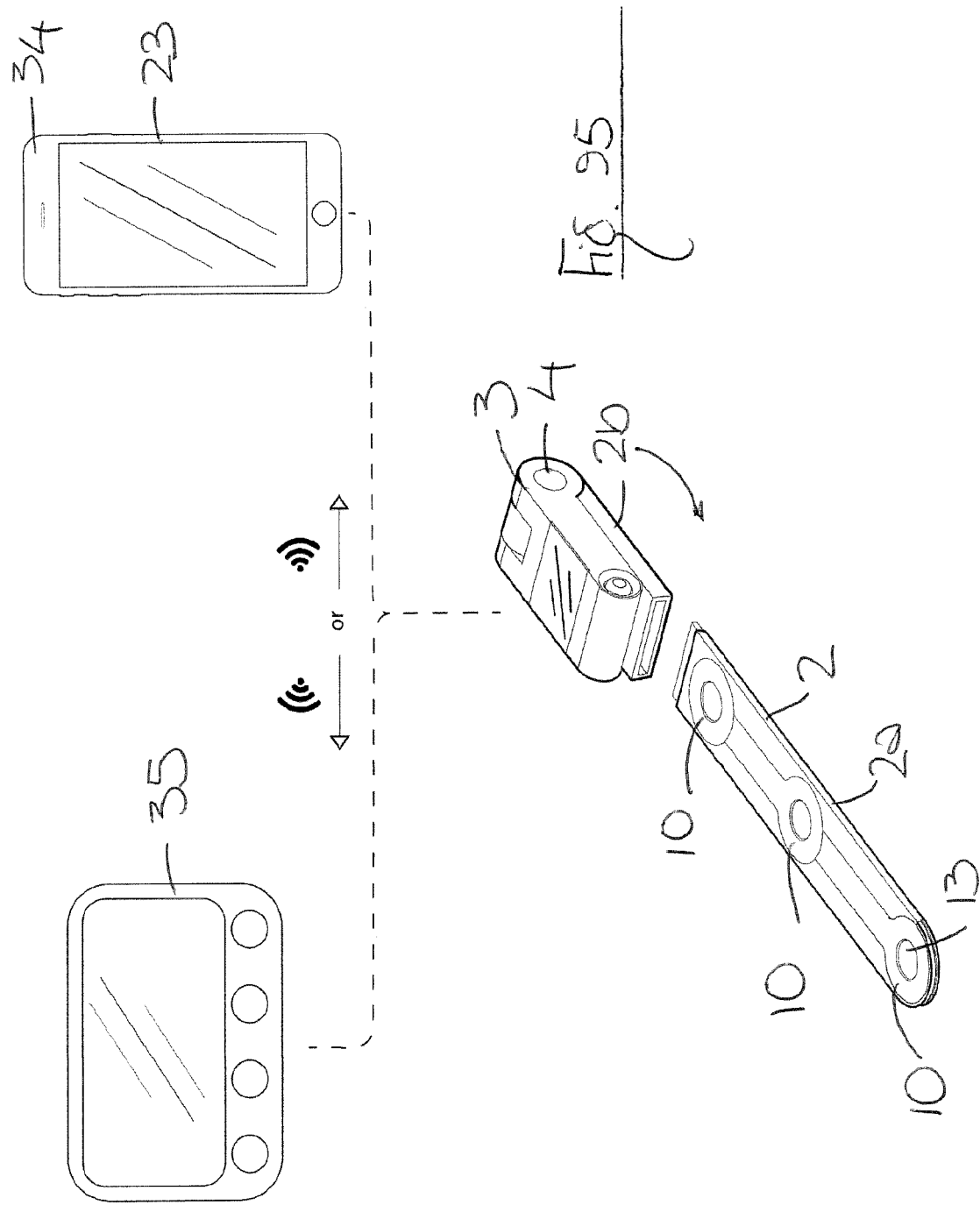

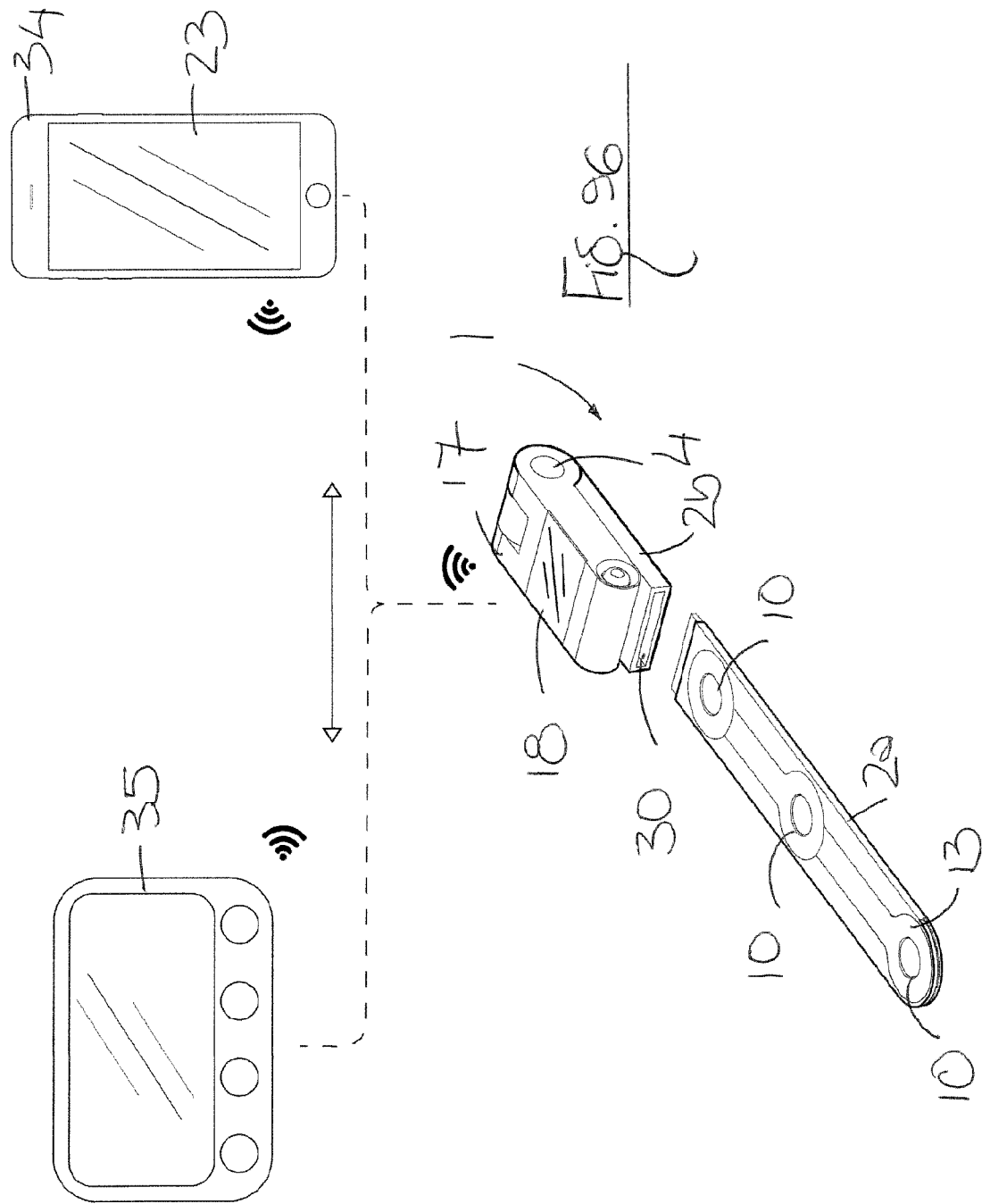

PRESSURE SENSING DEVICE FOR USE WITH A COMPRESSION BANDAGE

INTRODUCTION

This invention relates to a bandage pressure sensing device for use with a compression bandage and to a pressure sensing system comprising the pressure sensing device and a compression bandage. The invention also relates to a method of indicating the pressure applied by a compression bandage to a human or animal body and to a method of treating an indication with a compression bandage.

BACKGROUND OF THE INVENTION

Venous leg ulcers (VLUs) stem from a pathological change in the skin and subcutaneous tissues, resulting from chronic superficial and/or deep venous insufficiency and an associated accumulation of blood in the lower limbs. The current gold standard treatment for venous leg ulcers (VLUs) includes cleansing and debriding the wound, applying an appropriate dressing (including topical antimicrobials if required), and using compression therapy in the form of bandages. Compression therapy is designed to overcome venous insufficiency by providing an external force that works in concert with the body's natural pump functions, such as the contraction and relaxation of the calf muscle, to promote venous return.

There are a large variety of compression therapies based on different degrees of elasticity (e.g. inelastic, short stretch and long stretch bandages), layering (e.g. single-, two- and four-ply systems), adjustability (e.g. Velcro wrap devices) and actuation (e.g. intermittent pneumatic compression). While there is some debate as to the most effective form of compression therapy, there is consensus that compression therapy is better than non-compression and different forms of compression can have similarly high rates of successful treatment when used correctly in experienced hands.

Despite the application of pressure being core to the mechanism of compression therapy, and the desire for consistent, evidence-based treatments of VLUs, the application of standardised pressure is rarely achieved in clinical practice. For example, in a study of 891 healthcare providers, less than 10% were able to achieve a specified pressure of 50-60 mmHg upon applying a short-stretch compression bandage, while others have shown that professional experience has no bearing on adequate application of pressure.

This uncertainty in the application of correct pressure is a serious limitation in the current provision of treatment for several reasons. Firstly, there is strong evidence to suggest that a higher compression (e.g. >40 mmHg) is more effective than a low compression pressure (e.g. ≤20 mmHg) in promoting ulcer healing, so incorrect pressure may be ineffectual. Secondly, mixed aetiology, arteriovenous ulcers occur in 15-30% of ulcer patients, and when the ankle-brachial pressure index (ABPI) is moderate (0.5>ABPI≤85) compression should only be applied cautiously to maintain circulation, so incorrect pressure may be dangerous. Finally, proper investigation of conflicting reports on the optimal form of compression therapy is hampered by the inability to reliably assess the provision of treatment in the context of VLU healing. For example, debate as to whether graduated pressure should be "degressive" (ankle>calf, as with traditional compression therapy) or "progressive" (calf>ankle) is invalid if the treatment provided is unknown. Taken together, these points suggest that delays or failures in VLU healing may be attributed to an inability to accurately assess and consistently deliver compression therapy at pressure levels that are clinically proven.

Patient non-compliance is another issue that hampers compression therapy, ranging from 2% to 42% of patients in randomised controlled trials, or 9.7% to 80% in community studies. Furthermore, compliance can have a dramatic impact on the healing rate of VLUs, with one study reporting a 78% healing rate in compliant patients versus 29% in non-compliant patients after 6 months. The basis for non-compliance is complex and patient-specific. Common issues arising in non-compliant patients include pain or discomfort due to a sensation of leg constriction, an inability to wear shoes of preference due to the bandaging of the foot, aesthetically displeasing (e.g. bulky) bandaging, or a lack of self-discipline.

Accordingly, to provide its clinical function, a compression bandage has to be able to deliver an appropriate amount of compression to the leg. The typical levels of compression that are considered acceptable are 40 mmHg at the ankle, up to 20 mmHg below the knee. In addition to knowing the level of pressure during application, it is also important that the pressure is monitored and adjusted overtime if efficacious and safe levels of therapy are to be maintained. This is because pressure can decrease significantly (e.g. with a reduction in swelling). Similarly, the monitoring of pressure over time can be used as a means of monitoring compliance and provide a tool for concordance. In short, two primary causes of delayed healing in VLUs treated with compression therapy are inadequate application of pressure and patient non-compliance.

Accordingly, various pressure sensing devices have been developed for measuring sub-bandage pressure during compression therapy which can be broadly divided into two categories: a) individual (separate) pressure sensing devices, which are thin, flexible devices capable of being inserted beneath or between layers of compression bandages and b) inbuilt pressure sensing devices, which are intrinsically incorporated within the material of the compression bandages.

Examples of known individual pressure sensing devices include pneumatic, capacitive and resistive pressure sensors. However, the known individual pressure sensing devices suffer from a number of disadvantages ranging from inaccuracy, high costs, hysteresis errors and creep, susceptibility to interferences from temperature, humidity and fluids. More generally, a significant limitation of known individual pressure sensing devices is extreme difficulty in correctly placing the devices, which can greatly impact accuracy. Moreover, the known individual pressure sensing devices also suffer from restriction on the region of measurement once the device has been placed because of difficulty in removing the device and repositioning within an already applied bandage.

Examples of known inbuilt pressure sensing devices include electronic devices based on electroconductive yarns, visual markers and non-electric pressure guides. However, these devices also suffer from a number of disadvantages ranging from difficulties applying the bandages incorporating the inbuilt pressure sensing devices to subjective assessment of the visual markers leading to errors to the pressure measurement locations on the body being limited to the location of the markers on the bandages. In short, known inbuilt pressure sensing devices are restrictive in their region of measurement and can be inaccurate under varying patient profiles (e.g. leg size, weight, etc.).

SUMMARY OF THE INVENTION

According to the invention there is provided a bandage pressure sensing device for indicating the pressure applied by a bandage to a human or animal body wherein the bandage pressure sensing device comprises a pressure sensing clip comprising:
- an outer arm;
- an inner bandage penetrating arm having a pressure sensing region,
- a piezoelectric pressure sensor at the pressure sensing region, and
- a hinge between the outer arm and the inner bandage penetrating arm.

In one embodiment, the outer arm is movable between an open position and closed position about the hinge. In one embodiment, the outer arm is movable to an open position at an angle of between about 90° and 180° with respect to the inner bandage penetrating arm. Suitably, the hinge comprises a locking or fixing mechanism to lock or fix the hinge in an open or closed position. This facilitates unhindered bandage application or securement of the device to the bandage. Advantageously, the hinge comprises a bandage grip. In one embodiment, the bandage grip comprises a clip. In one embodiment, the outer arm or hinge may include features to aid the grip e.g. adhesive/cohesive/roughened/catching/magnetic materials for the outer arm or locking/torque inducing/ratchet/spring mechanisms for the hinge.

In one embodiment, the inner bandage penetrating arm is detachable from the device and/or is disposable. The detachable inner arm allows for versatility in design features to vary material, mechanical properties, length, shape, number of pressure sensing regions, bandage types, disease states, etc within the same electronic device.

In one embodiment, the detachable and non-detachable inner bandage penetrating arm is adapted to communicate information to the device. Preferably, the inner bandage penetrating arm is adapted to communicate information to the device via an on board chip.

Preferably, the inner bandage penetrating arm is detachable from the device at a mounting to provide a mechanically and electronically stable coupling.

In one embodiment, the inner bandage penetrating arm comprises an arm body having a hinge end and an insertion end and a semi-rigid spine extends between the hinge end and the insertion end.

Advantageously, the semi-rigid spine has a flexural rigidity configured to protect the pressure sensing region from bending. Preferably, the semi-rigid spine also has a flexural rigidity configured to enable it to slide under a bandage without bending. Preferably, the semi-rigid spine has a degree of flexibility to enable the pressure sensing device to conform to a limb.

In one embodiment, the semi-rigid spine has a flexural rigidity in a range from about 0.0007 N·m$^2$ to about 0.03 N·m$^2$.

In one embodiment, the semi-rigid spine comprises a bending enhancer to enhance bending under directional loads.

Suitably, the semi-rigid spine is substantially flat.

Preferably, the width and thickness of the semi-rigid spine is minimised to avoid obtrusion and a reduction in the impact upon the pressure measurement functionality.

Suitably, the inner bandage penetrating arm, including the pressure sensing region, is less than about 30 mm wide.

Preferably, the bandage pressure sensing device further comprises a force concentrator over the pressure sensing region. More preferably, the force concentrator comprises a solid elastic disc of material, a dome or a protrusion. Most preferably, the diameter or width of the force concentrator is equal to or less than the diameter or width of the pressure sensing region.

Advantageously, the aspect ratio (height:diameter) of the force concentrator is greater than 0.2:8 (1:40).

In one embodiment, the maximum height of the force concentrator above the outer edge of the inner arm body has a minimum ratio of the diameter/width of the inner arm housing of 1:20.

Preferably, the inner bandage penetrating arm further comprises a compliant layer, which provides a non-traumatic protection to the skin from the semi-rigid backbone.

Optionally, the compliant layer comprises a load distributing mechanism to distribute the load of the semi-rigid spine. Suitably, the load distributing mechanism is selected from the group consisting of wings, flaps, curved surfaces, cushions, bladders, elastic or viscoelastic material properties, increased surface area in relation to the semi-rigid spine and curved geometries.

The compliant layer is typically provided on a face of the semi-rigid backbone facing the skin, but in one embodiment may envelope, partially or totally, the backbone and/or the pressure sensing region including the force concentrator. A further moisture protective/friction reducing coating may be added to surface of the inner bandage penetrating arm.

Suitably, the skin compliant outer layer has a Shore A hardness of about 20 to about 90.

Preferably, the inner bandage penetrating arm comprises one or more depth indicators to, for example, indicate a required depth of insertion of the inner bandage penetrating arm or as a marker to help define the amount of bandage overlap. More preferably, the depth indicator/s comprise a raised edge or a visual marker on the inner bandage penetrating arm.

Suitably, the bandage pressure sensing device further comprises an attachment mechanism to assist in securing the pressure sensing device to a bandage. Preferably, the attachment mechanism is located on the outer arm. More preferably, the attachment mechanism comprises a hook and loop material, spring clips, buttons, hooks, magnets, or adhesives.

Preferably, the inner bandage penetrating arm comprises multiple pressure sensing regions.

Preferably, the hinge comprises a locking mechanism to lock the hinge. Suitably, the locking mechanism comprises a ratchet or a torque inducing mechanism.

In one embodiment, the piezoelectric pressure sensor comprises a force sensing resistor (FSR).

In another embodiment, the piezoelectric pressure sensor comprises a piezocapacitive pressure sensor.

Preferably, the pressure sensing region is positioned at a location to measure or capture pressure applied by a bandage at anatomically relevant positions.

Suitably, the pressure sensing region is at least 5 mm in width or diameter so as to ensure pressure measurement at a low range of interest and to reduce the need for an increased profile of the force concentrator.

Preferably, the outer arm comprises an electronics module operatively connected to the pressure sensing region. More preferably, the electronics module comprises a display screen.

In one embodiment, the electronics module is configured for detachment from the outer arm while remaining operatively connected to the pressure sensing region.

Optionally, the electronics module is detachable from the outer arm.

Preferably, the detachable electronics module is communicable with the device via a lead. Alternatively, the detachable electronics module is wirelessly communicable with the device.

In one embodiment, the electronics module is configured to swivel about its longitudinal axis or within a frame. Optionally, the electronics module is cylindrical in shape.

Preferably, the electronics module comprises a display screen. Optionally, the display screen is detachable from the electronics module while remaining operatively connected to the electronics module. Preferably, the display screen is operatively connected to the electronics module via a wire. Alternatively, the display screen is wirelessly operatively connected to the electronics module.

In one embodiment, the display screen comprises a side display screen on the electronics module.

In one embodiment, the device is communicable with a separate electronics device.

Preferably, communication between the device and the separate electronics device is two-way. Suitably, the separate electronics device is a computer or a controller. Optionally, the device is wirelessly communicable with the separate electronics device.

Suitably, the outer arm comprises an operating switch configured to switch the device or display between a high activity mode and a low activity mode.

Preferably, the high activity mode is enabled by a signal sent by a digital interface.

Alternatively or in addition, the high activity mode is enabled by the opening of the hinge to a pre-set angle.

In one embodiment, the low activity mode is enabled upon reaching a limit of inactivity.

In an embodiment of the invention, the inner bandage penetrating arm comprises a region of greater flexibility between the pressure sensing region and the hinge. Preferably, the region of greater flexibility is adjacent to the pressure sensing region or between multiple pressure sensing regions. Suitably, the region of greater flexibility is defined by the material of the inner bandage penetrating arm. Alternatively or in addition, the region of greater flexibility is defined by the dimensions of the inner bandage penetrating arm. Alternatively or in addition, the region of greater flexibility is defined by mechanical defects in the inner bandage penetrating arm. Alternatively or in addition, the region of greater flexibility is defined by springs on the inner bandage penetrating arm.

In a further embodiment, the pressure sensing device comprises a machine readable unique identifier to enable identification of the device by mobile applications. In one embodiment, the machine readable identifier can be employed to pair the device. Suitably, the machine readable unique identifier comprises an RFID or QR code. Alternatively or in addition, the pressure sensing device comprises a machine readable objective.

In one embodiment, the bandage pressure sensing device comprises a toggle button to alter the device calibration for a range of leg circumference sizes. In one embodiment, the toggle may be affected by a digital interface (e.g. app or separate electronics unit). Device calibration modes may also be altered by the digital interface such as a mobile application, once paired.

Suitably, the bandage pressure sensing device comprises a transmitter for the transmission of wireless transmission signals to a remote digital interface. The wireless transmission signals can include live or stored data. Advantageously, the remote digital interface comprises downloadable software (for example a mobile app). Preferably, the mobile application is configured to measure the circumference of a patient's leg. This can be done in combination with an objective provide by a visual representation on the device. In one embodiment, the remote digital interface is a mobile communications device.

Therefore, generally, the invention relates to a bandage pressure sensing device for indicating the pressure applied by a bandage to a subject wherein the pressure sensing device comprises a pressure sensing clip comprising:
  an outer arm;
  an inner bandage penetrating arm having a pressure sensing region, and
  a hinge between the outer arm and the inner bandage penetrating arm.

The invention also extends to a bandage pressure sensing system comprising a pressure sensing device as hereinbefore defined and a bandage adapted or suitable for use with the pressure sensing device, software (optionally downloadable software) configured for use with a remote digital interface and to enable the digital interface communicate with the device and process data received with the device, or both. In one embodiment, the system comprises a remote digital interface. In one embodiment, the remote digital interface is a mobile communications device or a computer. In one embodiment, the software is downloadable (i.e. a mobile device "app").

In one embodiment, the invention relates to a bandage pressure sensing system comprising a bandage pressure sensing device for indicating the pressure applied by a bandage to a human or animal body wherein the bandage pressure sensing device comprises a pressure sensing clip comprising:
  an outer arm;
  an inner bandage penetrating arm having a pressure sensing region,
  a piezoelectric pressure sensor at the pressure sensing region, and
  a hinge between the outer arm and the inner bandage penetrating arm, and a bandage adapted for use with the pressure sensing device.

Preferably, the system further comprises a remote digital interface configured to receive data from the pressure sensing device. Suitably, the remote digital interface comprises a mobile application or a separate electronics device such as a computer or a controller. Preferably, the mobile application is configured to measure the circumference of a patient's leg and to communicate the measurements of the patient's leg to the device for use with defined calibration. In one embodiment, the mobile application can also be configured to capture information and the device can receive information from the mobile application relating to the therapy products used in conjunction with the device (e.g. bandage type, dressing type), or with other details relating to the patient (e.g. age, gender, BMI).

In one embodiment, the bandage adapted for use with the pressure sensing device comprises a pressure sensing device placement guide.

Preferably, the pressure sensing device is configured to act as an integrated hub for receipt, storage and transmission of signals from alternative sensors/systems.

In one embodiment, the system comprises an algorithm to determine treatment/healing interaction and/or predict conditions for optimum healing. The algorithm can predict conditions for optimum healing for each patient at each timepoint i.e. for individual patients throughout duration of treatment. Preferably, the algorithm includes a calculation step of the dosage of compression therapy received based on the measurements from the pressure sensing device. Suitably, the algorithm includes an identification step for a compression bandage.

Preferably, the bandage is adapted for use with the pressure sensing device comprises a pressure sensing device placement guide. Suitably, the bandage pressure sensing device placement guide comprises pockets, guide brackets (e.g. fabric strips), slits and the like incorporated on the underside of the bandage.

Suitably, the pressure sensing device is configured to act as an integrated hub for receipt, storage and transmission of signals from alternative sensors/systems.

The invention also extends to a method of indicating the pressure applied by a bandage to a subject comprising positioning a pressure sensing device as hereinbefore defined between the subject and the bandage.

In yet a further embodiment, the invention extends to a method of treating indications in a subject with a compression bandage comprising applying the compression bandage to the subject (for example a limb of the subject) and sensing the pressure applied by the compression bandage to the subject with a pressure sensing device as hereinbefore defined. In one embodiment, the pressure is sensed with a pressure sensing clip comprising: an outer arm; an inner bandage penetrating arm having a pressure sensing region, a piezoelectric pressure sensor at the pressure sensing region and a hinge between the outer arm and the inner bandage penetrating arm. In one embodiment, the indication is an indication treatable by compression bandage therapy. Examples include venous leg ulcers, lymphodema, DVT, post venous ablation and post varicose veins treatment.

Preferably, the outer arm is movable between an open position and a closed position about the hinge.

More preferably, the outer arm is movable to an open position at an angle of between about 90° and 180° with respect to the inner bandage penetrating arm.

In one embodiment, the indication is an indication treatable by compression bandage therapy. Suitably, the indication is selected from the group consisting of venous leg ulcers, lymphedema, DVT, post venous ablation and post varicose veins treatment.

Suitably, the inner bandage penetrating arm comprises an arm body having a hinge end and an insertion end and a semi-rigid spine extends between the hinge end and the insertion end.

In one embodiment of the method, the semi-rigid spine has a flexural rigidity configured to enable it to slide under a bandage without bending.

Preferably, the semi-rigid spine has a degree of flexibility to enable the pressure sensing device to conform to a limb.

Suitably, the pressure sensing device further comprises a force concentrator over the pressure sensing region.

In one embodiment, the inner bandage penetrating arm further comprises a compliant layer disposed between the semi-rigid spine and the subject's skin to prevent traumatic or pressure injury or for comfort.

Suitably, the method further comprises the step of transmitting data to a remote digital interface from the pressure sensing device. Preferably, the remote digital interface comprises a mobile application.

In one embodiment, the method further comprises the step of measuring the circumference of a patient's leg with the mobile application.

In another embodiment, method further comprises the step of algorithmically determining treatment/healing interaction and/or predicting conditions for optimum healing.

The method can also include a calculation step of the dosage of compression therapy received based on the measurements from the pressure sensing device.

In one embodiment, the method further comprises including an identification step for a compression bandage or other therapeutic products such as dressing materials.

In another embodiment, the method further comprises integrating the pressure-sensing device into a healthcare system, a patient e-health record or digital wound care platform.

The pressure sensing clip of the invention overcomes the limitations of current individual and inherent pressure sensing systems by allowing for easy, versatile, accurate and comfortable placement of the device, which ensures reliable sub-bandage pressure measurement over any region of the bandage, regardless of the patient profile. Moreover, the pressure sensing device allows for continuous monitoring of sub-bandage pressure through on-device data storage.

The bandage pressure sensing device is configured to allow for easy, versatile, accurate and comfortable placement within a compression bandage. The clip-like construction of the pressure sensing device allows the device to not only be placed for sub-bandage pressure measurement during the application of the bandage, ensuring safe and efficacious levels of pressure are applied, but also allows the device to be placed on a bandage that has already been applied. The device can be applied to a compression bandage in any orientation—for example, in the case of a leg bandage, the device can be slid downwardly, or upwardly, under the bandage, and in the latter case the clamping together of the arms prevents the device slipping downwardly. The device of the invention can also be securely attached as a wearable device for monitoring purposes (e.g. to ensure a safe and efficacious level of pressure are maintained). This versatility allows for pressure to be measured at any point on the limb, during and after the application of the bandage.

The pressure sensing device of the invention provides unprecedented feedback to patients and healthcare providers on the quality of compression therapy applied so that improved healthcare professional-patient communication is facilitated and pragmatic and progressive approaches of treatment that tailor to patient objections can be arrived at by providing a tool for negotiating and achieving a balance between optimal clinical therapy and a sense of empowerment via a patient's ability to take control of their own healing process.

The invention facilitates the monitoring of the compliance of patients to a prescribed treatment regimen to allow healthcare providers to address specific behaviours that may detrimentally impact healing, thereby facilitating negotiations on improving treatment and subsequently achieving patient concordance. Pressure readings can be then processed and presented on a digital display screen on the pressure sensing device, as well as being wirelessly transmitted to a remote user-friendly interface such as a mobile app or separate electronics device. The pressure sensing device of the invention also allows for a comprehensive report of the treatment received by a patient, which when compared to treatment outcomes, the healthcare provider can use to inform necessary treatment modifications to improve efficacy.

In the pressure sensing system of the invention, the pressure sensing device may be used in conjunction with an adjustable compression bandage, where piezoelectric signals sensed by piezoelectric pressure sensors relevant to the pressure applied by the bandage can be generated by the pressure sensing clip on the bandage. As with the standalone pressure sensing clip, the signals are then processed and presented on a digital display screen on the pressure sensing device, as well as being wirelessly transmitted to a user-friendly interface.

The device may include an operating switch configured to switch the device between a high activity mode and a low activity or sleep mode. This switch could also be configured by a remote, coupled device. The high activity mode may be complete operation (i.e. data displayed on screen and relayed to a remote device), or a partial operation (screen operational but remote relay inactivated).

The operating switch is useful as, during the application of a compression bandage, it is necessary to have a high sampling rate of pressure signals to ensure that real-time feedback is provided to the user, so that they can act upon the signals to adjust sub-bandage pressure accordingly. To activate this operational mode, the user can utilise the on-device operating switch or remote device. However, in order to conserve battery and storage space, during the continuous monitoring of sub-bandage pressure outside of bandage application, a non-operation mode may be used whereby the frequency of data collection is reduced and a display or connection with a remote device is removed. This is distinct from a power switch or a display switch in that it allows the device to maintain activity and data collection at all times but in an efficient and practical manner.

The operating switch therefore allows the device to maintain activity and data collection at all times but in an efficient and practical manner. In other embodiments, high activity mode may be enabled by a signal sent by a mobile application (e.g. upon the scan of a unique identifier) or by the opening of the hinge 4 to a pre-set angle e.g. an angle of greater than 45°. The low activity mode may be enabled upon reaching a limit of inactivity (e.g. not being paired with a mobile device).

In one embodiment, the display is configured for detachment from, and re-attachment to, the outer arm while remaining operatively connected to the pressure sensing region. This allows the user to detach the display from the device and read the display and is useful where the device is attached to parts of the body which are difficult to see (for example the calf or the back of the arm). In one embodiment, the electronics part of the outer arm, including the display, is detachable from the outer arm. In one embodiment, the lead connecting the display and the pressure sensor is sufficiently long to allow the display to be detached and spaced from the device. In one embodiment, the device comprises a lead retraction mechanism to automatically retract the lead once released. The lead retraction mechanism may comprise a spring retraction mechanism.

In another embodiment, the device of the invention communicates with a totally separate digital interface in the form of a computer which will display pressure and communicate with the device, as well as the software on a smart device (e.g. mobile app).

The pressure sensing system therefore provides an adjustable compression bandage with connected pressure sensing capabilities through the wireless interaction of the pressure sensing clip with a digital interface capable of accurately measuring and continuously monitoring sub-bandage pressure in any location during VLU treatment. The benefits of the pressure sensing device and system of the invention can be summarised as follows:

TABLE 1

| Feature | Benefit |
|---------|---------|
| Dual functionality system | Compression: strength, comfort, aesthetic<br>Pressure sensor: accuracy, sensitivity<br>Negates difficult/inaccurate positioning of separate sensor<br>Sensor design improves sensitivity/accuracy compared to other inbuilt sensors |
| Digital and versatile pressure measurement | Versatile measurement location<br>Wireless transmission to phone/tablet/computer<br>Ensures safety/efficacy<br>Clearly displays pressure both on device and remotely<br>Measurement position not constrained to predefined position |
| Continuous pressure monitoring software | Indicates issues with non-compliance<br>Provides insight into non-healing VLUs<br>Facilitates negotiations to achieve concordance<br>Reduced level of required intervention<br>Informs clinical practice<br>Continuously monitors pressure during daily activities |
| Adaptable and adjustable design | Conforms to different shape legs<br>Provides patient empowerment<br>Maintains pressure as swelling reduces |
| Durability/washability | Reduced costs<br>Environmentally friendly<br>Unlike traditional layered bandages, durable design allows for reuse |

All publications, patents, patent applications and other references mentioned herein are hereby incorporated by reference in their entireties for all purposes as if each individual publication, patent or patent application were specifically and individually indicated to be incorporated by reference and the content thereof recited in full.

Definitions and General Preferences

Where used herein and unless specifically indicated otherwise, the following terms are intended to have the following meanings in addition to any broader (or narrower) meanings the terms might enjoy in the art:

Unless otherwise required by context, the use herein of the singular is to be read to include the plural and vice versa. The term "a" or "an" used in relation to an entity is to be read to refer to one or more of that entity. As such, the terms "a" (or "an"), "one or more," and "at least one" are used interchangeably herein.

As used herein, the term bandage is to be read to include bandage-like compression therapy products used in compression therapy such as compression bandages, sleeves (e.g. pneumatically inflatable sleeves), wraps, adjustable Velcro (Trade Mark) wraps, stockings, hosiery, garments and the like in which interface pressure detection is required.

As used herein, the term "comprise," or variations thereof such as "comprises" or "comprising," are to be read to indicate the inclusion of any recited integer (e.g. a feature, element, characteristic, property, method/process step or limitation) or group of integers (e.g. features, element, characteristics, properties, method/process steps or limitations) but not the exclusion of any other integer or group of integers. Thus, as used herein the term "comprising" is inclusive or open-ended and does not exclude additional, unrecited integers or method/process steps.

As used herein, the term "disease" is used to define any abnormal condition that impairs physiological function and is associated with specific symptoms. The term is used broadly to encompass any disorder, illness, abnormality, pathology, sickness, condition or syndrome in which physiological function is impaired irrespective of the nature of the aetiology (or indeed whether the aetiological basis for the disease is established). It therefore encompasses conditions arising from infection, trauma, injury, surgery, radiological ablation, poisoning or nutritional deficiencies.

As used herein, the term "treatment" or "treating" refers to an intervention (e.g. the administration of an agent to a subject) which cures, ameliorates or lessens the symptoms of a disease or removes (or lessens the impact of) its cause(s). In this case, the term is used synonymously with the term "therapy".

Additionally, the terms "treatment" or "treating" refers to an intervention (e.g. the administration of an agent to a subject) which prevents or delays the onset or progression of a disease or reduces (or eradicates) its incidence within a treated population. In this case, the term treatment is used synonymously with the term "prophylaxis".

In the context of treatment and effective amounts as defined above, the term subject (which is to be read to include "individual", "animal", "patient" or "mammal" where context permits) defines any subject, particularly a mammalian subject, for whom treatment is indicated. Mammalian subjects include, but are not limited to, humans, domestic animals, farm animals, zoo animals, sport animals, pet animals such as dogs, cats, guinea pigs, rabbits, rats, mice, horses, cattle, cows; primates such as apes, monkeys, orangutans, and chimpanzees; canids such as dogs and wolves; felids such as cats, lions, and tigers; equids such as horses, donkeys, and zebras; food animals such as cows, pigs, and sheep; ungulates such as deer and giraffes; and rodents such as mice, rats, hamsters and guinea pigs. In preferred embodiments, the subject is a human.

BRIEF DESCRIPTION OF THE DRAWINGS

The invention will now be described, by way of example only, with reference to the accompanying drawings in which:

FIG. 1 is a perspective view from above and one side of an individual pressure sensing device in accordance with the invention for indicating the pressure applied by a bandage to a human or animal body in which the pressure sensing device is in the form of a pressure sensing clip having an upper outer arm with a display hingedly attached to a lower inner bandage penetrating arm bearing a pressure sensor with the outer arm in the hingedly open position;

FIG. 2 is an enlarged perspective view from above and one side of the pressure sensing clip of FIG. 1 with the outer arm in the hingedly closed position;

FIG. 3 is a perspective view from above and one side of the pressure sensing clip of FIG. 2 partially exploded to reveal the circuit layer, spacer layer, pressure sensor (in the form of a force sensing resistor (FSR)) and force concentrator of the inner arm;

FIG. 4 is an enlarged side elevation of the inner arm of the pressure sensing clip detached from the outer arm;

FIG. 5 is a top plan view of the pressure sensing clip of FIG. 4;

FIG. 6 is an enlarged side elevation of the outer arm of the pressure sensing clip detached from the inner arm;

FIG. 7 is a top plan view of the outer arm of FIG. 6;

FIG. 8 is a perspective view from above and one side of the pressure sensing clip of FIGS. 1 to 7 attached to a compression bandage being placed on a human lower limb with the outer arm in the hingedly closed position on the inner arm to grip the compression bandage at its edge;

FIG. 9 is a schematic representation of a force concentrator showing the outward/downward direction of tensional forces indicated by arrows and how an increased aspect ratio of a force concentrator A increases the normal force at the pressure sensing region of the pressure sensing clip;

FIG. 10 is a schematic representation of a force concentrator showing the outward/downward direction of tensional forces indicated by arrows and how an increased aspect ratio of a force concentrator B increases the normal force at the pressure sensing region of the pressure sensing clip and how force normal A is greater than force normal B when tensional forces are equal;

FIG. 21 is a schematic representation of a pressure sensing system of the invention made up of the pressure sensing clip of FIGS. 1 to 20, a compression bandage and a digital interface;

FIGS. 22A to 22C are illustrations of a device of the invention in which the electronics module with display is detachable from the outer arm for the purpose of visualising the display when the device is attached to a visually inaccessible part of the body;

FIG. 23 is a perspective view from above and one side of a further embodiment of the bandage pressure sensing device of the invention in which the inner bandage penetrating arm is shaped to define a circular pressure sensing region at its insertion end with the outer arm in the closed position;

FIG. 24 is a top plan view of the device of FIG. 23;
FIG. 25 is a side elevation of the device of FIG. 23;
FIG. 26 is an end view of the device of FIG. 23;
FIG. 27 is an opposite end view of the device of FIG. 23;
FIG. 29 is a top plan view of the device of FIG. 28;
FIG. 30 is a side elevation of the device of FIG. 28;
FIG. 31 is an end view of the device of FIG. 28;
FIG. 32 is an opposite end view of the device of FIG. 28;
FIG. 33 is a perspective view from above and one side of a further embodiment of the invention in which the electronics module is provided with an openable and closable hinged window for accessing electronics in the electronics module with the window in the closed position;
FIG. 34 is a top plan view of the device of FIG. 33;
FIG. 35 is side elevation of the device of FIG. 33;
FIG. 36 is an end view of the device of FIG. 33;
FIG. 37 is an opposite end view of the device of FIG. 33;
FIG. 38 is a perspective view from above and one side of the device of FIG. 33 with the door in the open position;
FIG. 39 is a top plan view of the device of FIG. 38;
FIG. 40 is a side elevation of the device of FIG. 38;
FIG. 41 is an end view of the device of FIG. 38;
FIG. 42 is an opposite end view of the device of FIG. 38;
FIG. 43 is a perspective view from above and one side of a further embodiment of the invention in which the electronics module of the arm is configured to swivel to adjust the position of the display and the device is provided with a hinged clip between the inner arm and the outer arm with the clip in the closed bandage gripping position;
FIG. 44 is a perspective view from above and one side of the device of FIG. 43 with the hinge in the open position;
FIG. 45 is a top plan view of the device of FIG. 43;
FIG. 46 is a side elevation of the device of FIG. 43;
FIGS. 47A to 47C are perspective views from above and one side of the device of FIG. 43 in which the electronics module is swiveled about is longitudinal axis to 0°, 45° and 90° respectively;
FIG. 48 is an end view of the device of FIG. 43;
FIG. 49 is an opposite end view of the device of FIG. 43;
FIG. 51 is a top plan view of the detached inner arm and outer arm of the device of FIG. 50;
FIG. 52 is a side elevation of the detached arm and inner arm of FIG. 50;
FIG. 53 is an end view of the detached inner arm and outer arm of FIG. 50;
FIG. 54 is a perspective view from above and one side of a further embodiment of the device of the invention similar to the device of FIGS. 22A to 22C in which the electronics module is detachable from the outer arm and is connected to the outer arm with a retractable long lead with the electronics module shown detached from the outer arm;
FIG. 55 is a top plan view of the device of FIG. 54;
FIG. 56 is a top plan view of the device of FIG. 54 with the electronics module attached to the outer arm;
FIG. 57 is a side elevation of the device of FIG. 54;
FIG. 58 is a side elevation of the device of FIG. 56;
FIG. 59 is a perspective view from above and one side of a further embodiment of the invention in which the digital display screen is a side digital display screen located on a side face of the electronics module;
FIG. 60 is a top plan view of the device of FIG. 59;
FIG. 61 is a side elevation of the device of FIG. 60;
FIG. 65 is a top plan view of the device of FIG. 64;
FIG. 66 is a side elevation of the device of FIG. 64;
FIG. 67 is a perspective view from above and one side of the device of FIG. 64 with the door on the electronics module in the open position;
FIG. 68 is a top plan view of the device of FIG. 67;
FIG. 69 is a side elevation of the device of FIG. 67;
FIG. 72 is an end view of the device of FIG. 64;
FIG. 73 is an end view of the device of FIG. 64 with the outer arm attached to the inner arm;
FIG. 74 is a perspective view from above and one side of a further embodiment of the invention similar to the device of FIG. 50 with the inner arm detached from the outer arm but in which the inner arm is provided with multiple sensor regions;
FIG. 75 is a top plan view of the device of FIG. 74;
FIG. 76 is a side elevation of the device of FIG. 74;
FIG. 77 is an end view of the device of FIG. 74;
FIG. 78 is a perspective view from above and one side of a further embodiment of the invention similar to the device of FIG. 54 but in which the detachable electronics module is configured to wirelessly communicate with the outer arm with the electronics module detached from the outer arm;
FIG. 79 is a top plan view of the device of FIG. 78;
FIG. 80 is a side elevation of the device of FIG. 78;
FIG. 81 is a top plan view of the device of FIG. 78 with the electronics module attached to the outer arm;
FIG. 82 is a side elevation of the device of FIG. 81;
FIG. 83 is a perspective view from above and one side of a further embodiment of the invention in which the display screen is detachable from the electronics module and is attached to the electronics module with a wire with the display screen shown detached from the electronics module;

FIG. 84 is a top plan view of the device of FIG. 83;

FIG. 85 is a side elevation of the device of FIG. 83;

FIG. 86 is a top plan view of the device of FIG. 83 with the detachable display screen attached to the electronics module;

FIG. 87 is a side elevation of the device of FIG. 86;

FIG. 89 is a top plan view of the device of FIG. 88;

FIG. 90 is a side elevation of the device of FIG. 88;

FIG. 91 is a top plan view of the device of FIG. 88 with the display screen attached to the electronics module;

FIG. 92 is a side elevation of the device of FIG. 91;

FIG. 93 is a perspective view from above and one side of the device of FIG. 74 in which the device is wirelessly communicable with a handheld device such as a mobile phone;

FIG. 94 is a perspective view from above and one side of the device of FIG. 74 in which the device is wirelessly communicable with a separate external electronics device such as a digital interface in the form of a computer or a controller;

FIG. 95 is a perspective view from above and one side of the device of FIG. 74 in which the device is wirelessly communicable with a handheld device such as a mobile phone or a separate electronics device such as a computer or a controller, and FIG. 96 is a perspective view from above and one side of the device of FIG. 74 in which the device is wirelessly communicable with a handheld device such as a mobile phone and a separate electronics device such as a computer or a controller.

DETAILED DESCRIPTION OF THE INVENTION

Figure 11:
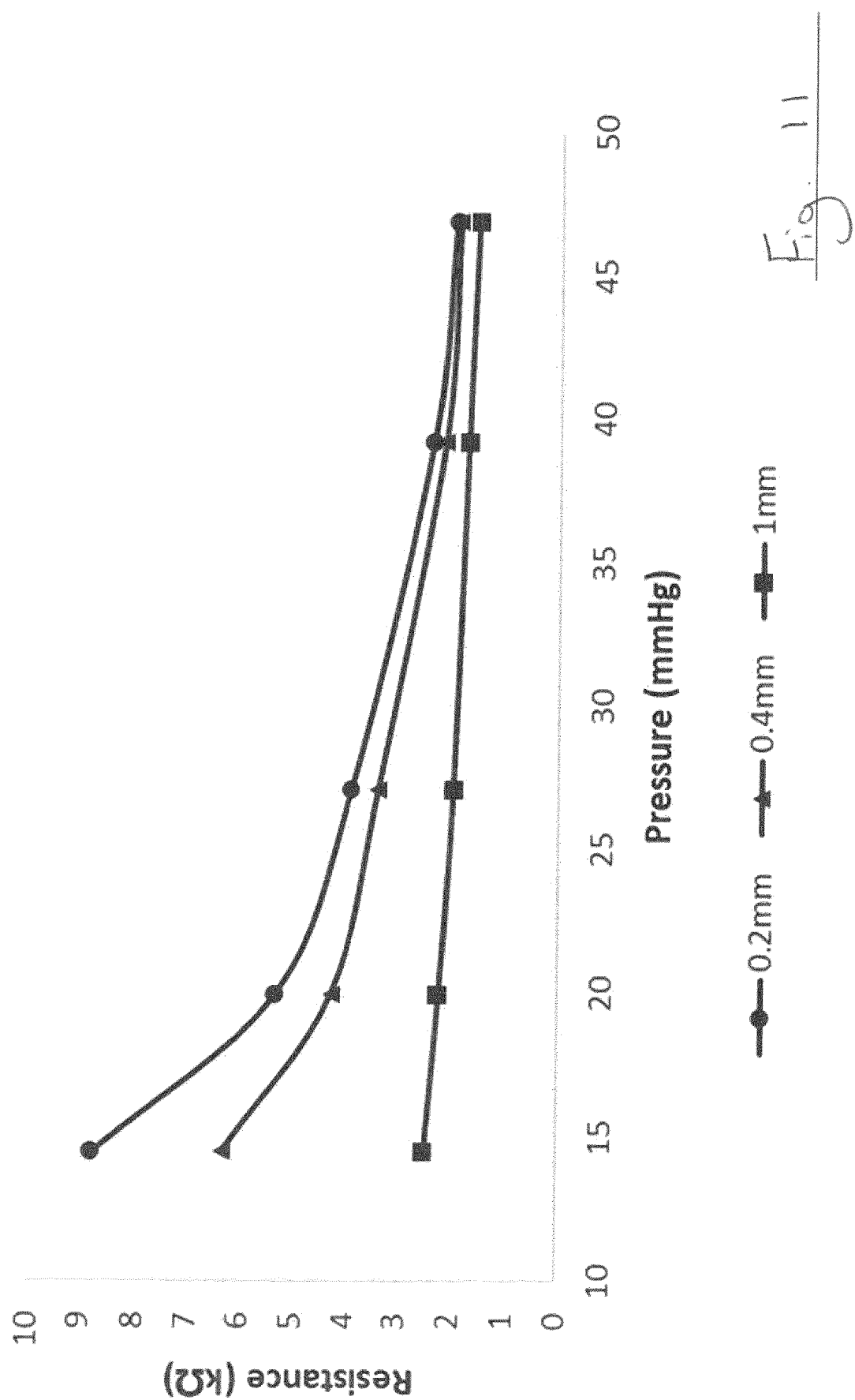
FIG. 11 is a graph of the effect of force concentrator height on the resistance measurement of the FSR under different pressures (FSR diameter=10 mm, force concentrator diameter=8 mm) showing that an increased force concentrator height (i.e. aspect ratio) results in a decrease in the resistance for pressure applied.
Figure 12:
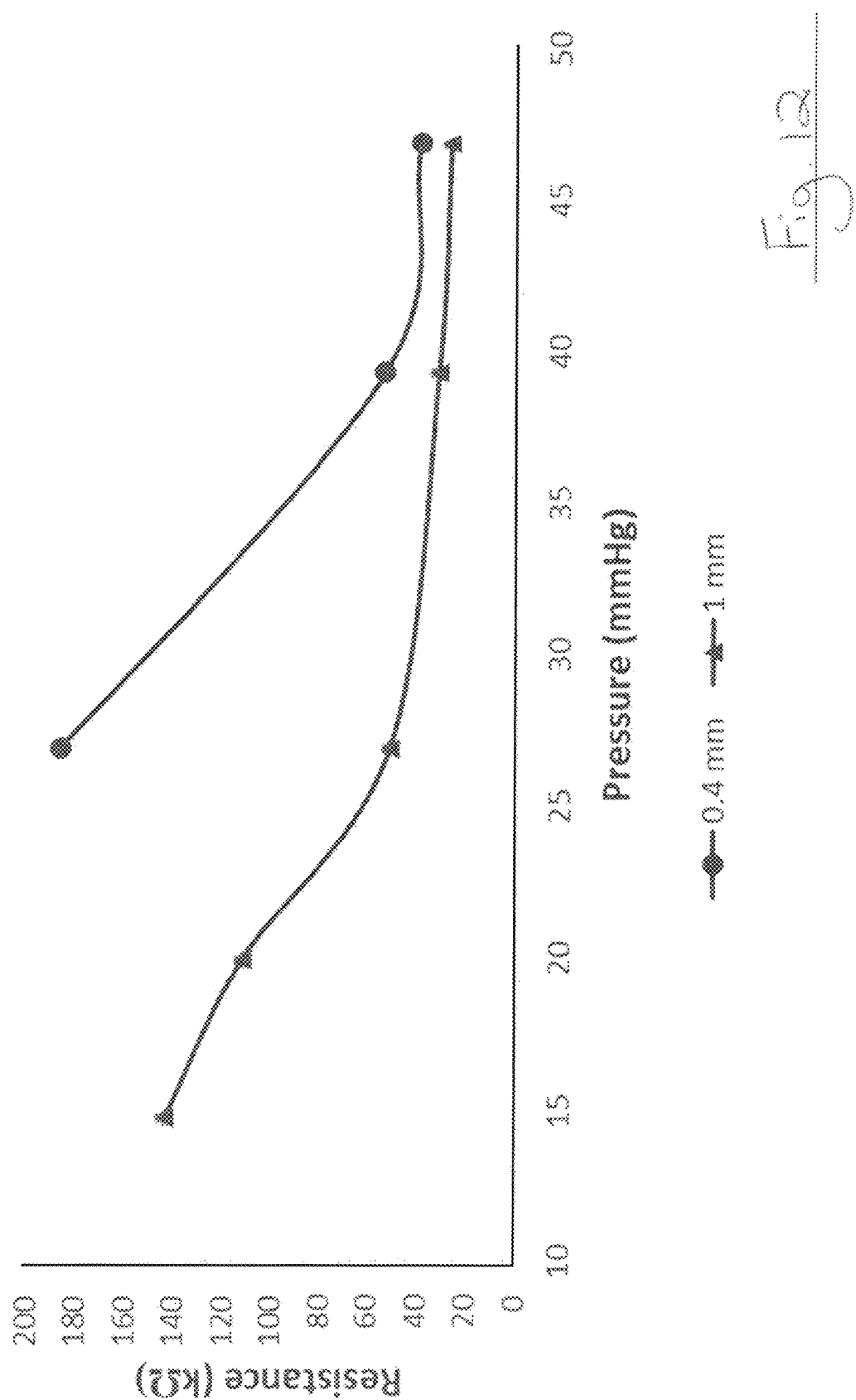
FIG. 12 is a graph of FSR resistance measurements with different pressure applications for a 5 mm diameter FSR with different height force concentrators (4 mm diameter) showing the sensitivity of the FSR to low range pressures is increased with a greater surface area FSR and the ability to use lower profile force concentrators is also increased.
Figure 13:
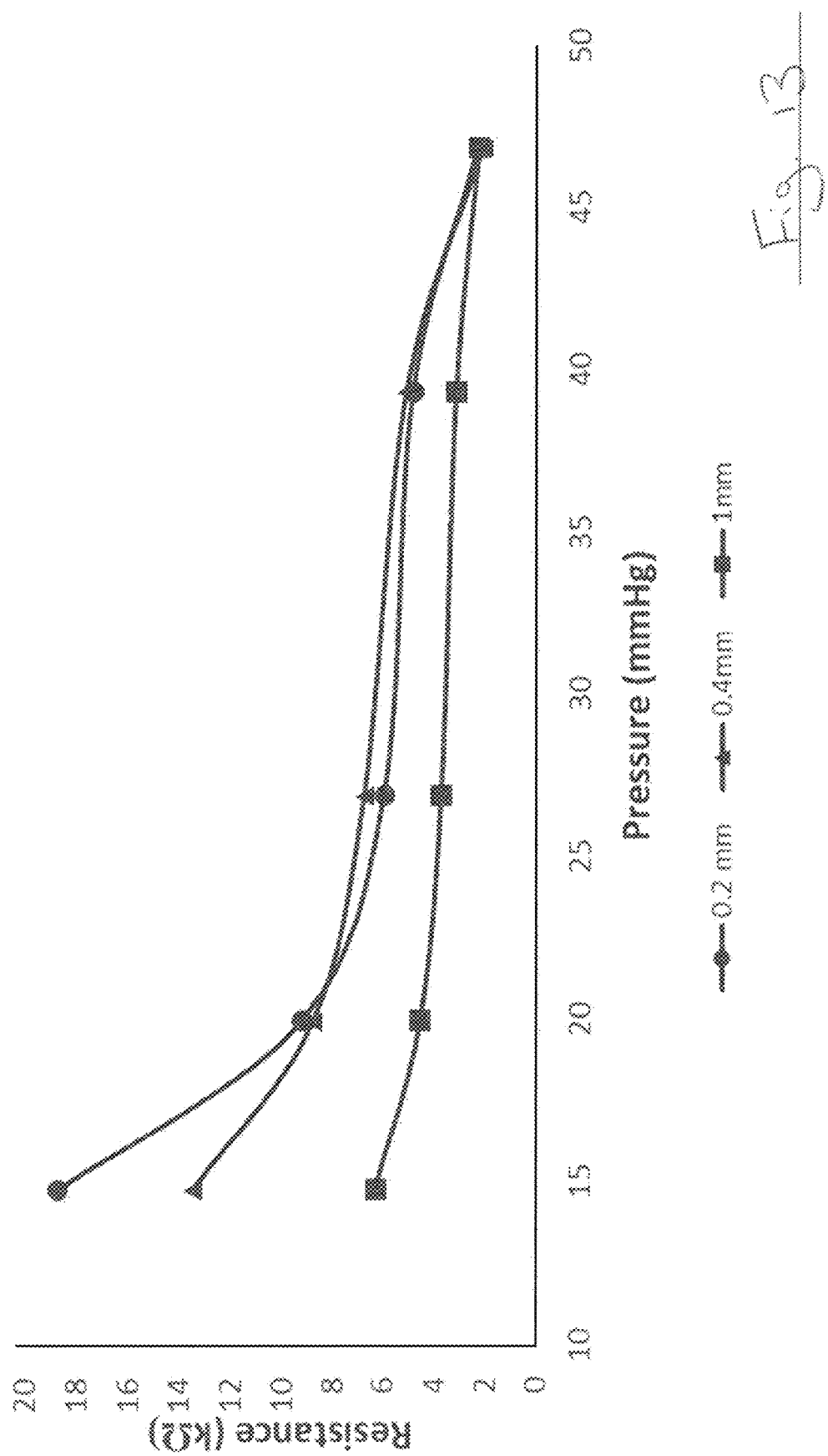
FIG. 13 is a graph of FSR resistance measurements with different pressure applications for a 10 mm diameter FSR with different height force concentrators (8 mm diameter)
Figure 14:
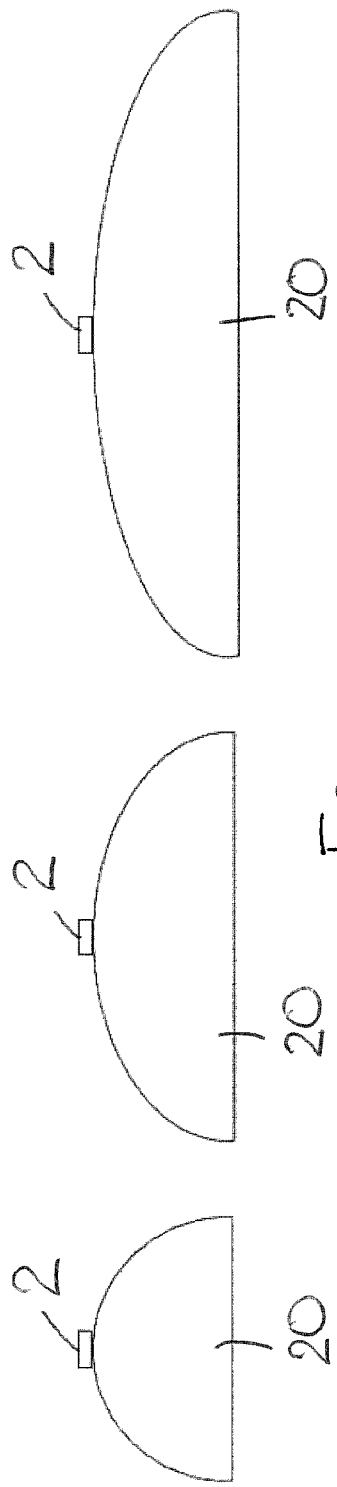
FIGS. 14 and 15 are a schematic representations of how the width of the inner clip arm can impact the tangential effects on smaller radius of curvatures (e.g. smaller diameter limbs) with a smaller width inner arm being shown in FIG. 14 and a larger width inner arm being shown in FIG. 15 to result in increased edge effects on small radius of curvatures.

As shown particularly in FIGS. 1 to 8 of the drawings, a bandage pressure sensing device for detecting and displaying the pressure applied by a bandage to a human or animal body is generally indicated by the reference numeral 1 and is in the form of a pressure sensing clip 1 having a lower inner bandage penetrating arm 2 and an upper outer arm 3 hingedly attached to the inner arm 2 at a hinge 4 so that the outer arm 3 is movable between a hingedly closed position with respect to the inner arm 2 as shown in FIG. 2 and a hingedly open position as shown in FIG. 3 to define the clipping action. As shall be explained more fully below, the inner arm 2 of the pressure sensing clip 1 is capable of insertion within, securement to, detachment from, and removal out of a (compression) bandage, for the purposes of easy, versatile, accurate and comfortable measurement and monitoring of sub-bandage pressure thus facilitating the consistent provision of evidence-based compression therapy to VLU patients at pressure levels that are safe and efficacious. The pressure sensing devices 1 of the invention therefore assess the absolute pressure applied to a subject by a compression bandage.

As will be appreciated by those skilled in the art, as indicated above, the pressure sensing clip 1 is suitable for use with a range of compression therapy products (e.g. those using pneumatically inflatable sleeves) in which interface pressure detection is required. Accordingly, the invention should not be construed as being limited to a pressure sensing device 1 for use with standard compression bandages only.

The inner arm 2 is made up of an elongate inner arm body 5 having a semi-rigid backbone or spine 6 extending between a hinge end 7 adjacent the hinge 4 and an opposite insertion end 8 provided with a tapered tip 9 for insertion into a bandage. The semi-rigid spine 6 ensures that the device can be easily placed after bandage application. More particularly, due to the reduction in swelling as a function of compression therapy, it is sometimes necessary to re-test the sub-bandage pressure after application which may require the removal and repositioning of the pressure sensing device 1. Accordingly, the semi-rigid spine 6 has a degree of flexibility to enable the pressure sensing device to conform to the patient's limb and provide a level of comfort and safety by not causing pressure points. However, the degree of flexibility is balanced with the degree of rigidity so that the device can be easily slid beneath the bandage 19.

The semi-rigid but flexible spine 6 of the inner arm 2 therefore provides a flexural rigidity that prevents buckling and facilitates easy insertion of the inner arm 2 beneath the applied bandage 19.

Any suitable semi-rigid material can be used as the spine 6 which runs the length of the inner arm 2 but also has sufficient flexural rigidity to guide the pressure sensing region 10 of the inner arm 2 to a region of measurement when slid beneath the bandage 19. The thickness and width of the semi-rigid spine 6 can be minimised to avoid obstruction and any significant impact on pressure when the inner arm 2 is inserted or removed, but sufficiently large to resist bending or buckling that would prevent insertion. The rigidity of the semi-rigid spine 6 also acts to support the pressure sensor to enable accurate and consistent pressure measurements (e.g. it helps avoid bending under the pressure sensing region 10 that can impact pressure measurement. The rigidity of the semi-rigid spine 6 also prevents critical load failure, which prevents insertion.

In one embodiment, the inner arm 2 is formed with a flat, semi-rigid spine 6 having sufficient flexural rigidity typically in a range from about 0.0007 N·m$^2$ and 0.03 N·m$^2$ to prevent buckling when slid beneath the applied bandage 19 but has sufficient flexibility to prevent levering that can occur on legs that have a curved surface which can in turn affect pressure reading accuracy.

Accordingly, when under an axial load (including eccentric axial load), the inner bandage penetrating arm 2 possesses sufficient flexural rigidity to withstand critical load failure resulting in buckling/kinking/folding that would prevent insertion beneath or between the layers of an applied compressed bandage/wrap/stocking/garment.

Moreover, when under transverse loads, the inner bandage penetrating arm 2 possesses sufficient flexibility to conform to the contours of a substrate, such as a limb.

The flexural rigidity and flexibility of the inner bandage penetrating arm 2 can be further defined by the combined properties of the semi-rigid spine 6 which provides a defined mechanical/structural substrate support to the pressure sensing region 10, and the compliant layer 15.

In certain embodiments, the ability to withstand axial load whilst bending under transverse or longitudinal loads may be enhanced by the inclusion of bending enhancers e.g. in the form of cross-sectional grooves, cuts, fins, segments, links, or other features that enhance bending under directional (i.e. transverse but not axial) load.

In certain embodiments, the compliant layer 15 may be made of the same or different material as the semi-rigid spine, with the inclusion of load distributing mechanism in the form of features, either alone or in combination, such as wings, flaps, curved surfaces, cushions, bladders, elastic or viscoelastic material properties, increased surface area in relation to the semi-rigid spine, or curved geometries etc. to distribute the load of the semi-rigid spine, under application of compression bandaging, over a greater surface area, thereby reducing localised pressure on the substrate.

In certain embodiments, as shown in FIGS. 23 to 32, the profile of the inner bandage penetrating arm 2 is minimised with respect to width (i.e. reduced aspect ratio), thereby reducing localised pressure from the device under compression forces on the substrate due to the presence of the device 1.

It is also important that, in use, the flexibility and any associated bending along the length of the inner bandage penetrating arm 2 is not transferred to the pressure sensing region 10. Accordingly, in another embodiment, a region of greater flexibility or a "neck" in the inner bandage penetrating arm 2 adjacent to the pressure sensing region 10 and towards the hinge 4 (i.e. between the pressure sensing region(s) 10 and the hinge 4) of the inner bandage penetrating arm 2 is included.

The region of greater flexibility may be achieved by changing the material of the semi-rigid spine 6 in this region to less rigid materials i.e. by material selection, and/or by reducing the dimensions or materials in the region e.g. through dimensional aspects such as relative thicknesses, and/or by introducing mechanical defects (e.g. holes, slits, etc.) in the region, and/or by adding springs to the region, and/or with other means of weakening. This allows bending to occur in the "neck" region of the inner arm of the pressure sensing device with the effect of optimising pressure measurement accuracy as well as comfort and safety for the patient.

If desired, it is also possible to bias this increased flexibility in a concave direction rather than a convex direction, for example through the use of grooves on compliant layer 15 so as to not reduce the flexural rigidity below the level required for insertion.

The inner arm 2 of the device can be detachable from the outer arm 3 and/or can be disposable.

The spine 6 is also configured so that the width and thickness of the semi-rigid spine 6 is minimised to avoid obtrusion and a reduction in pressure once the clip is removed, but not to the point where flexural rigidity is insufficient. As a result, the width of the inner arm 2 is typically is less than about 15 mm.

A pressure sensing region 10 is positioned between the hinge end 7 and the insertion end 8 above the semi-rigid spine 6. In the present embodiment, the pressure sensing region 10 is disposed towards the distal or insertion end 8. The pressure sensing region 10 is generally positioned beneath the bandage and away from the bandage edge so as to measure or capture pressure applied by a bandage at anatomically relevant positions, including B, B1 and C positions—priority on the spacing will most likely be driven by the physiologically relevant positions required.

The pressure sensing region 10 is provided with a lower electronic circuit layer 11, an intermediate spacer layer 12 and an upper pressure sensor 13 on the spacer layer 12. In the present embodiment the pressure sensor 13 is a piezoelectric pressure sensor such as a piezoresistive pressure sensor hereinafter referred to as a force sensing resistor (FSR). The FSR 13 and the spacer layer 12 can be inlayed into the inner arm body 5 to reduce the inner arm 2 profile for ease of use and enhance moisture protection.

Piezoelectric pressure sensors such as the FSR 13 provide a flat, low-profile form of sensor particularly suitable for venous leg ulcer (VLU) patients who generally suffer from fragile skin. Accordingly, the low profile piezoelectric pressure sensors reduce pressure points for increased patient welfare.

A force concentrator 14 is located over the pressure sensing region to direct compression forces to the pressure sensing region 10 to optimise the sensitivity of the pressure sensing clip 1. In the present embodiment, the force concentrator 14 can be a solid, elastic disc of material 14. Alternatively, the force concentrator 14 can be a dome or a protrusion.

As will be appreciated by those skilled in the art, the pressure sensing clip 1 can be provided with one or more pressure sensing regions 10 and/or one or more pressure sensors 13 as required.

The inner arm body 5 is further encased in or underlaid by a skin-like compliant outer layer 15 to allow for non-traumatic insertion of the inner arm 2 in use and optimal patient comfort. In the present embodiment, the skin compliant outer layer 15 partially encases the inner arm body 5. The compliant layer 15 is typically provided on a face of the semi-rigid spine 6 facing the skin, but in one embodiment may envelope, partially or totally, the spine and/or the pressure sensing region 10 including the force concentrator. Therefore, the skin compliant outer layer 15 can fully encase the inner arm 2 if desired. The outer layer 15 has similar mechanical properties to skin such as a Shore hardness of about 20 90.

The skin-like compliant layer 15 is also provided with a moisture protective coating 16 to prevent ingress of moisture into the pressure sensing clip 1 which could interfere with pressure readings. A subsequent outer moisture protective coating 16 can also serve to reduce friction and can be any suitable material such as parylene.

The pressure sensing device 1 is therefore configured to have a lower compliant layer 15 (closest to a patient's skin), a semi-rigid spine 6 above the compliant layer 15 and the pressure sensing region 10 above the semi-rigid spine 6. Accordingly, device sensing performance is not determined by the compliant layer 15 so it can be tailored to support the comfort and safety of patients who often have delicate skin owing to their pathology. Decoupling the inner skin compliant layer 15 from the performance of the sensor also allows for the inclusion of an optional additional low friction/moisture protection layer over the skin compliant layer 15 that confers usability benefits.

The outer arm 3 is provided with an electronics housing or module 17 for housing a power source, transducer, data processor, a digital display screen 18 on the top face of the electronics module 17, storage drive, and transmitter in electronic communication with the pressure sensing region 10 via the circuit layer 11 to display pressure readings from the FSR 13. The transducer integrates the pressure sensing region 10 with the back-end electronics (data processor, transmitter and storage drive) to capture pressure signals while the data processor facilitates the acquisition, digitalization and manipulation of the captured pressure signals and the on-device digital display screen 18 presents the sub-bandage pressure measurement to the user. The transmitter facilitates wireless transmission of signals to a remote, digital interface 23 (e.g. a mobile app or separate electronics device) as required while the storage drive facilitates the storage of signal data.

The pressure sensing device 1 can also include a machine readable unique identifier such as RFID/QR code to enable identification of the device by mobile applications (or a separate electronics device such as a computer). Alternatively or in addition, the pressure sensing device comprises a machine readable objective such as leg circumference.

As discussed further below, in one embodiment, the bandage pressure sensing device 1 can also include a toggle button to alter the device calibration for a range of leg circumference sizes. Device calibration modes may also be altered by mobile applications (or a separate electronics device such as a computer), once paired. In another embodiment, the toggle may be affected by a digital interface (e.g. app or separate electronics device)

In one embodiment, the outer arm 3 and/or the hinge 4 may include features to aid gripping e.g. adhesive/cohesive/roughened/catching/magnetic materials for the outer arm 3 or locking/torque inducing/ratchet/spring mechanisms for the hinge 4.

As will appreciated by those skilled in the art, the pressure sensing device 1 of the invention can be sized as required. For example, the pressure sensing clip 1 of FIGS. 1 to 7 can have an inner arm length of about 75 mm, a width of about 18 mm and a thickness of about 2 mm while the outer arm 3 can have a width of about 18 mm, a length of about 20 mm and a housing thickness of about 9 mm. As discussed further below, bandage the device 1 of the invention is employed with determines the required length of the inner bandage penetrating arm 2. For example, if measuring the pressure applied with a compression bandage that is intended to have a 50% overlap in spiral configuration, it is necessary that the pressure sensing region 10 captures the pressure applied by both overlapping layers and is sufficiently long enough to do so. The dimensions described above meet the length of inner bandage penetrating arm 2 required to capture a 50% overlap of a traditional compression bandage (i.e. with a width of 10 cm).

In use, the inner arm 2 of the pressure sensing clip 1 is inserted beneath a compression bandage 19 on a limb 20 with the outer arm 3 in the hingedly open position (i.e. open to in or around an angle between about 90° and 180°) so that the pressure sensing region 10 is positioned as desired to take a pressure reading i.e. the inner arm 2 is placed inside the bandage 19 adjacent with the skin and the outer arm 3 is placed outside the bandage 19 adjacent with the external environment. The outer arm 3 can remain in an open position, unaided, until it is configured to a closed position by the user (i.e. whereby it is not biased towards a closed position via gravity, spring or other mechanisms). Opening the outer arm to an angle of between about 90° and 180° ensures that the bandaging process is not in any way impeded by the pressure sensing device 1 i.e. the hinge 4 enables the unhindered wrapping of the bandage over the inner bandage penetrating arm 2 without interference from the outer arm 3 while the user is not required to actively keep the outer arm 3 in the open position so initial securement of the inner bandage penetrating arm 2 beneath the bandage frees both hands to manage bandaging.

The outer arm 3 is then hingedly moved to the hingedly closed position so that an edge 21 of the bandage 19 is gripped at the hinge 4 between the inner arm 2 and the outer arm 3. The sub-bandage pressure detected at the pressure sensing region 10 is then displayed on the display 18. The pressure sensing device 1 can be used to measure sub-bandage pressure 1 as the bandage 19 is being applied or to measure pressure for an already applied bandage 18.

The pressure sensing device 1 of the invention can therefore be located at a region of interest for sub-bandage pressure measurement. Accordingly, as the bandage 18 is being applied, the pressure sensing device can be positioned at the region where pressure is being determined.

The outer arm 3 being hingedly connected to the inner arm 2 and running parallel with the inner arm 2 in the closed position therefore allows the pressure sensing clip 1 to be easily placed either side of the bandage 18, in a region of interest, prior, during or after application of the bandage. In addition, the hinge 4 enables the device 1 to be maintained and held by a user in an open position whilst being placed in an anatomically/clinically relevant position (e.g. avoiding bony regions) prior to bandage overlay. More generally, the hinge 4 facilitates versatile positioning of the pressure sensing device 1 by allowing the inner bandage penetrating arm 2 to be correctly and easily positioned with the outer arm 3 in the open position and then clipped to the closed position when the pressure sensing region 10 is at a desired location.

The structure of the pressure sensing clip 1 and in particular the shape and configuration of the inner arm 2 allows the user to ensure that the device is not placed on any bony or tendinous regions, which can inaccurately impact pressure measurement. Moreover, when aiming to achieve a pressure gradient along the length of the limb 19, pressure can be measured at distal and proximal regions, as well as regions in between, due to the elongate nature of the inner arm 2 and the position of the pressure sensing region 10 on the inner arm 2.

The shape and configuration of the inner arm 2 allows for correct vertical positioning the pressure sensing device 1 to ensure accurate readings.

More particularly, the inner arm 2 length and location of the pressure sensing region 10 and in particular the FSR 13 on inner arm 2 can be located so that the FSR 13 is positioned at the midpoint of the width of a typical bandage (approximately 5 cm from the edge 21 of the bandage), to reduce "edge effects"—i.e. when tightening the bandage, the end of the bandage may be gripped and pulled to apply tension which, in an elastic bandage, may not be evenly distributed across the width of the bandage, with anisotropic strain causing potential for a variable strain profile across the width of the bandage known as edge effects.

A physical depth indicator 22 on the inner arm 2, such as a raised ridge 22, indicates the depth of insertion required to place the pressure sensing region 10 at this region.

In the case of bandages 19 where there is an overlap required, such as those that stipulate a 50% overlap to achieve two layers of bandaging in a spiral configuration, the inner arm 2 can be lengthened to at least the width of the bandage 19 (approximately 10 cm) to ensure the pressure of all layers are captured in the pressure measurement and not hinder the application of the bandage 19. In this scenario, the first bandage spiral covers the pressure sensing region 10 at the midpoint of the bandage width (as directed by the physical indicator 22, e.g. at 5 cm distance from the pressure sensing region 10), whereas the second bandage spiral is applied at 50% overlap, as indicated by a second physical indicator 22 (e.g. at 10 cm distance from the pressure sensing region 10), thereby covering the pressure sensing region with two bandage layers.

Accordingly, it is desirable that the distance from the point at which the inner and outer arms 2,3 meet at the hinge 4 to the centre of the pressure sensing region 10 is at least 50% of the width of the bandage 19 (where the bandage is a conventional compression bandage) that is measured and/or where the distance from the point at which the inner and outer arms 2,3 meet at the hinge 4 to the centre of the pressure sensing region 10 is at least 100% the width of the bandage 19 that is measured.

The pressure sensing device 1 can be provided with an attachment mechanism (not shown) to assist in securing the pressure sensing device 1 to the bandage 19 in use. If desired, the attachment mechanism can be located on the outer arm 3. For example, to facilitate continuous monitoring, it is important that the pressure sensing device can be fixedly held at the desired position such as the B1 position (the area at which the Achilles tendon changes into the calf muscles approximately 10-15 cm proximal to the medial malleolus) after the application of the bandage.

Due to the traditional bandaging technique that involves the overlapping application of bandages in a distal to proximal direction, from the toes to below the knee, the upper edge of the bandage 19 is often covered by the lower edge of the following spiral of bandage (this also ensures there are no gaps in compression that can cause pressure wounds).

Accordingly, in general, the device 1 of the invention can be placed according to two general methods. In the first method, the inner bandage penetrating arm 2 is placed in a desired location while the device 1 is in an open position, followed by one or more layers of bandaging, followed by the outer arm 3 conferring a closed position about the hinge 4. This placement method, used during bandage application to ensure correct pressure, enables the user to more precisely position the pressure sensing region 10 at any number of clinically relevant positions (e.g. to allow a graduated pressure application), whilst avoiding incorrect regions (e.g. bony regions).

In the second method where the bandage has already been applied and pressure is to be monitored or checked, the inner bandage penetrating arm 2 can be reinserted beneath the bandage as required owing to the sufficient flexural rigidity afforded by the semi-rigid spine 6.

As indicated above, the pressure sensing device 1 of the invention can be slid beneath the bandage layers from the lower edge of the bandages, as the top edges are covered by the proceeding bandage layers. In order to prevent the pressure sensing device from falling out from the lower edge the attachment mechanism such as hook and loop material, spring clips, buttons, hooks, adhesives and the like is placed on the outer arm 3 to keep the pressure sensing device 1 in place. For example, if the outer layer of the bandage 19 is a loop-style material, a layer of hook-style material may be attached to the outer clip arm 3 on the surface that faces the bandage 19.

Due to the hinge 4, the attachment mechanism does not hinder the placement of the device 1 during or after the application of the bandage 19 as the outer arm 3/hinge 4 can be in the raised open position when inserting the inner arm 2 beneath the bandage 19 i.e. with the outer arm 3 raised (e.g. perpendicular) to the inner arm 2. Once the inner arm 2 has been positioned beneath the bandage 19, the outer arm 3/hinge 4 can be moved to the closed position, with the outer arm 3 parallel to the inner arm 2. In this closed position, the attachment mechanism of the outer arm 3 engages with the bandage 19, and the subsequent adhesion will be sufficient to secure the pressure sensing device 1 for continuous monitoring.

If desired, a locking mechanism (e.g. a ratchet) can also be incorporated into the hinge 4 between the two arms 2,3 to help ensure the hinge 4 can be locked closed or open e.g. for unimpeded bandaging by a user as outlined above. Accordingly, the outer arm 3 and the inner arm 2 are connected by a swing hinge 4 that allows the arms 2,3 to move in one plane (from parallel to perpendicular) while the outer arm 3 can be fitted with an attachment mechanism for securement of the arm 3 to the bandage and/or a ratchet that clamps the arms 2,3 on the bandage, which can be optionally tightened (closed), held, and released as required.

In one embodiment, the pressure sensing region 10 is placed on the face of the inner arm 2 facing away (i.e. distally) from the patient's leg towards the bandage 19 to help shield the pressure sensing region 10 on the inner arm 2 from moisture such as a patient's bodily fluids (sweat, exudate and the like) which may adversely affect or alter the pressure sensing region of the pressure sensing device. Accordingly, the inner arm 2, including the semi-rigid spine 6 and outer skin compliant layer 15 help to shield the pressure sensing region from direct contact with the bodily fluids.

The force concentrator 14 ensures that the force exerted by the bandage 19 on the inner arm 2 is captured by the pressure sensing region 10 i.e. the force concentration is heightened at the pressure sensing region 10 compared to the proximal end or middle of the inner arm 2. More particularly, by being located atop the pressure sensing region 10, the force concentrator 14 directs the force of the compression bandage 19 to the pressure sensing region 10. As shown particularly in FIGS. 9 to 13, the higher the aspect ratio of the force concentrator, i.e. the greater the height compared to the width or diameter of the force concentrator, the greater the downward force per area of the base of the force concentrator.

As the pressure sensing region 10 is supported beneath by the semi-rigid spine 6, the spine 6 provides resistance for the effect of the force concentrator 14.

The force concentrator 14 therefore ensures that compressive forces are directed to the pressure sensing region 10 and that this region 10 is not shielded from capturing accurate pressure measurements, indicative of those experienced by the patient's leg.

In one embodiment, the diameter or width of the force concentrator 14 is equal to or less than the diameter or width of the pressure sensing region 10 and/or the aspect ratio (height:diameter) of the force concentrator 14 is greater than 0.2:8 (1:40). In addition, the maximum height of the force concentrator 14 (generally the middle of the force concentrator 14) above the outer edge of the inner arm body 5, has a minimum ratio of the diameter/width of the inner arm housing of 1:20. This arrangement ensures optimal pressure measurements.

The configuration of the pressure sensing region 10 ensures that the pressure sensing region 10 is able to sense pressure within the clinically relevant sub-bandage pressure range. More particularly, as the US and UK standards for compression therapy define the light and very high levels of compression as <20 mmHg and >40 mmHg, respectively, the pressure sensing clip 1 has a minimum sensitivity of at least 20 mmHg (i.e. the limit of efficacy) and a maximum level of sensitivity higher than 40 mmHg as the level of working pressure (i.e. when the patient is walking) can potentially increase to 100 mmHg.

To increase the sensitivity range of the pressure sensing region to read above 20 mmHg, the width or diameter of the pressure sensing region 10 is carefully configured together with the height of the spacer layer 12 between the FSR 13 and the underlying circuit layer 11.

The Applicant has found that the greater the width/diameter of the FSR 13 for a given spacer layer 12 height, the greater the potential for contact of the FSR 13 with the underlying circuit layer 11 and the more the ability to sense pressures of lower ranges.

While the force concentrator 14 described above increases sensitivity, there can be a limit to the height employed for the force concentrator 14 if a low profile is desired. Accordingly, sensitivity can be further enhanced with the following configuration: the pressure sensing region 10 (e.g. the FSR 13) is at least 5 mm in width or diameter so as to ensure pressure measurement at the low range of interest (i.e. 20 mmHg) and to reduce the need for an increased profile (thickness) of the force concentrator 14 (see in particular FIGS. 12 and 13).

The structure of the pressure sensing device 1 of the invention also allows for the pressure sensing device to be configured to reduce the tangential effects of limb curvature on pressure measurement. More particularly, when applying the bandage 19 over the inner arm 2 to measure sub-bandage pressure, it is important that any effects from the radius of curvature of the limb are reduced, such as those relating to the tangent that the inner arm 2 makes with the limb 20. For example, in use the bandage 19 can drape over the edge of the inner arm 2 and this effect, referred to as "hammocking" can impact pressure measurement. Furthermore, if the inner arm 2 is removed from beneath the bandage 19, for example after a section of bandage 19 has been applied at the correct pressure and another section requires measurement, it is important that there is not a significant reduction in pressure caused by the gap left by the removed inner arm 2.

Figure 15:
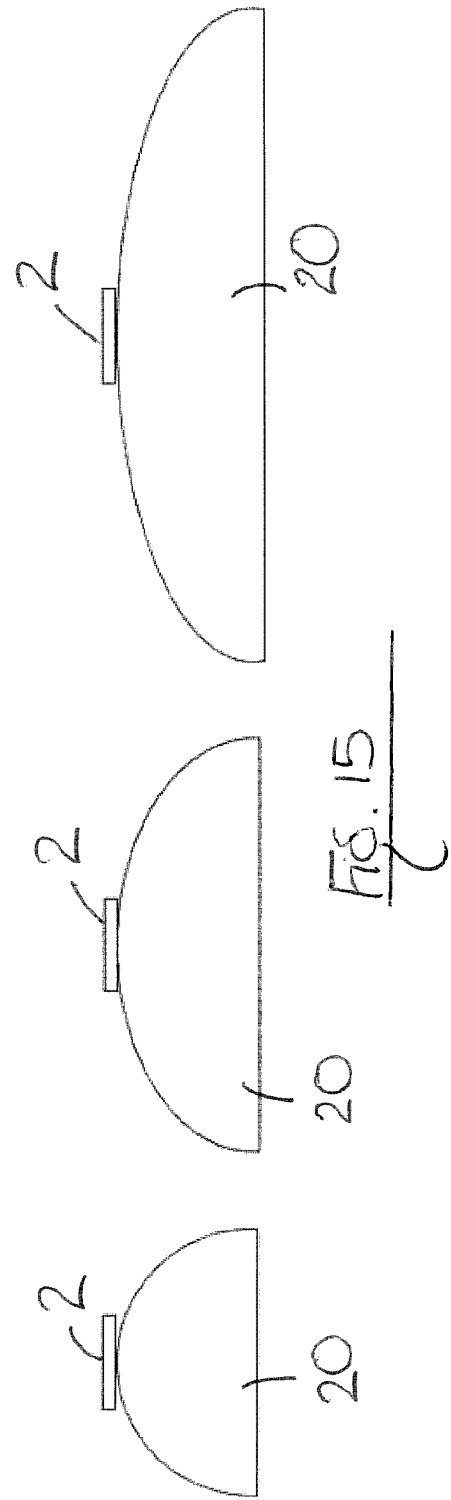
Figure 16:
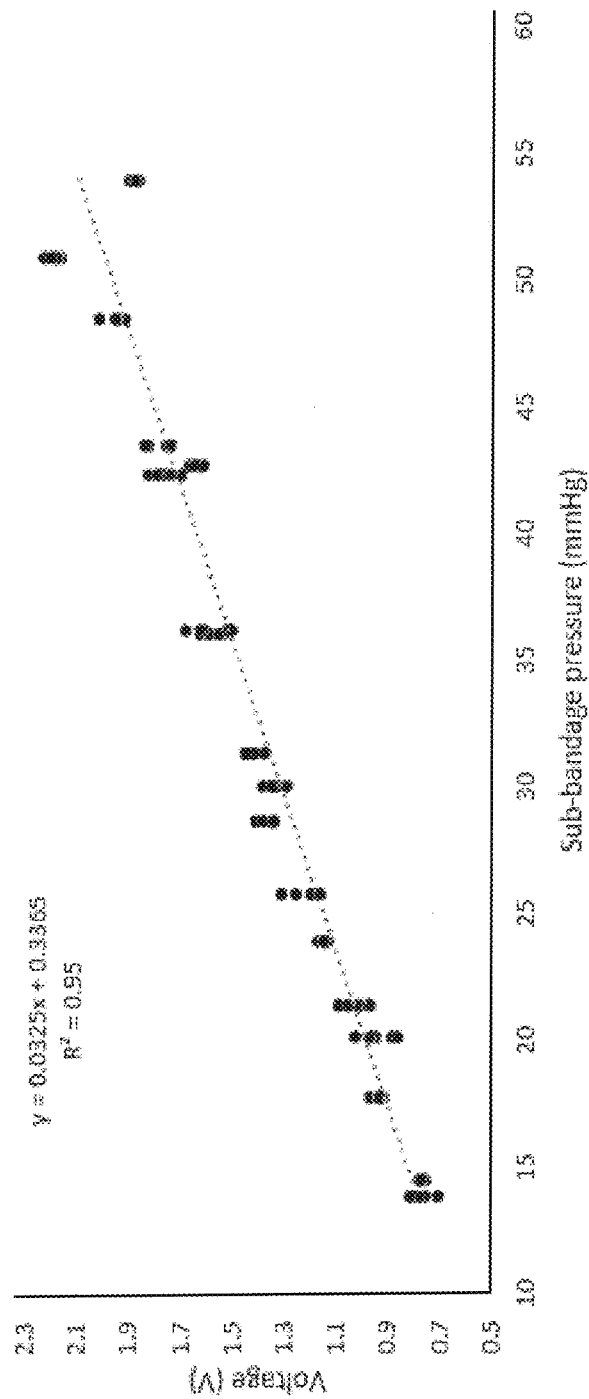
FIG. 16 is a graph of voltage outputs calibrated to sub-bandage pressure measurements taken over three different sized cylinders (20.51 cm, 31.25 cm, and 37.51 cm) by FSR devices with 5 mm diameter pressure sensing regions in which measurements were taken using force concentrators that were 4 mm in diameter, and 1 mm in height.
Figure 17:
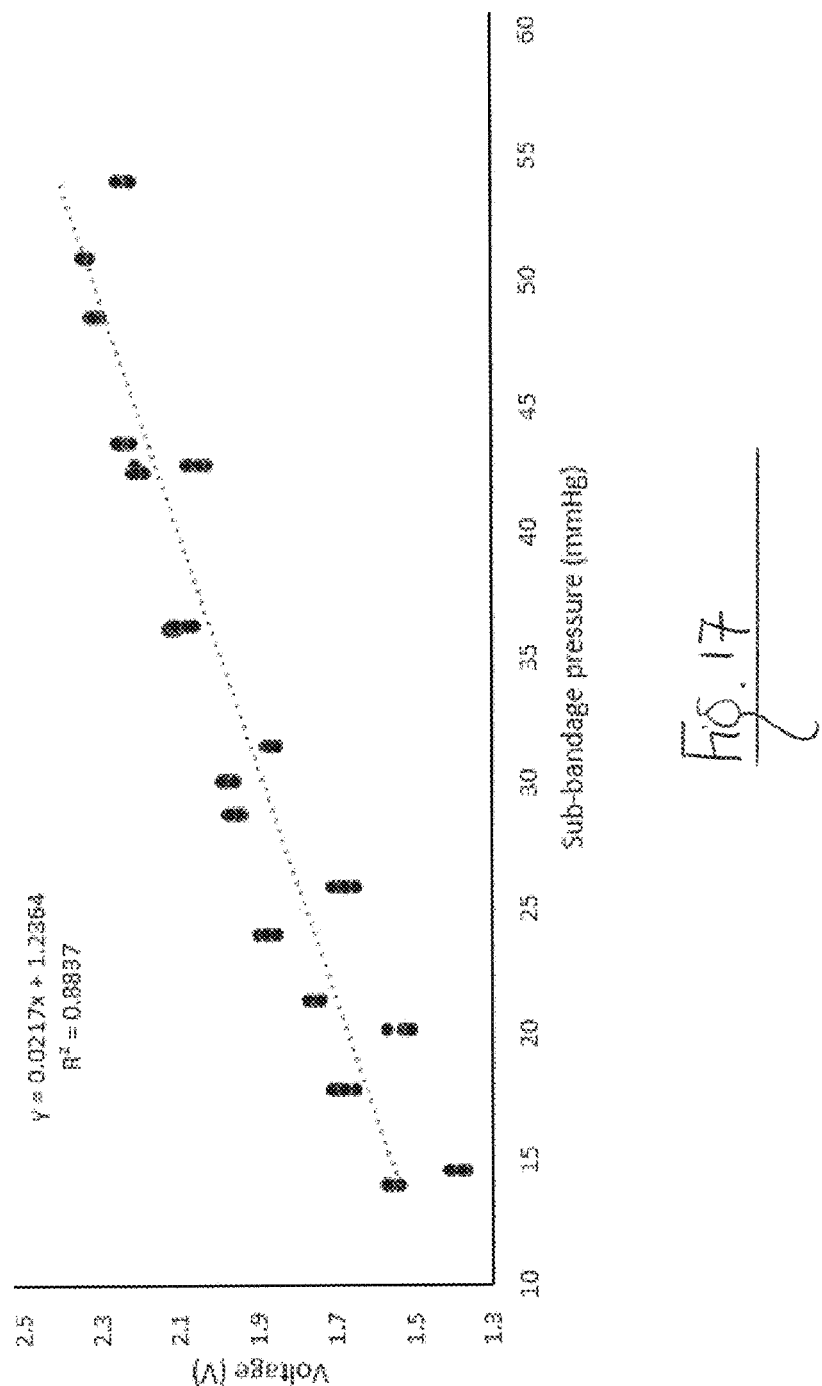
FIG. 17 is a graph of voltage outputs calibrated to sub-bandage pressure measurements taken over 3 different sized cylinders (20.51 cm, 31.25 cm, and 37.51 cm) by FSR devices with 10 mm diameter pressure sensing regions in which measurements were taken using force concentrators that were 8 mm in diameter, and 1 mm in height.
Figure 18:
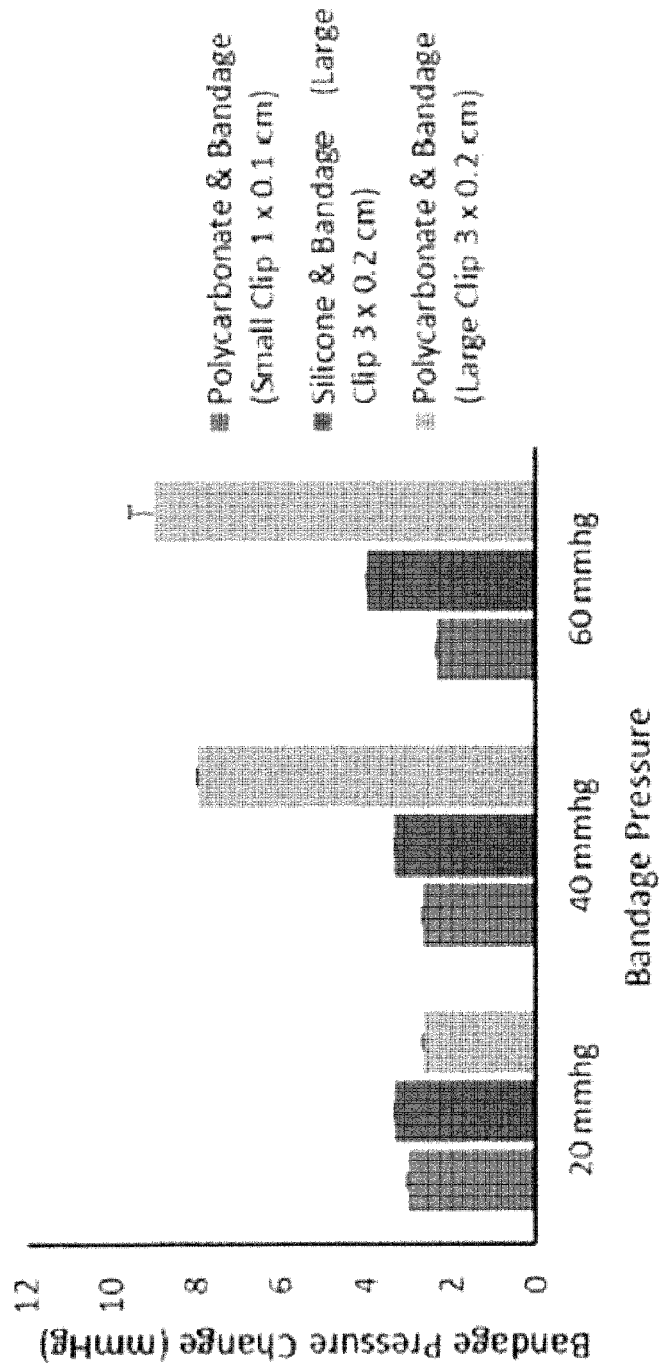
FIG. 18 is a graph of the change in sub-bandage pressure (Juxtacures (medi) bandage material, 3 mm thick and 120 mm wide) due to inner arm clip insertion on ~18 cm circumference cylinder under differing conditions of sub-bandage pressure (20-60 mmHg), clip dimensions (Small Clip=10 mm width, 1 mm thickness, Large Clip=30 mm width, 2 mm thickness), and surface softness (silicone representing skin vs polycarbonate representing bone)
Figure 19:
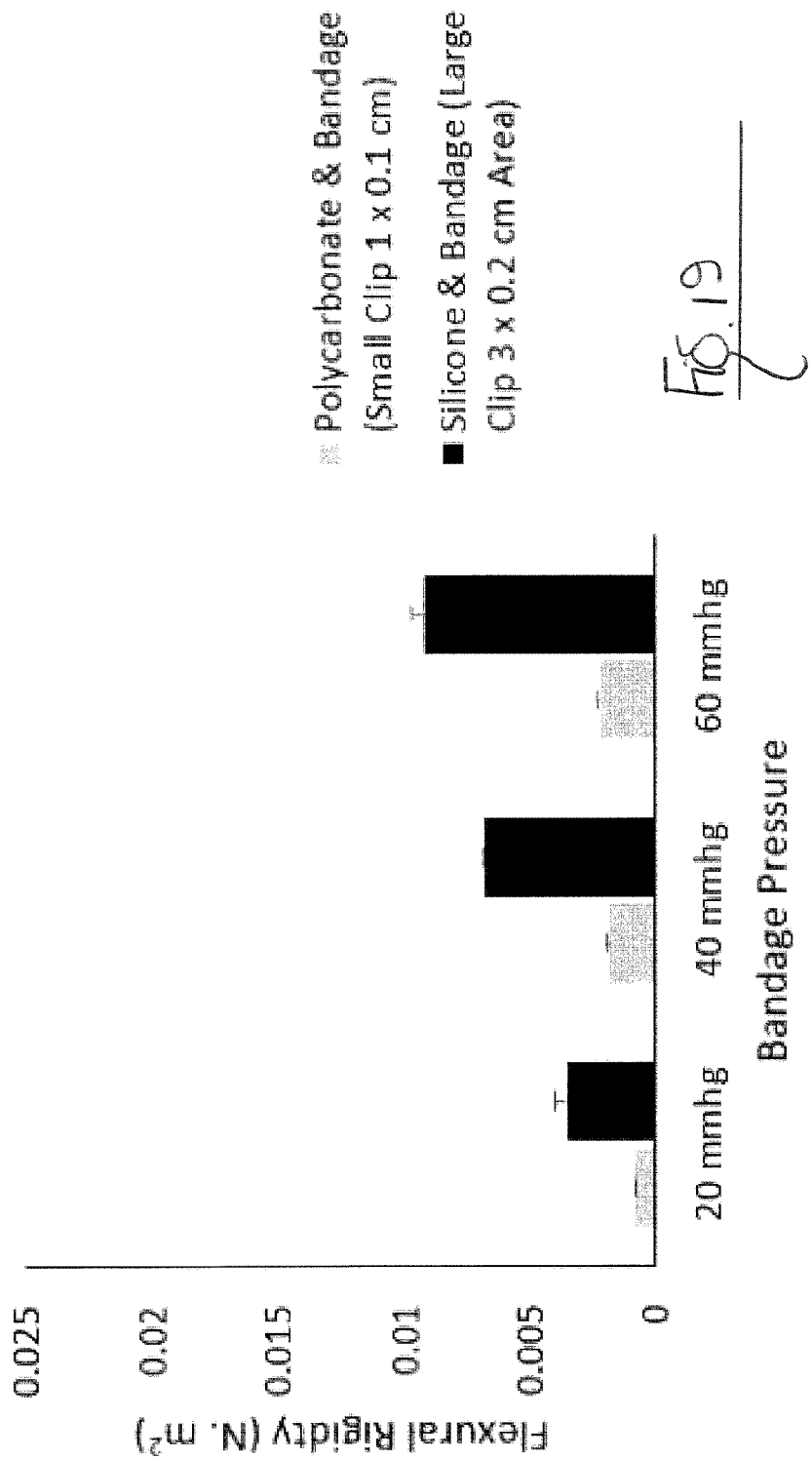
FIG. 19 is a graph of the flexural rigidity (EI) of the inner clip arm designed to resist buckling when inserted under Juxtacures (medi) bandage material (3 mm thick, 120 mm wide) of different pressures (20-60 mmHg), with different levels of friction (Low: polycarbonate and small clip dimension vs High: silicone and large clip dimension), and a cylinder size of 11 cm diameter (Flexural rigidity was calculated using the equation $EI=p_c \times 4 \times \Pi^2 \times L^2$, where $p_c$ is the critical load (calculated by the force required to insert an inner clip arm at 240 mm/min under the conditions described) and L is the uninserted length of the clip arm. Note that $p_c$ and L change as the inner clip arm is inserted so a peak EI was calculated for each condition.
Figure 20:
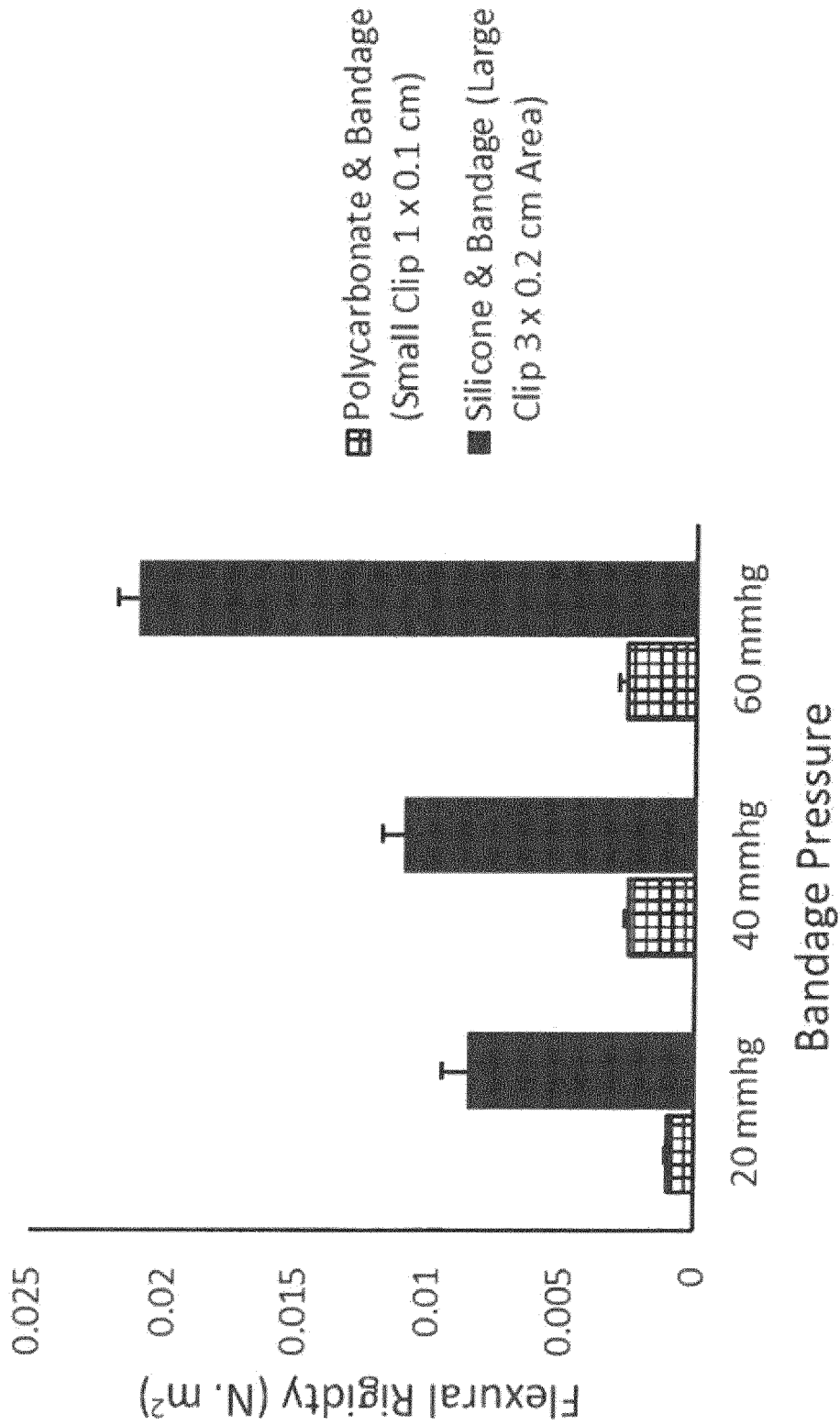
FIG. 20 is a graph of the flexural rigidity (EI) of the inner clip arm designed to resist buckling when inserted under Juxtacures (medi) bandage material (3 mm thick, 120 mm wide) of different pressures (20-60 mmHg), with different levels of friction (Low: polycarbonate and small clip dimension vs High: silicone and large clip dimension), and a cylinder size of 6 cm diameter.
Figure 28:
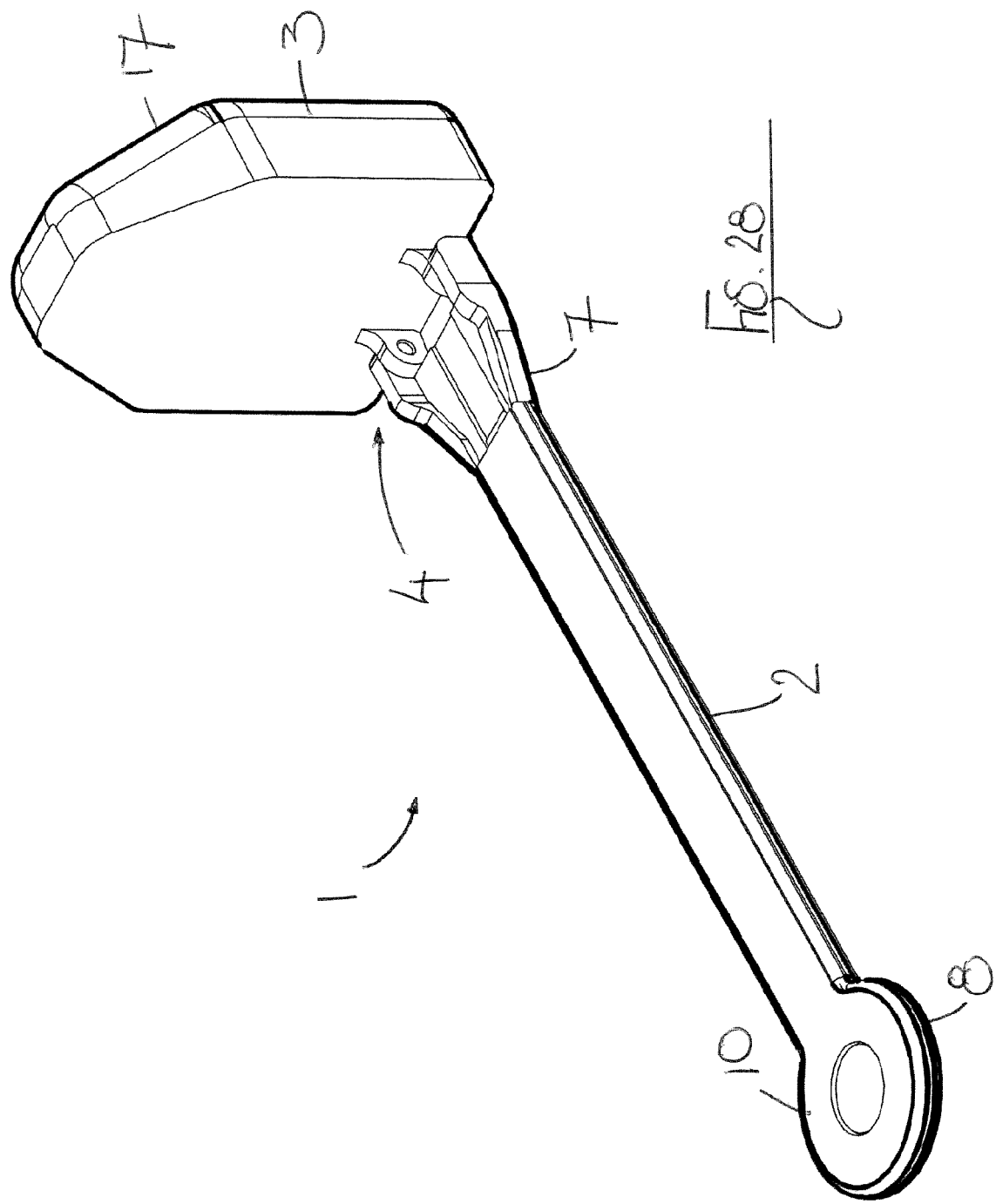
FIG. 28 is a perspective view from above and one side of the device of FIG. 23 with the outer arm in the hingedly open position.

The Applicant has found that tangential or "hammocking" effects are increased with an increased width of the inner arm 2, or a decreased radius of curvature (see FIGS. 14 to 18). Accordingly, the width of the inner arm 2 of the pressure sensing device 1 of the invention is minimised to keep the pressure measurement ability of the device consistent over different limb sizes. The minimised inner arm 2 width also reduces the volume of the gap left if the inner arm 2 is removed after bandage 19 application. Therefore, the Applicant has found that tangential or hammocking effects can be eliminated where the inner arm 2 is less than 30 mm wide and/or the pressure sensing region 10 diameter is 10 mm or less to avoid a semi-rigid spine 6 diameter that can exacerbate tangential effects of radius of curvature on pressure measurement. As shown in FIG. 15, due to reduced tangential effects of the 5 mm diameter FSR, calibration results were more consistent over the different sized cylinders of varying radius of curvature, represented by an increased R2 value for the calibration curve.

The force concentrator 14 also assist in the elimination of hammocking.

The display 18 on the outer arm 3 allows the sub-bandage pressure to be easily read, whether during application of the bandage (to ensure correct pressure is achieved) or while the bandage is being worn (to ensure correct pressure has been maintained). Moreover, by displaying the pressure on the digital display 18 on the outer arm 3 easy visualisation is facilitated during application of the bandage 19, where the user applying the bandage 19 can simultaneously focus on correct bandage orientation (e.g. preventing gaps) and the pressure applied. In one embodiment, to reduce power, a button adjacent to the display 18 can be pressed to temporarily display the pressure on the display 18 (e.g. for 1 minute) and reactivation of the display 18 can occur by pressing the button again.

FIGS. 22A to 22C illustrate an embodiment of the device of the invention in which parts identified with reference to the previous embodiments are assigned the same reference numerals. In this embodiment, the outer arm 3 comprises an electronics housing 17 having a digital display screen 18 as previously described which in this embodiment is configured for snap-fit attachment to and detachment from the outer arm 3. A long lead 24 extends between the electronics module 17 and pressure sensor 13 on the inner bandage penetrating arm 2, that in use allows the electronics module 17 to be detached from the outer arm 3 and pulled away from the device 1 to a visually accessible position, while still receiving data from the pressure sensor 13 (FIGS. 22B and C). Although not shown, the lead 24 is operatively connected to a spring mechanism configured to retract the lead when it is released. This embodiment is useful when the device is attached to a part of the body that is difficult to see, for example the calf or the back of the arm.

FIGS. 23 to 32 show a further embodiment of the bandage pressure sensing device 1 of the invention similar to the device of FIGS. 1 to 22C and like numerals indicate like parts. However, in the present embodiment, the inner bandage penetrating arm 2 is shaped to define a circular pressure sensing region 10 at its distal insertion insertion end 8. Moreover, the profile of the inner bandage penetrating arm 2 is minimised with respect to width (i.e. reduced aspect ratio), thereby reducing localised pressure on the substrate. In addition, the electronics module housing 17 is shaped and contoured to define a substantially triangular portion 25.

FIGS. 33 to 42 show a further embodiment of the device 1 of the invention broadly similar to the devices previously described and like numerals indicate like parts. However, in the present embodiment, the electronics module housing 17 is provided with an openable and closable hinged window 26 on its top face for accessing electronics in the electronics module 17. The hinged window 26 is provided with a window opening 27 through which the display screen 18 is visible. In addition, the hinged window 26 is shaped and contoured to define a slim or streamlined triangular portion 25 while the triangular portion 25 has a finger grip 28 in the form of a recess or notch for gripping and opening the hinged window.

FIGS. 43 to 49 show a further embodiment of the invention broadly similar to the devices 1 previously described and like numerals indicate like parts. However, in the present embodiment, the electronics module 17 is shaped to be substantially cylindrical in shape and is configured to swivel about the longitudinal axis of the cylindrical shape to adjust the position of the display screen 18 so that the display screen 18 is adjustable i.e. can be adjusted and viewed from multiple angles by a user as required. In addition, the hinge 4 between the outer arm 3 and the inner bandage penetrating arm 2 is equipped with a bandage grip 29 in the form of a clip to grip bandages in use.

In an alternative embodiment, the electronics module 17 is configured to swivel within a frame.

FIGS. 50 to 53 show a further embodiment of the device 1 of the invention broadly similar to the devices 1 previously described and like numerals indicate like parts. However, in the present embodiment, at least a distal portion 2a of the inner bandage penetrating arm 2 is detachable from the device 1 and in particular from a proximal portion 2b of the inner bandage penetrating arm 2 hingedly attached to the outer arm 3 so that the portion of the inner bandage penetrating arm 2 inserted in a bandage can be replaced as required. The detachable inner arm 2 allows for versatility in design features to vary material, mechanical properties, length, shape, number of pressure sensing regions, bandage types, disease states, etc within the same electronic device. Alternatively, or in addition, the detachable inner bandage penetrating arm 2 can be disposable and replaceable with another disposable inner bandage penetrating arm 2 for improved hygiene. The inner bandage penetrating arm 2 is detachable from the device 1 at an inner bandage penetrating arm socket-type mounting 30.

The detachable inner bandage penetrating arm 2 of the present embodiment, and indeed the non-detachable inner bandage penetrating arm 2 of earlier embodiments is capable of communicating information to the device, for example batch number, calibration details, unique identifier, etc, potentially through an on board chip.

FIGS. 54 to 58 show a further embodiment of the device 1 of the invention similar to the device of FIGS. 22A to 22C in which the electronics module 17 is detachable from the outer arm 3 and is connected to the outer arm 3 with a retractable long lead 24.

FIGS. 59 to 63 show a further embodiment of the device 1 of the invention similar to the devices 1 previously described and like numerals indicate like parts. However, in the present embodiment, the digital display screen 18 is a side digital display screen 18 located on a side face 31 of the electronics module 17. In addition, the electronics module 17 is provided with a toggle button 32 to alter the device calibration for a range of leg circumference sizes. In an alternative embodiment of the invention, the toggle is effected by a digital interface (e.g. app or separate electronics device).

Figure 50:
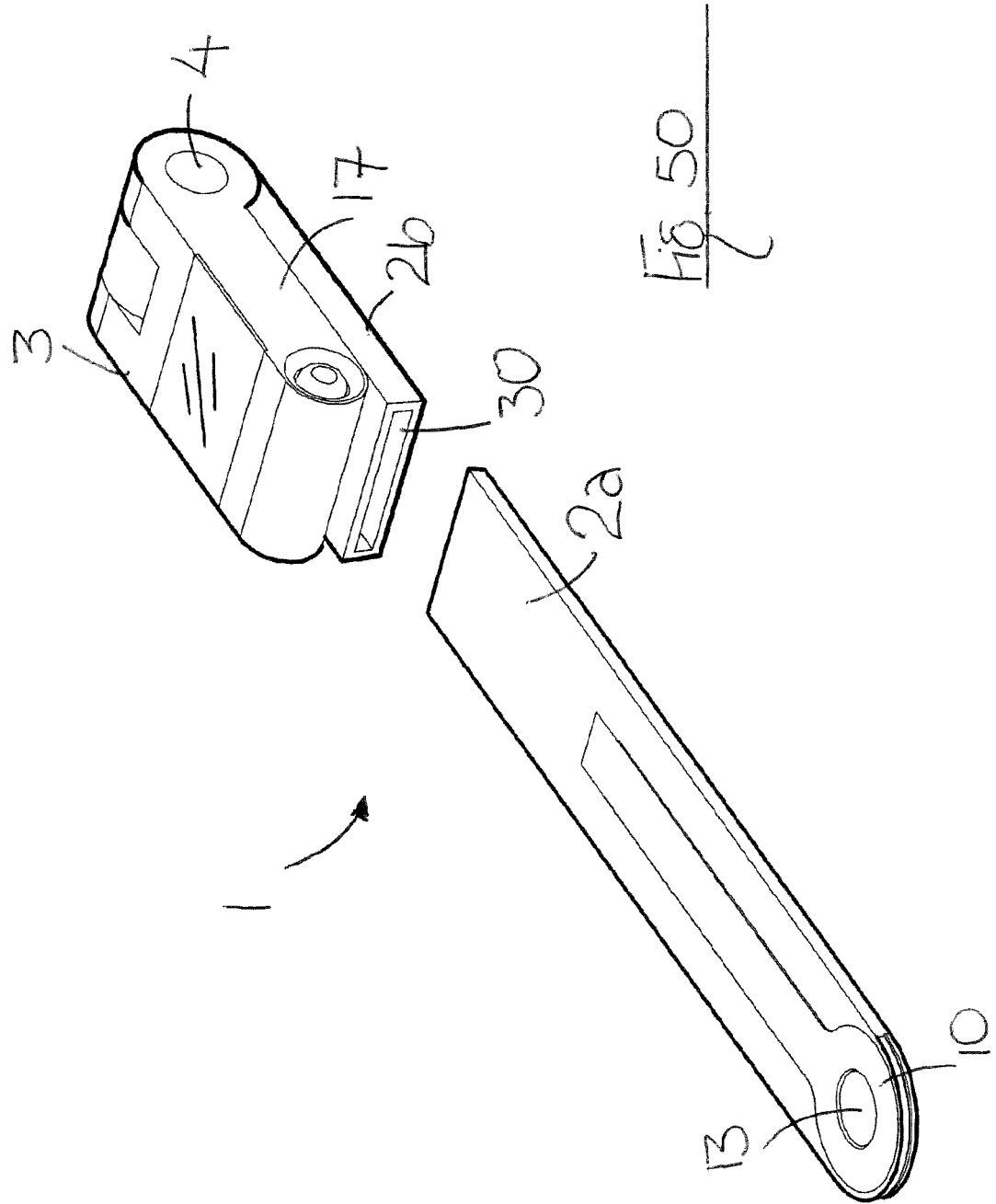
FIG. 50 is a perspective view from above and one side of a further embodiment of the device of the invention in which the inner bandage penetrating arm is detachable from the device and optionally disposable and is shown detached from the outer arm.
Figure 62:
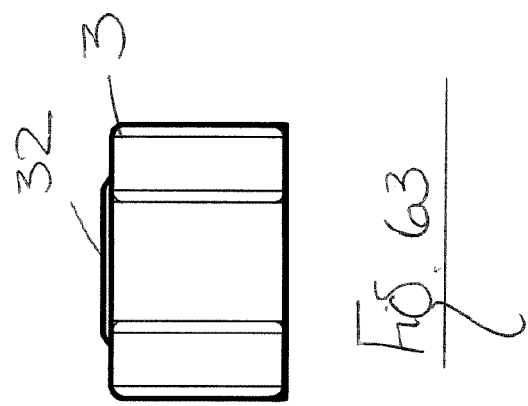
FIG. 62 is an end view of the device of FIG. 60.
Figure 63:
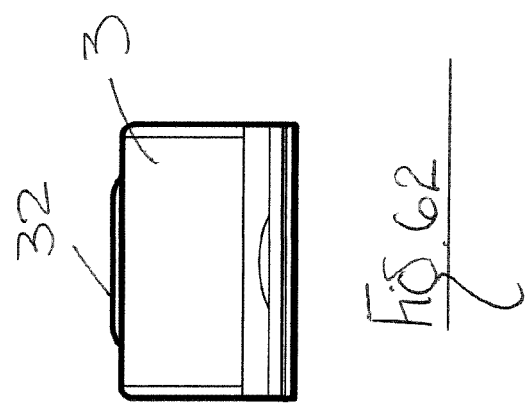
FIG. 63 is an opposite end view of the device of FIG. 60.
Figure 64:
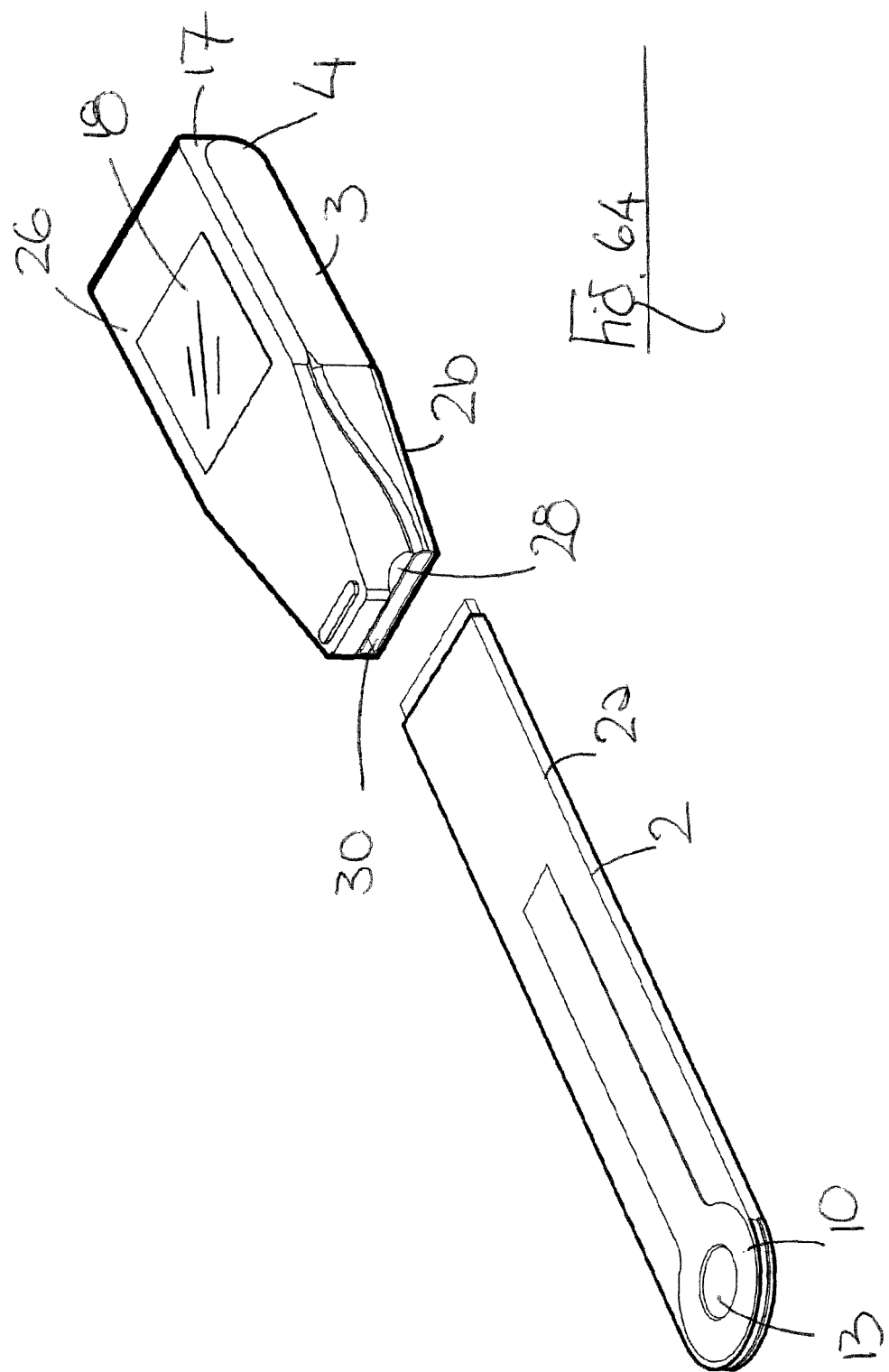
FIG. 64 is a perspective view from above and one side of a further embodiment of the device of the invention similar to the device of FIGS. 33 and 50 with the outer arm detached from the inner arm and the window on the electronics module in the closed position.
Figure 70:
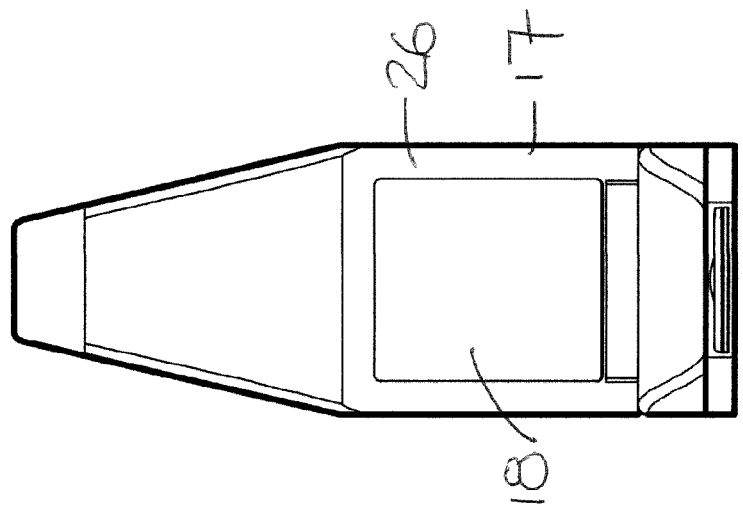
FIG. 70 is an end view of the device of FIG. 67 with the outer arm removed from the inner arm.
Figure 71:
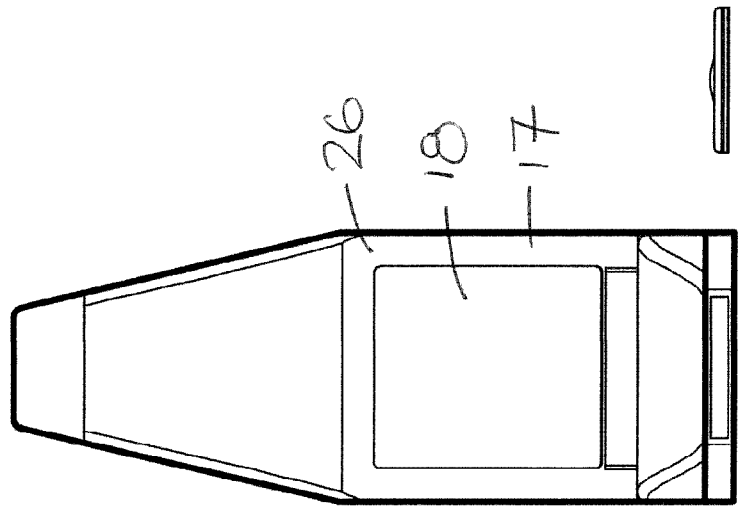
FIG. 71 is an end view of the device of FIG. 67 with the inner arm inserted in the outer arm.
Figure 88:
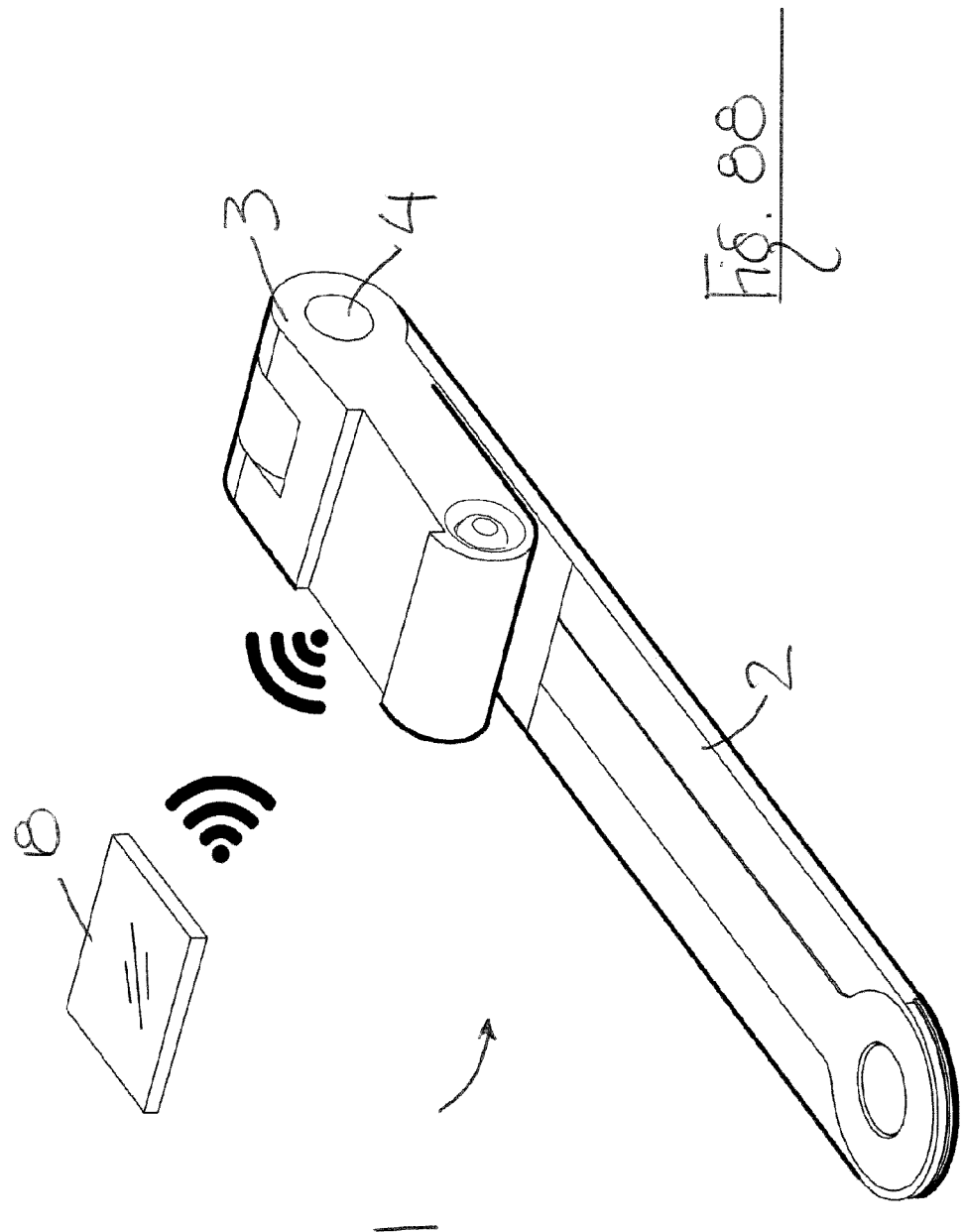
FIG. 88 is a perspective view from above and one side of a further embodiment of the invention similar to the device of FIG. 83 in which the detachable display screen can wirelessly communicate with the electronics module.

FIGS. 64 to 73 show a further embodiment of the device 1 of the invention similar to the device of FIGS. 33 and 50 and like numerals indicate like parts. More particularly, the device 1 has a detachable and/or disposable inner bandage penetrating arm 2 and a hinged window 26 on the electronics housing 17.

FIGS. 74 to 77 show a further embodiment of the invention similar to the device 1 of FIG. 50 and like numerals indicate like parts. However, in the present embodiment, the inner bandage penetrating arm 2 is provided with multiple sensor regions 10 and in particular three sensor regions 10 for detecting pressure along the length of the inner bandage penetrating arm 2.

FIGS. 78 to 82 show a further embodiment of the device 1 of the invention similar to the device 1 of FIG. 54 and like numerals indicate like parts. However, in the present embodiment, the lead 24 is omitted and the detachable electronics module 17 is configured to wirelessly communicate with the device 1.

FIGS. 83 to 87 show a further embodiment of the invention similar to the devices previously described and like numerals indicate like parts. However, in the present embodiment, the display screen 18 is detachable from the electronics module 17 and is attached to the electronics module 17 with a retractable display wire 33.

FIGS. 88 to 92 show a further embodiment of the invention similar to the device 1 of FIG. 83 and like numerals indicate like parts. However, in the present embodiment, the display wire 33 is omitted and the detachable display screen 18 is configured to wirelessly communicate with the electronics module 17.

FIG. 93 shows the device 1 of FIG. 74 in which the device 1 is wirelessly communicable with a digital interface 23 on a handheld device such as a mobile phone 34 while FIG. 94 shows the device 1 wirelessly communicable with a separate electronic device such as a digital interface in the form of a separate electronics device such as a computer or controller 35. The computer or controller 35 can be capable of 2-way communication with the main device 1 (i.e. both send and receive signals such as calibration information). In some embodiments, the computer or controller 35 can control the device 1 e.g. instruct calibration.

Similarly, FIG. 95 shows the device 1 of Figure wirelessly communicable with a handheld device 23 such as a mobile phone 34 or a computer 35 and FIG. 96 shows the device of FIG. 74 wirelessly communicable with a handheld device 23 such as a mobile phone 34 and a separate electronics device such as a computer or controller 35 as described above.

In order to optimise visibility of the sub-bandage pressure detected by the FSR 13 while a bandage 19 is worn particularly in difficult to view positions such as the B1 position, wireless transmission (e.g. via Bluetooth) of the pressure signal to a digital interface 23 (e.g. a mobile app) can also facilitate easy visualisation of the sub-bandage pressure. As shall be explained more fully below, a transmitter can be remotely and temporarily activated using the digital interface 23 (e.g. mobile app) to transmit recorded and stored sub-bandage pressure measurement data or to generate a report file on the digital interface 23.

The location of the housing 17 for electronics and the like on the outer arm 3 allows for the inner and outer arms 2,3 (and the bandage to which the pressure sensing clip 1 is attached) to act as barriers to any potential heat transfer to reducing heat transfer from the electronics to the limb 20 and protect the limb 20 from excessive heat.

As indicated above, the structure of the pressure sensing device 1 ensures the device can conform to the shape of limbs such as legs to provide non-traumatic application. Optimal conformation to facilitate comfort and minimise pressure points can be achieved by employing a pressure sensing region 10 of reduced thickness. More particularly, in one embodiment, the FSR 13 is a thin, flexible FSR 13 having a diameter of between about 5 mm and about 30 mm and a thickness of less than about 0.2 mm, ensuring no pressure points. The FSR 13 can be mounted to the inner arm 2 using an adhesive backing or the like. The semi-rigid spine 6 of the inner arm 2 provides structural stability to the relatively thin FSR 13 for consistent pressure measurement but nevertheless can conform to the shape of a patient's leg or other limb which may change from patient to patient or from distal to proximal regions.

As indicated above, the pressure sensing device 1 of the invention can be connected wirelessly to a digital interface 23 such as a mobile app. Accordingly, in addition to displaying the sub-bandage pressure on the digital display 18, the pressure signals can be transmitted wirelessly and displayed on the digital interface 23 to provide viewing versatility.

The pressure sensing device 1 can also form part of a pressure sensing system comprising the pressure sensing device 1 and a bandage 19 for use with the pressure sensing device 1. If desired, the bandage 19 can be adapted for use with the pressure sensing device 1. More particularly, if desired, the bandage 19 of the pressure sensing system can be a non-layered or sleeve-like bandage adapted for correct lateral positioning of the device to ensure accurate readings. In such a pressure sensing system, the pressure sensing device of the invention can be configured to act as an integrated hub for receipt, storage and transmission of signals from alternative sensors/systems (e.g. sensors for measurement of wound healing characteristics such as pH, moisture content, microbial activity, temperature etc.

In the pressure sensing system of the invention, an algorithmic approach can be used to determine treatment/healing interaction and predict conditions for optimum healing. The algorithm can predict conditions for optimum healing for each patient at each timepoint i.e. for individual patients throughout duration of treatment. This may include a calculation of the "dosage" of compression therapy received based on the measurements from the pressure sensing device 1. This algorithmic approach may also include identification of the compression bandage used to administer compression e.g. via a scan of a barcode on the compression bandage through a mobile application. In addition, the mobile application can have the ability to objectively measure the circumference of a patient's leg. This measurement can, in turn, be used to automatically calibrate the device to the patient's leg size.

The pressure sensing system and method of the invention can also form part of a sub-bandage pressure measurement and monitoring communications network for treating patients in which the pressure sensing system includes integration of the pressure-sensing device and associated software into a healthcare system/process and/or patient e-health record and/or a digital wound care platform to ensure optimal patient outcomes.

To avoid signal noise and to ensure that the pressure sensing device is able to accurately read the relevant sub-bandage pressure, it is important that the pressure sensing device is positioned securely in the clinically relevant positions.

For example, it has been recommended that pressure measurements be taken at multiple regions including:
B: ankle at point of minimum girth;
B1: area at which the Achilles tendon changes into the calf muscles (~10-15 cm proximal to the medial malleolus);
C: calf at its maximum girth;
D: just below the tibial tuberosity;
E: centre of the patella and over the back of the knee;
F: between K and E (mid-thigh, between patella and groin);
G: 5 cm below the centre point of the crotch;
H: greatest lateral trochanteric projections of the buttock, and
K: centre point of the crotch.

B1 is the most clinically relevant of these points, so it is recommended that location B1 should always be included in pressure measurements, with the exact location of the sensor situated at the segment that shows the most extensive enlargement of the leg circumference during dorsi-flexion or by standing up from the supine position. However, it can be difficult for a user to correctly position conventional pressure sensing devices in such regions.

Accordingly, to guide the user in the placement of the inner clip arm 2, the bandage 19 of the pressure sensing system of the invention is provided with pressure sensing device placement guides in the form of pockets, guide brackets (e.g. fabric strips), slits and the like incorporated on the underside of the bandage 19 to indicate clinically relevant regions of placement to a user, to secure the device in place and prevent loss of the device. By making the placement guides the same size as the inner arm 2, movement of the pressure sensing device, which is a potential source of signal noise, 1 is further prevented. Moreover, when measuring sub-bandage pressure, the radius of curvature and stiffness properties of the underlying substrate can have a significant impact on the pressure measurement, so it is important to ensure placement is made correctly. For example, placement over a bony region, where there may be a high radius of curvature and high stiffness properties could provide a high pressure reading that is not indicative of the amount of pressure over the majority of the bandaged area. For this reason, placement guides that direct the pressure sensing region to correct anatomical locations, which are inbuilt into the adapted bandage are advantageous.

The location of the placement guides can also be clearly indicated on the bandage 19 through visual or textural features.

The invention claimed is:

1. A bandage pressure sensing device for indicating the pressure applied by a bandage to a subject wherein the bandage pressure sensing device comprises a pressure sensing clip comprising:
an outer arm;
an inner bandage penetrating arm having a pressure sensing region,
a piezoelectric pressure sensor at the pressure sensing region, and
a hinge between the outer arm and the inner bandage penetrating arm.

2. A bandage pressure sensing device as claimed in claim 1 wherein the outer arm is movable between an open position and a closed position about the hinge.

3. A bandage pressure sensing device as claimed in claim 2 wherein the outer arm is movable to the open position at an angle of between about 90° and 180° with respect to the inner bandage penetrating arm.

4. A bandage pressure sensing device as claimed in claim 1 wherein the bandage pressure sensing device comprises a toggle in the form of a digital interface to alter calibration of the bandage pressure sensing device for a range of leg circumference sizes.

5. A bandage pressure sensing device as claimed in claim 1 wherein the hinge comprises a bandage grip in the form of a clip.

6. A bandage pressure sensing device as claimed in claim 1 wherein the bandage pressure sensing device comprises a machine readable unique identifier to enable identification of the bandage pressure sensing device by a mobile application or a separate electronics device and/or an objective for leg measurement purposes.

7. A bandage pressure sensing device as claimed in claim 1 wherein the outer arm or hinge includes features to aid gripping including at least one of adhesive, cohesive, roughened, catching or magnetic materials on the outer arm or locking or torque inducing ratchet/spring mechanisms for the hinge.

8. A bandage pressure sensing device as claimed in claim 7 wherein the semi-rigid spine has a flexural rigidity configured to protect the pressure sensing region from bending and to enable the bandage pressure sensing device to be capable of conforming to a limb of the subject.

9. A bandage pressure sensing device as claimed in claim 7 wherein the inner bandage penetrating arm further comprises a compliant layer configured to be disposed between the semi-rigid spine and the subject's skin to prevent traumatic or pressure injury or for comfort.

10. A bandage pressure sensing device as claimed in claim 9 wherein the compliant layer comprises a load distributing mechanism to distribute the load of the semi-rigid spine.

11. A bandage pressure sensing device as claimed in claim 1 wherein the inner bandage penetrating arm is detachable from the outer arm.

12. A bandage pressure sensing device as claimed in claim 1 wherein the inner bandage penetrating arm comprises an arm body having a hinge end and an insertion end and a semi-rigid spine extends between the hinge end and the insertion end.

13. A bandage pressure sensing device as claimed in claim 12 wherein the semi-rigid spine comprises a bending enhancer to enhance bending under directional loads.

14. A bandage pressure sensing device as claimed in claim 1 further comprising a force concentrator over the pressure sensing region.

15. A bandage pressure sensing device as claimed in claim 1 wherein the inner bandage penetrating arm is adapted to store and communicate information to at least one of the bandage pressure sensing device or an onboard chip.

16. A bandage pressure sensing device as claimed in claim 1 wherein the bandage pressure sensing device comprises a controller providing two-way communication with a remote electronics device.

17. A bandage pressure sensing device as claimed in claim 1 wherein the inner bandage penetrating arm comprises a region of greater flexibility between the pressure sensing region and the hinge, the region of greater flexibility being located adjacent to the pressure sensing region or between multiple pressure sensing regions.

18. A method of treating indications in a subject with a compression bandage comprising applying the compression bandage to the subject and sensing the pressure applied by the compression bandage to the subject with a bandage pressure sensing device comprising:
- an outer arm;
- an inner bandage penetrating arm having a pressure sensing region,
- a piezoelectric pressure sensor at the pressure sensing region, and
- a hinge between the outer arm and the inner bandage penetrating arm.

* * * * *